US012574278B2

(12) United States Patent
Ma et al.

(10) Patent No.: US 12,574,278 B2
(45) Date of Patent: Mar. 10, 2026

(54) PHASE NOISE SUPPRESSION METHOD AND RELATED APPARATUS

(71) Applicant: HUAWEI TECHNOLOGIES CO., LTD., Guangdong (CN)

(72) Inventors: Qianli Ma, Chengdu (CN); Huang Huang, Shenzhen (CN); Kuandong Gao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 287 days.

(21) Appl. No.: 18/334,731

(22) Filed: Jun. 14, 2023

(65) Prior Publication Data

US 2023/0327936 A1 Oct. 12, 2023

Related U.S. Application Data

(63) Continuation of application No. PCT/CN2021/137841, filed on Dec. 14, 2021.

(30) Foreign Application Priority Data

Dec. 14, 2020 (CN) .......................... 202011468132.9
Jun. 24, 2021 (CN) .......................... 202110708077.4

(51) Int. Cl.
*H04L 27/26* (2006.01)

(52) U.S. Cl.
CPC ...... *H04L 27/2636* (2013.01); *H04L 27/2613* (2013.01)

(58) Field of Classification Search
CPC ............. H04L 27/2636; H04L 27/2613; H04L 5/0048; H04L 25/03343; H04L 27/26134;
(Continued)

(56) References Cited

U.S. PATENT DOCUMENTS

2019/0081844 A1* 3/2019 Lee ..................... H04J 13/0062
2019/0356515 A1* 11/2019 Murakami .......... H04L 27/2657
(Continued)

FOREIGN PATENT DOCUMENTS

| CN | 111630820 A | * 9/2020 | ........... H04L 5/0051 |
| WO | 2022120518 A1 | 6/2022 | |

OTHER PUBLICATIONS

Nissel et al., "Experimental evaluation of FBMCOQAM channel estimation based on multiple auxiliary symbols," Proceedings of 2016 IEEE Sensor Array and Multichannel Signal Processing Workshop (SAM), Jul. 10, 2016, pp. 1-5.
(Continued)

*Primary Examiner* — Kevin T Bates
*Assistant Examiner* — Poonam Sharma
(74) *Attorney, Agent, or Firm* — Fish & Richardson P.C.

(57) ABSTRACT

Methods and apparatuses for phase noise suppression. In an example method, a first device generates a first signal and sends the first signal to a second device. The first signal includes one or more discrete Fourier transform-spread orthogonal frequency division multiplexing (DFT-s-OFDM) signals. Each of the one or more DFT-s-OFDM signals includes P block-phase noise tracking pilot signal (Block-PTRS) patterns. Each of the P Block-PTRS patterns includes Q phase noise tracking pilot signals (PTRSs). The Q PTRSs include $Q_{(1)}$ real part PTRSs and $Q_{(2)}$ imaginary part PTRSs.

20 Claims, 24 Drawing Sheets

(58) Field of Classification Search
CPC ............. H04L 27/2614; H04L 27/2698; H04L 27/2657; H04L 27/2675; H04L 27/261; H04L 27/262
See application file for complete search history.

(56) References Cited

U.S. PATENT DOCUMENTS

| | | |
|---|---|---|
| 2020/0304259 A1 | 9/2020 | Ihalainen et al. |
| 2022/0070864 A1* | 3/2022 | Jeon .................. H04W 72/0453 |
| 2022/0368581 A1* | 11/2022 | Zhang ................ H04L 27/2607 |

OTHER PUBLICATIONS

Extended European Search Report in European Appln. No. 21905704.9, mailed on Apr. 29, 2024, 12 pages.
You et al., "Joint Carrier Frequency Offset and Phase Noise Estimation Based on Pseudo-Pilot in CO-FBMC/OQAM System," IEEE Photonics Journal, vol. 11, No. 1, Feb. 2019, 12 pages.
Wang et al., "CP-OQAM-OFDM Based SC-FDMA: Adjustable User Bandwidth and Space-Time Coding," IEEE Transactions on Wireless Communications, vol. 12, No. 9, Sep. 2013, 12 pages.
Office Action in Indian Appln. No. 202327040435, mailed on Jan. 20, 2025, 6 pages (with English translation).
Hearing Notice in Indian Appln. No. 2023-27040435, mailed on Jan. 21, 2026, 4 pages.

* cited by examiner

Network device          Terminal device

N<M

DFT: Discrete Fourier transform

IDFT: Inverse discrete Fourier transform

Filtering (filtering)

| A | Flip(A*) |

| Modulation (modulation) (N) | Up-sampling (up-sampling) (2) | Pulse shaping (pulse shaping) | Down-sampling (down-sampling) |

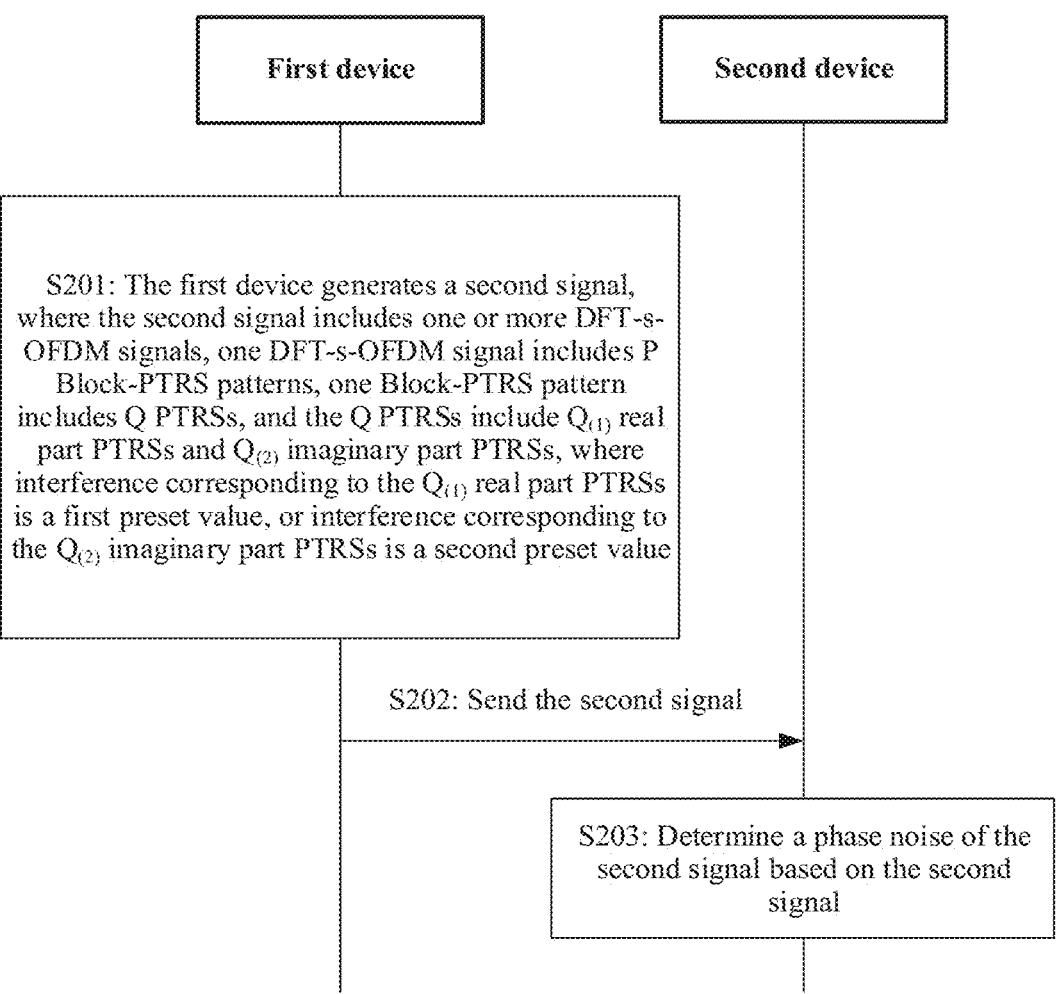

First device

Second device

S201: The first device generates a second signal, where the second signal includes one or more DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where interference corresponding to the $Q_{(1)}$ real part PTRSs is a first preset value, or interference corresponding to the $Q_{(2)}$ imaginary part PTRSs is a second preset value S202: Send the second signal S203: Determine a phase noise of the second signal based on the second signal

FIG. 15

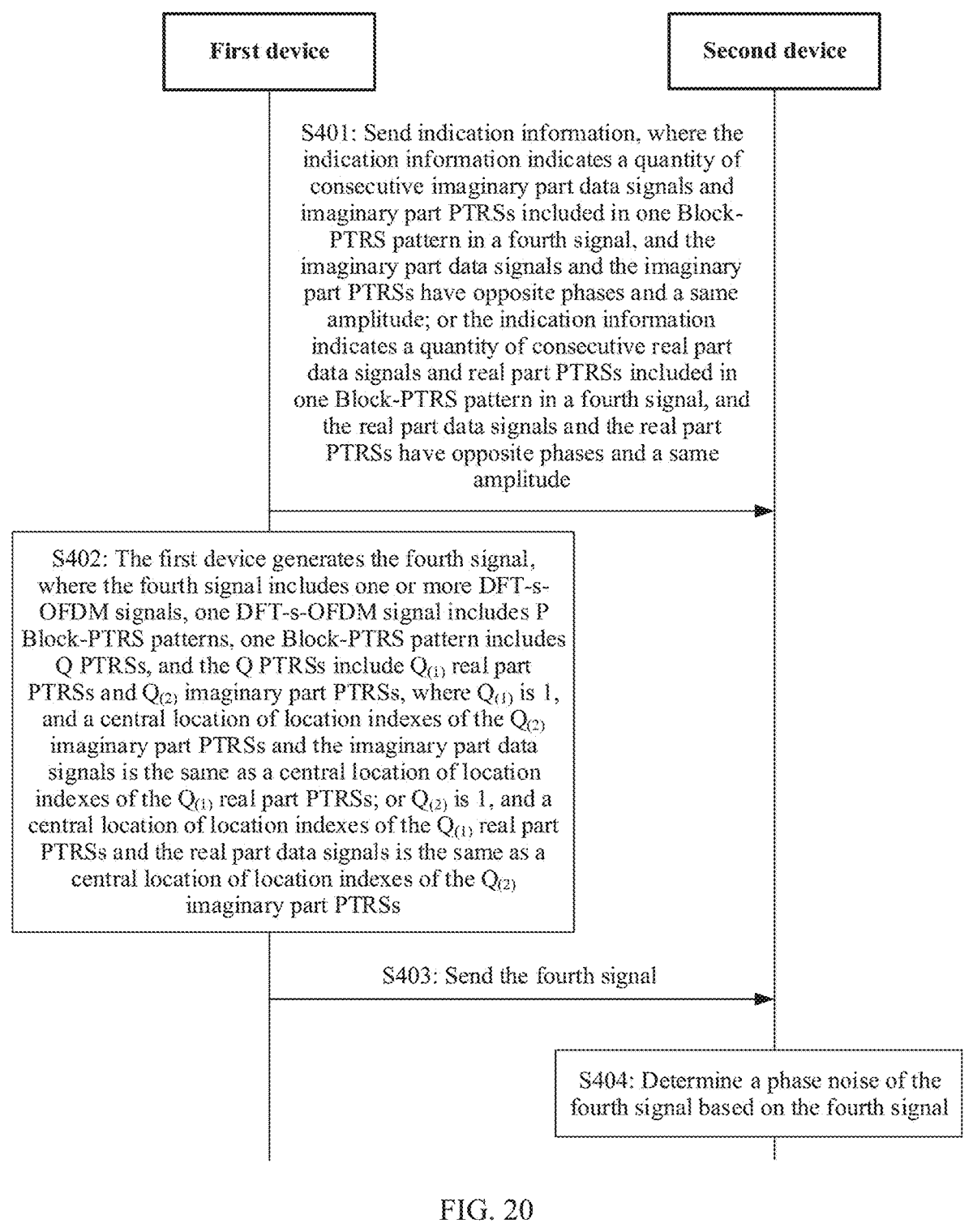

```
┌─────────────┐                          ┌──────────────┐
│ First device│                          │ Second device│
└──────┬──────┘                          └──────┬───────┘
       │                                        │
       │  S401: Send indication information, where the
       │  indication information indicates a quantity of
       │  consecutive imaginary part data signals and
       │  imaginary part PTRSs included in one Block-
       │     PTRS pattern in a fourth signal, and the
       │  imaginary part data signals and the imaginary
       │  part PTRSs have opposite phases and a same
       │           amplitude; or the indication information
       │  indicates a quantity of consecutive real part
       │  data signals and real part PTRSs included in
       │  one Block-PTRS pattern in a fourth signal, and
       │     the real part data signals and the real part
       │      PTRSs have opposite phases and a same
       │                  amplitude
       │  ────────────────────────────────────────────▶
       │                                        │
```

S402: The first device generates the fourth signal, where the fourth signal includes one or more DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is 1, and a central location of location indexes of the $Q_{(2)}$ imaginary part PTRSs and the imaginary part data signals is the same as a central location of location indexes of the $Q_{(1)}$ real part PTRSs; or $Q_{(2)}$ is 1, and a central location of location indexes of the $Q_{(1)}$ real part PTRSs and the real part data signals is the same as a central location of location indexes of the $Q_{(2)}$ imaginary part PTRSs

```
       │         S403: Send the fourth signal            │
       │  ────────────────────────────────────────────▶ │
       │                                        │
```

S404: Determine a phase noise of the fourth signal based on the fourth signal

FIG. 20

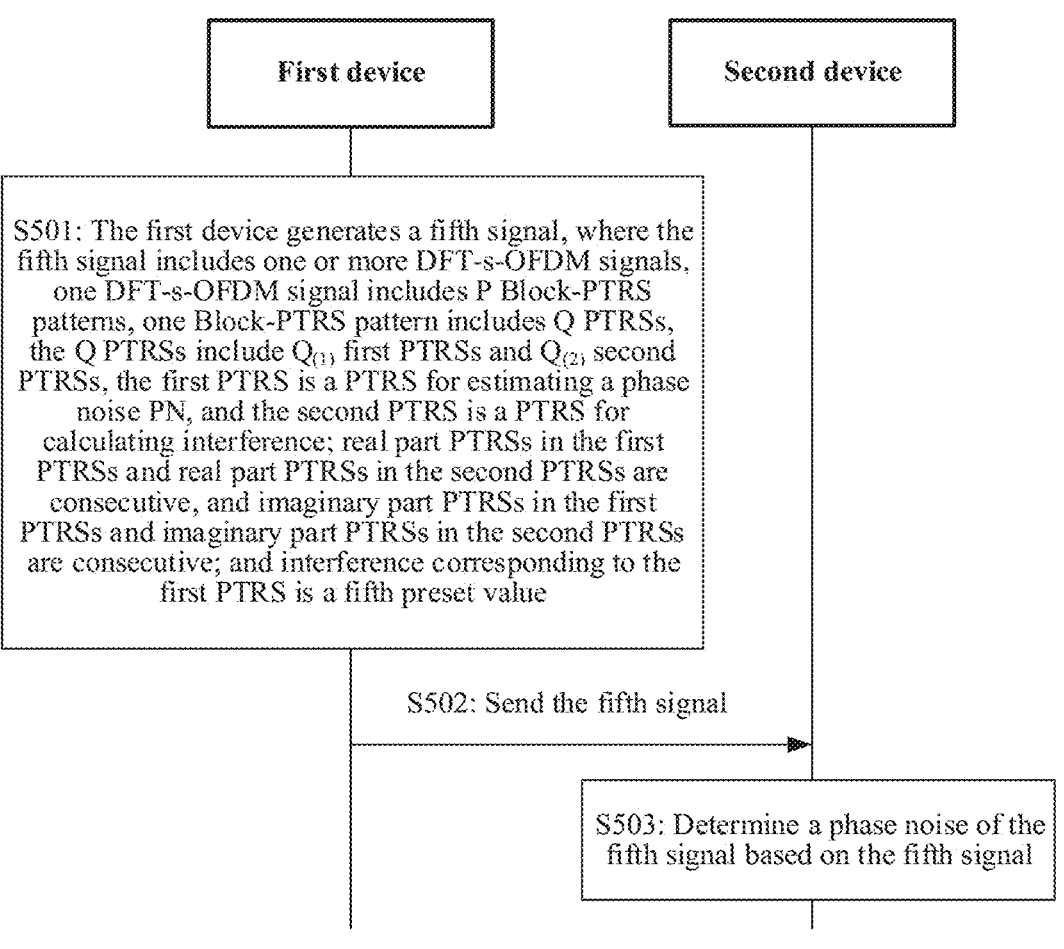

S501: The first device generates a fifth signal, where the fifth signal includes one or more DFT-s-OFDM signals, one DFT-s-OFDM signal includes P Block-PTRS patterns, one Block-PTRS pattern includes Q PTRSs, the Q PTRSs include $Q_{(1)}$ first PTRSs and $Q_{(2)}$ second PTRSs, the first PTRS is a PTRS for estimating a phase noise PN, and the second PTRS is a PTRS for calculating interference; real part PTRSs in the first PTRSs and real part PTRSs in the second PTRSs are consecutive, and imaginary part PTRSs in the first PTRSs and imaginary part PTRSs in the second PTRSs are consecutive; and interference corresponding to the first PTRS is a fifth preset value S502: Send the fifth signal S503: Determine a phase noise of the fifth signal based on the fifth signal

FIG. 22

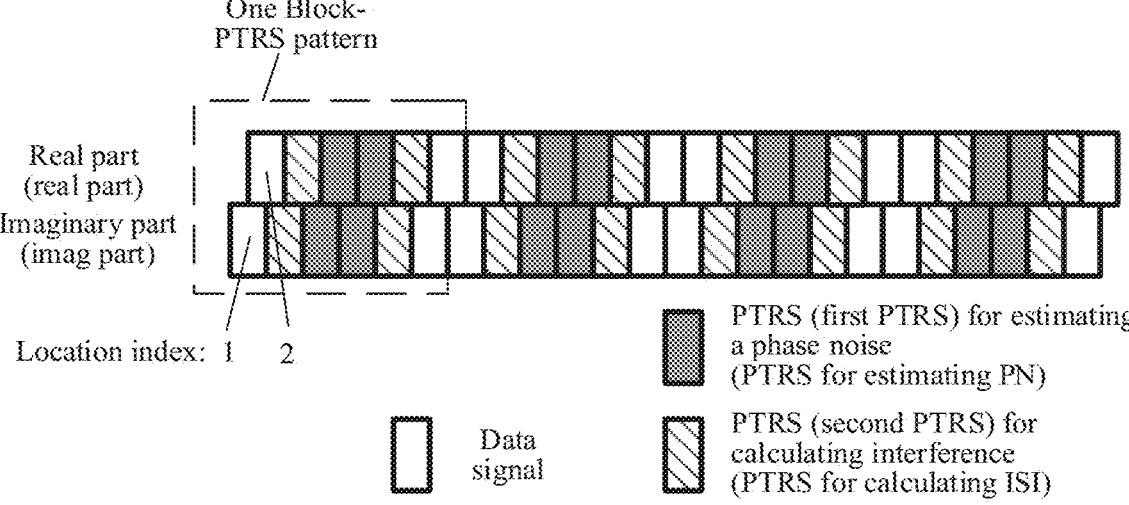

One Block-PTRS pattern

Real part (real part)

Imaginary part (imag part)

Location index: 1    2

Data signal

PTRS (first PTRS) for estimating a phase noise (PTRS for estimating PN)

PTRS (second PTRS) for calculating interference (PTRS for calculating ISI)

FIG. 23

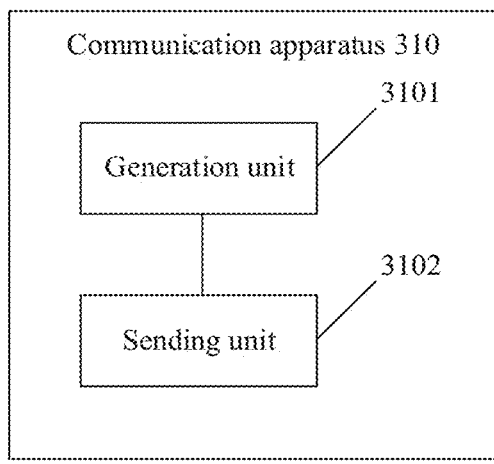
FIG. 31
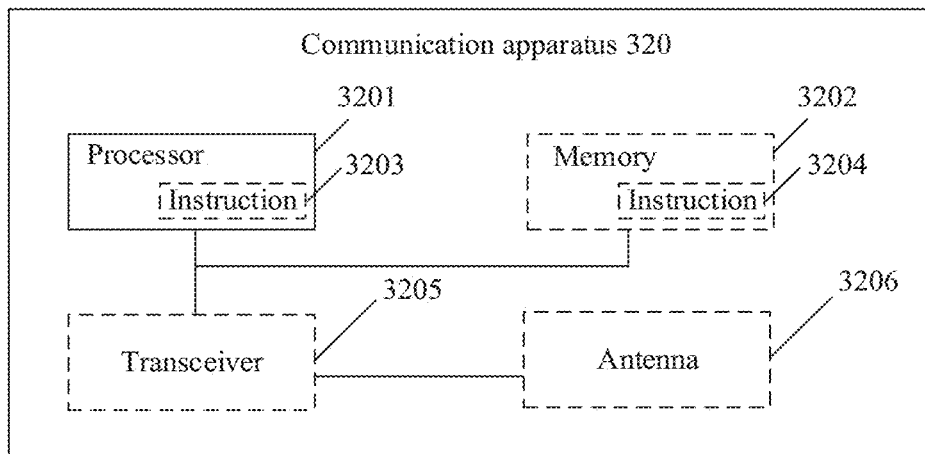
FIG. 32
FIG. 33

PHASE NOISE SUPPRESSION METHOD AND RELATED APPARATUS

CROSS-REFERENCE TO RELATED APPLICATIONS

This application is a continuation of International Application No. PCT/CN2021/137841, filed on Dec. 14, 2021, which claims priority to Chinese Patent Application No. 202110708077.4, filed on Jun. 24, 2021 and Chinese Patent Application No. 202011468132.9, filed on Dec. 14, 2020. All of the aforementioned patent applications are hereby incorporated by reference in their entireties.

TECHNICAL FIELD

This application relates to the field of communications technologies, and in particular, to a phase noise suppression method and a related apparatus.

BACKGROUND

High frequency bands (frequency bands higher than 6G, mainly including 28G, 39G, 60G, and 73G) with rich frequency band resources have become a hot research and development topic in the industry to satisfy increasing communication requirements. The high frequency bands can provide a large bandwidth and a highly integrated antenna array for communication to achieve a high throughput. However, a phase noise (PHN) problem in the high frequency bands is very prominent. At present, a phase tracking reference signal (Phase-Tracking Reference Signal, PTRS) is introduced in high frequency band communication of the fifth generation mobile communication technology (5G), and is used for phase noise estimation and compensation.

To further reduce a peak-to-average power ratio (peak-to-average power ratio, PAPR) in the high frequency band communication, a communication signal may be transmitted in a high frequency band communication scenario by separating a real part and an imaginary part. However, because the real part signal and the imaginary part signal of the communication signal are separated, the real part signal affects a phase noise of the imaginary part signal, and the imaginary part signal affects a phase noise of the real part signal. In this manner, phase noises cannot be determined effectively.

SUMMARY

This application provides a phase noise suppression method and a related apparatus, to effectively determine a phase noise in a DFT-s-OFDM signal.

According to a first aspect, this application provides a phase noise suppression method. The method includes: A first device generates a first signal, where the first signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ real part PTRSs and $Q_{(2)}$ imaginary part PTRSs, where $Q_{(1)}$ is an even number, $Q_{(2)}$ is an odd number, and $Q_{(2)}$ is less than $Q_{(1)}$; or $Q_{(1)}$ is an odd number, $Q_{(2)}$ is an even number, and $Q_{(2)}$ is greater than $Q_{(1)}$; and a central location of location indexes of the $Q_{(1)}$ real part PTRSs is the same as a central location of location indexes of the $Q_{(2)}$ imaginary part PTRSs; and the first device sends the first signal to a second device. In this method, based on the even number of imaginary part PTRSs or the even number of real part PTRSs in the first signal, a symbol of interference received by the first signal may be determined. When the symbol of the interference is determined, a phase noise of the first signal may be solved.

With reference to the first aspect, in a possible implementation, when $Q_{(1)}$ is an even number and $Q_{(2)}$ is an odd number, phases of the $Q_{(1)}$ real part PTRSs are the same; and when $Q_{(1)}$ is an odd number and $Q_{(2)}$ is an even number, phases of the $Q_{(2)}$ imaginary part PTRSs are the same.

With reference to the first aspect, in a possible implementation, when $Q_{(1)}$ is an even number and $Q_{(2)}$ is an odd number, amplitudes of the $Q_{(1)}$ real part PTRSs are the same; and when $Q_{(1)}$ is an odd number and $Q_{(2)}$ is an even number, amplitudes of the $Q_{(2)}$ imaginary part PTRSs are the same.

With reference to the first aspect, in a possible implementation, the phases of the $Q_{(1)}$ real part PTRSs are the same, and the phases of the $Q_{(2)}$ imaginary part PTRSs are the same.

With reference to the first aspect, in a possible implementation, that $Q_{(1)}$ is an even number and $Q_{(2)}$ is an odd number includes: $Q_{(1)}$ is 2 and $Q_{(2)}$ is 1; and that $Q_{(1)}$ is an odd number and $Q_{(2)}$ is an even number includes: $Q_{(1)}$ is 1 and $Q_{(2)}$ is 2.

According to a second aspect, an embodiment of this application provides another phase noise suppression method. The method includes: A first device generates a second signal, where the second signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ real part PTRSs and $Q_{(2)}$ imaginary part PTRSs; and interference corresponding to the $Q_{(1)}$ real part PTRSs is a first preset value, the interference corresponding to the $Q_{(1)}$ real part PTRSs is generated based on the $Q_{(2)}$ imaginary part PTRSs, and $Q_{(1)}$ is less than or equal to $Q_{(2)}$; or interference corresponding to the $Q_{(2)}$ imaginary part PTRSs is a second preset value, the interference corresponding to the $Q_{(2)}$ imaginary part PTRSs is generated based on the $Q_{(1)}$ real part PTRSs, and $Q_{(1)}$ is greater than or equal to $Q_{(2)}$; and the first device sends the second signal to a second device. In this method, the interference corresponding to the $Q_{(1)}$ real part PTRSs is the first preset value, or the interference corresponding to the $Q_{(2)}$ imaginary part PTRSs is the second preset value. When the value of the interference is determined, a phase noise of the second signal may be solved.

With reference to the second aspect, in a possible implementation, that the interference corresponding to the $Q_{(1)}$ real part PTRSs is the first preset value includes: the interference value corresponding to the $Q_{(1)}$ real part PTRSs is the first preset value, or an amplitude of the interference value corresponding to the $Q_{(1)}$ real part PTRSs is the first preset value; and that the interference corresponding to the $Q_{(2)}$ imaginary part PTRSs is the second preset value includes: the interference value corresponding to the $Q_{(2)}$ imaginary part PTRSs is the second preset value, or an amplitude of the interference value corresponding to the $Q_{(2)}$ imaginary part PTRSs is the second preset value.

With reference to the second aspect, in a possible implementation, the one Block-PTRS pattern further includes an imaginary part data signal and a real part data signal, that interference corresponding to the $Q_{(1)}$ real part PTRSs is generated based on the $Q_{(2)}$ imaginary part PTRSs includes:

the interference corresponding to the $Q_{(1)}$ real part PTRSs is generated based on the $Q_{(2)}$ imaginary part PTRSs and the imaginary part data signal; or that interference corresponding to the $Q_{(2)}$ imaginary part PTRSs is generated based on the $Q_{(1)}$ real part PTRSs includes: the interference corresponding to the $Q_{(2)}$ imaginary part PTRSs is generated based on the $Q_{(1)}$ real part PTRSs and the real part data signal.

With reference to the second aspect, in a possible implementation, $Q_{(1)}$ is equal to $Q_{(2)}$, and a difference between a central location of the location indexes of the $Q_{(1)}$ real part PTRSs and a central location of the location indexes of the $Q_{(2)}$ imaginary part PTRSs is one unit location.

With reference to the second aspect, in a possible implementation, the first preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt(170), j3/sqrt(170), j9/sqrt(648), j7/sqrt(648), j5/sqrt(648), andj3/sqrt(648); or the second preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt(170), j3/sqrt(170), j9/sqrt(648), j7/sqrt(648), j5/sqrt(648), and j3/sqrt(648).

With reference to the second aspect, in a possible implementation, the first preset value and the second preset value are determined based on a receiver type.

With reference to the second aspect, in a possible implementation, before the first device generates the second signal, the method further includes: The first device obtains first indication information sent by the second device, where the first indication information indicates the receiver type.

With reference to the second aspect, in a possible implementation, the method further includes: The first device sends second indication information to the second device, where the second indication information indicates the receiver type.

With reference to the second aspect, in a possible implementation, when the interference corresponding to the $Q_{(1)}$ real part PTRSs is the first preset value, energy of each of the $Q_{(2)}$ imaginary part PTRSs is less than a third preset value; and when the interference corresponding to the $Q_{(2)}$ imaginary part PTRSs is the second preset value, energy of each of the $Q_{(1)}$ real part PTRSs is less than a fourth preset value.

With reference to the second aspect, in a possible implementation, that energy of each of the $Q_{(2)}$ imaginary part PTRSs is less than a third preset value includes: an amplitude of each of the $Q_{(2)}$ imaginary part PTRSs is less than the third preset value; and that energy of each of the $Q_{(1)}$ real part PTRSs is less than a fourth preset value includes: an amplitude of each of the $Q_{(1)}$ real part PTRSs is less than the fourth preset value.

With reference to the second aspect, in a possible implementation, when the interference corresponding to the $Q_{(1)}$ real part PTRSs is the first preset value, $Q_{(2)}$ is an even number; and when the interference corresponding to the $Q_{(2)}$ imaginary part PTRSs is the second preset value, $Q_{(1)}$ is an even number.

According to a third aspect, an embodiment of this application provides another phase noise suppression method. The method includes: A first device sends indication information to a second device, where the indication information indicates a quantity of consecutive phase noise tracking pilot signals PTRSs whose amplitudes are 0 and that are included in one block-phase noise tracking pilot signal Block-PTRS pattern in a third signal; and the third signal includes one or more discrete Fourier transform-spread orthogonal frequency division multiplexing DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is an even number, $Q_{(2)}$ is an odd number, $Q_{(2)}$ is less than $Q_{(1)}$, amplitudes of the $Q_{(1)}$ real part PTRSs are 0, and the quantity of the phase noise tracking pilot signals PTRSs whose amplitudes are 0 is $Q_{(1)}$; or $Q_{(1)}$ is an odd number, $Q_{(2)}$ is an even number, $Q_{(2)}$ is greater than $Q_{(1)}$, amplitudes of the $Q_{(2)}$ imaginary part PTRSs are 0, and the quantity of the phase noise tracking pilot signals PTRSs whose amplitudes are 0 is $Q_{(2)}$; and a central location of location indexes of the $Q_{(1)}$ real part PTRSs is the same as a central location of location indexes of the $Q_{(2)}$ imaginary part PTRSs; and the first device generates the third signal; and the first device sends the third signal to the second device. In this method, interference caused by the even number of imaginary part PTRSs to the odd number of real part PTRSs is 0, or interference caused by the even number of real part PTRSs to the odd number of imaginary part PTRSs is 0. When the value of the interference is 0, a phase noise of the third signal may be solved.

With reference to the third aspect, in a possible implementation, the quantity of the PTRSs whose amplitudes are 0 and that are included in the one Block-PTRS pattern is determined based on a quantity of orders of signal components of a filter of the first device.

According to a fourth aspect, this application provides a phase noise suppression method. The method includes: A first device sends indication information to a second device, where the indication information indicates a quantity of consecutive imaginary part data signals and imaginary part PTRSs included in one block-phase noise tracking pilot signal Block-PTRS pattern in a fourth signal, and the imaginary part data signals and the imaginary part PTRSs have opposite phases and a same amplitude; or the indication information indicates a quantity of consecutive real part data signals and real part PTRSs included in one Block-PTRS pattern in a fourth signal, and the real part data signals and the real part PTRSs have opposite phases and a same amplitude; and the fourth signal includes one or more discrete Fourier transform-spread orthogonal frequency division multiplexing DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is 1, and a central location of location indexes of the $Q_{(2)}$ imaginary part PTRSs and the imaginary part data signals is the same as a central location of location indexes of the $Q_{(1)}$ real part PTRSs; or $Q_{(2)}$ is 1, and a central location of location indexes of the $Q_{(1)}$ real part PTRSs and the real part data signals is the same as a central location of location indexes of the $Q_{(2)}$ imaginary part PTRSs; the first device generates the fourth signal; and the first device sends the fourth signal to the second device. In this method, a total value of interference caused to the $Q_{(1)}$ real part PTRSs is 0, or a total value of interference caused to the $Q_{(2)}$ imaginary part PTRSs is 0. When the value of the interference is 0, a phase noise of the fourth signal may be solved.

With reference to the fourth aspect, in a possible implementation, the quantity of the consecutive data signals and first PTRSs is determined based on a quantity of orders of signal components of a filter of the first device.

According to a fifth aspect, this application provides a phase noise suppression method. The method includes: A first device generates a fifth signal, where the fifth signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ first PTRSs and $Q_{(2)}$ second PTRSs; the first PTRS includes a real part PTRS, and the second PTRS includes an imaginary part PTRS; the first PTRS includes an imaginary part PTRS, and the second PTRS includes a real part PTRS; or each of the first PTRS and the second PTRS includes a real part PTRS and an imaginary part PTRS; and interference or an amplitude of interference corresponding to the first PTRS is a fifth preset value, where if the first PTRS includes a real part PTRS and the second PTRS includes an imaginary part PTRS, or the first PTRS includes an imaginary part PTRS and the second PTRS includes a real part PTRS, the interference corresponding to the first PTRS is generated based on the second PTRS; or if each of the first PTRS and the second PTRS includes a real part PTRS and an imaginary part PTRS, interference corresponding to the real part PTRS in the first PTRS is generated based on the imaginary part PTRS in the first PTRS and the imaginary part PTRS in the second PTRS, and interference corresponding to the imaginary part PTRS in the first PTRS is generated based on the real part PTRS in the first PTRS and the real part PTRS in the second PTRS; and the first device sends the fifth signal to a second device.

With reference to the fifth aspect, in a possible implementation, the one block-PTRS pattern includes four PTRSs, and the four PTRSs include two first PTRSs and two second PTRSs, where location indexes of the four PTRSs are four consecutive locations; and the location indexes of the first PTRSs are in a second location and a fourth location, and the location indexes of the second PTRSs are in a first location and a third location; the location indexes of the first PTRSs are in a third location and a fourth location, and the location indexes of the second PTRSs are in a first location and a second location; the location indexes of the first PTRSs are in a second location and a third location, and the location indexes of the second PTRSs are in a first location and a fourth location; the location indexes of the first PTRSs are in a first location and a fourth location, and the location indexes of the second PTRSs are in a second location and a third location; the location indexes of the first PTRSs are in a first location and a third location, and the location indexes of the second PTRSs are in a second location and a fourth location; or the location indexes of the first PTRSs are in a first location and a second location, and the location indexes of the second PTRSs are in a third location and a fourth location.

With reference to the fifth aspect, in a possible implementation, the one block-PTRS pattern includes eight PTRSs, and the eight PTRSs include four first PTRSs and four second PTRSs, where location indexes of the eight PTRSs are eight consecutive locations; and the location indexes of the first PTRSs are in a second location, a fourth location, a fifth location, and a seventh location, and the location indexes of the second PTRSs are in a first location, a third location, a sixth location, and an eighth location; the location indexes of the first PTRSs are in a second location, a fourth location, a fifth location, and a sixth location, and the location indexes of the second PTRSs are in a first location, a third location, a seventh location, and an eighth location; the location indexes of the first PTRSs are in a second location, a third location, a fourth location, and a fifth location, and the location indexes of the second PTRSs are in a first location, a sixth location, a seventh location, and an eighth location; the location indexes of the first PTRSs are in a third location, a fourth location, a fifth location, and a sixth location, and the location indexes of the second PTRSs are in a first location, a second location, a seventh location, and an eighth location; the location indexes of the first PTRSs are in a third location, a fourth location, a fifth location, and a seventh location, and the location indexes of the second PTRSs are in a first location, a second location, a sixth location, and an eighth location; or the location indexes of the first PTRSs are in a fourth location, a fifth location, a sixth location, and a seventh location, and the location indexes of the second PTRSs are in a first location, a second location, a third location, and an eighth location.

With reference to the fifth aspect, in a possible implementation, the one Block-PTRS pattern further includes an imaginary part data signal and a real part data signal; and if the first PTRS includes a real part PTRS and the second PTRS includes an imaginary part PTRS, that the interference corresponding to the first PTRS is generated based on the second PTRS includes: the interference corresponding to the first PTRS is generated based on the second PTRS and the imaginary part data signal; if the first PTRS includes an imaginary part PTRS and the second PTRS includes a real part PTRS, that the interference corresponding to the first PTRS is generated based on the second PTRS includes: the interference corresponding to the first PTRS is generated based on the second PTRS and the real part data signal; or if each of the first PTRS and the second PTRS includes a real part PTRS and an imaginary part PTRS, that interference corresponding to the real part PTRS in the first PTRS is generated based on the imaginary part PTRS in the first PTRS and the imaginary part PTRS in the second PTRS, and interference corresponding to the imaginary part PTRS in the first PTRS is generated based on the real part PTRS in the first PTRS and the real part PTRS in the second PTRS includes: the interference corresponding to the real part PTRS in the first PTRS is generated based on the imaginary part PTRS in the first PTRS, the imaginary part PTRS in the second PTRS, and the imaginary part data signal, and the interference corresponding to the imaginary part PTRS in the first PTRS is generated based on the real part PTRS in the first PTRS, the real part PTRS in the second PTRS, and the real part data signal.

With reference to the fifth aspect, in a possible implementation, the fifth preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt(170), j3/sqrt(170), j9/sqrt(648), j7/sqrt(648), j5/sqrt(648), and j3/sqrt(648).

With reference to the fifth aspect, in a possible implementation, the fifth preset value is determined based on a receiver type.

With reference to the fifth aspect, in a possible implementation, when the interference or the amplitude of the interference corresponding to the first PTRS is the fifth preset value, energy of each of the second PTRSs is less than a sixth preset value.

With reference to the fifth aspect, in a possible implementation, that energy of each of the second PTRSs is less than a sixth preset value includes: an amplitude of each of the second PTRSs is less than the sixth preset value.

With reference to the fifth aspect, in a possible implementation, location indexes of a first part of PTRSs in the second PTRSs are first M locations in location indexes of the Q PTRSs, location indexes of a second part of PTRSs in the second PTRSs are last N locations in the location indexes of the Q PTRSs, and $N+M=Q_{(2)}$.

With reference to the fifth aspect, in a possible implementation, a quantity of real part PTRSs in the first PTRSs is equal to a quantity of imaginary part PTRSs in the first PTRSs, and a quantity of real part PTRSs in the second PTRSs is equal to a quantity of imaginary part PTRSs in the second PTRSs; and a central location of the location indexes of the first PTRSs is the same as a central location of the location indexes of the second PTRSs.

With reference to the fifth aspect, in a possible implementation, each of a quantity of real part PTRSs in the second PTRSs and a quantity of imaginary part PTRSs in the second PTRSs is 1; and a location index of the real part PTRS in the second PTRSs is a maximum value of location indexes of the Q PTRSs, and a location index of the imaginary part PTRS in the second PTRSs is a minimum value of the location indexes of the Q PTRSs; or a location index of the real part PTRS in the second PTRSs is a minimum value of location indexes of the Q PTRSs, and a location index of the imaginary part PTRS in the second PTRSs is a maximum value of the location indexes of the Q PTRSs.

With reference to the fifth aspect, in a possible implementation, $Q_{(1)}$ is equal to $Q_{(2)}$, and a difference between a central location of the location indexes of the $Q_{(1)}$ first PTRSs and a central location of the location indexes of the $Q_{(2)}$ second PTRSs is one unit location.

With reference to the fifth aspect, in a possible implementation, when the interference or the amplitude of the interference corresponding to the first PTRS is the fifth preset value, $Q_{(2)}$ is an even number.

With reference to the fifth aspect, in a possible implementation, before the first device generates the fifth signal, the method further includes: The first device obtains first indication information sent by the second device, where the first indication information indicates the receiver type.

With reference to the fifth aspect, in a possible implementation, the method further includes: The first device sends second indication information to the second device, where the second indication information indicates the receiver type. With reference to the fifth aspect, in a possible implementation, $Q_{(1)}$ is less than or equal to $Q_{(2)}$.

With reference to the fifth aspect, in a possible implementation, the method further includes: The first device selects a first location index subset from to-be-selected location index sets, where the location index set includes a plurality of location index subsets, and each location index subset indicates a location index of each PTRS of the first PTRSs and the second PTRSs, where a sum of a first value and a second value that correspond to the first location index subset is not greater than a sum of a first value and a second value that correspond to a second location index subset, where the first value is a sum of absolute values of differences between location indexes of real part PTRSs in the first PTRSs and location indexes of imaginary part PTRSs in the second PTRSs, and the second value is a sum of absolute values of differences between location indexes of imaginary part PTRSs in the first PTRSs and location indexes of real part PTRSs in the second PTRSs; or a third value corresponding to the first location index subset is not greater than a third value corresponding to the second location index, where the third value is a sum of absolute values of differences between location indexes of the first PTRSs and an average value of the location indexes of the first PTRSs and the location indexes of the second PTRSs; and the second location index subset is a location index subset other than the first location index subset in the to-be-selected location index sets; and the first device sends indication information to the second device, where the indication information indicates the first location index subset.

According to a sixth aspect, this application provides another phase noise suppression method. The method includes: A first device generates a sixth signal, where the sixth signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ real part PTRSs and $Q_{(2)}$ imaginary part PTRSs; and interference corresponding to the Q PTRSs is a seventh preset value, interference corresponding to the $Q_{(1)}$ real part PTRSs is generated based on the $Q_{(2)}$ imaginary part PTRSs, and interference corresponding to the $Q_{(2)}$ imaginary part PTRSs is generated based on the $Q_{(1)}$ real part PTRSs; and the first device sends the sixth signal to a second device. In this method, interference corresponding to the Q PTRSs is a seventh preset value. When the value of the interference is determined, a phase noise of the sixth signal may be solved.

With reference to the sixth aspect, in a possible implementation, the one Block-PTRS pattern further includes an imaginary part data signal and a real part data signal, that interference corresponding to the $Q_{(1)}$ real part PTRSs is generated based on the $Q_{(2)}$ imaginary part PTRSs includes: the interference corresponding to the $Q_{(1)}$ real part PTRSs is generated based on the $Q_{(2)}$ imaginary part PTRSs and the imaginary part data signal; and that interference corresponding to the $Q_{(2)}$ imaginary part PTRSs is generated based on the $Q_{(1)}$ real part PTRSs includes: the interference corresponding to the $Q_{(2)}$ imaginary part PTRSs is generated based on the $Q_{(1)}$ real part PTRSs and the real part data signal.

With reference to the sixth aspect, in a possible implementation, the seventh preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt(170), j3/sqrt(170), j9/sqrt(648), j7/sqrt(648), j5/sqrt(648), and j3/sqrt(648).

With reference to the sixth aspect, in a possible implementation, energy of each of the PTRSs is less than an eighth preset value.

According to a seventh aspect, this application provides a communication apparatus. The communication apparatus includes a generation unit and a sending unit, where the generation unit is configured to generate a first signal, where the first signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ real part PTRSs and $Q_{(2)}$ imaginary part PTRSs, where $Q_{(1)}$ is an even number, $Q_{(2)}$ is an odd number, and $Q_{(2)}$ is less than $Q_{(1)}$; or $Q_{(1)}$ is an odd number, $Q_{(2)}$ is an even number, and $Q_{(2)}$ is greater than $Q_{(1)}$; and a central location of location indexes of the $Q_{(1)}$ real part PTRSs is the same as a central location of location indexes of the $Q_{(2)}$ imaginary part PTRSs; and the sending unit is configured to send the first signal to a second device.

With reference to the seventh aspect, in a possible implementation, when $Q_{(1)}$ is an even number and $Q_{(2)}$ is an odd number, phases of the $Q_{(1)}$ real part PTRSs are the same; and when $Q_{(1)}$ is an odd number and $Q_{(2)}$ is an even number, phases of the $Q_{(2)}$ imaginary part PTRSs are the same.

With reference to the seventh aspect, in a possible implementation, when $Q_{(1)}$ is an even number and $Q_{(2)}$ is an odd number, amplitudes of the $Q_{(1)}$ real part PTRSs are the same; and when $Q_{(1)}$ is an odd number and $Q_{(2)}$ is an even number, amplitudes of the $Q_{(2)}$ imaginary part PTRSs are the same.

With reference to the seventh aspect, in a possible implementation, the phases of the $Q_{(1)}$ real part PTRSs are the same, and the phases of the $Q_{(2)}$ imaginary part PTRSs are the same.

With reference to the seventh aspect, in a possible implementation, that $Q_{(1)}$ is an even number and $Q_{(2)}$ is an odd number includes: $Q_{(1)}$ is 2 and $Q_{(2)}$ is 1; and that $Q_{(1)}$ is an odd number and $Q_{(2)}$ is an even number includes: $Q_{(1)}$ is 1 and $Q_{(2)}$ is 2.

According to an eighth aspect, this application provides another communication apparatus. The communication apparatus includes a generation unit and a sending unit, where the generation unit is configured to generate a second signal, where the second signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ real part PTRSs and $Q_{(2)}$ imaginary part PTRSs, where interference corresponding to the $Q_{(1)}$ real part PTRSs is a first preset value, the interference corresponding to the $Q_{(1)}$ real part PTRSs is generated based on the $Q_{(2)}$ imaginary part PTRSs, and $Q_{(1)}$ is less than or equal to $Q_{(2)}$; or interference corresponding to the $Q_{(2)}$ imaginary part PTRSs is a second preset value, the interference corresponding to the $Q_{(2)}$ imaginary part PTRSs is generated based on the $Q_{(1)}$ real part PTRSs, and $Q_{(1)}$ is greater than or equal to $Q_{(2)}$; and the sending unit is configured to send the second signal to a second device.

With reference to the eighth aspect, in a possible implementation, the one Block-PTRS pattern further includes an imaginary part data signal and a real part data signal, that interference corresponding to the $Q_{(1)}$ real part PTRSs is generated based on the $Q_{(2)}$ imaginary part PTRSs includes: the interference corresponding to the $Q_{(1)}$ real part PTRSs is generated based on the $Q_{(2)}$ imaginary part PTRSs and the imaginary part data signal; or that interference corresponding to the $Q_{(2)}$ imaginary part PTRSs is generated based on the $Q_{(1)}$ real part PTRSs includes: the interference corresponding to the $Q_{(2)}$ imaginary part PTRSs is generated based on the $Q_{(1)}$ real part PTRSs and the real part data signal.

With reference to the eighth aspect, in a possible implementation, when $Q_{(1)}$ is equal to $Q_{(2)}$, a difference between a central location of the location indexes of the $Q_{(1)}$ real part PTRSs and a central location of the location indexes of the $Q_{(2)}$ imaginary part PTRSs is one unit location.

With reference to the eighth aspect, in a possible implementation, the first preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt(170), j3/sqrt(170), j9/sqrt(648), j7/sqrt(648), j5/sqrt(648), and j3/sqrt(648); or the second preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt(170), j3/sqrt(170), j9/sqrt(648), j7/sqrt(648), j5/sqrt(648), and j3/sqrt(648).

With reference to the eighth aspect, in a possible implementation, when the interference corresponding to the $Q_{(1)}$ real part PTRSs is the first preset value, energy of each of the $Q_{(2)}$ imaginary part PTRSs is less than a third preset value; and when the interference corresponding to the $Q_{(2)}$ imaginary part PTRSs is the second preset value, energy of each of the $Q_{(1)}$ real part PTRSs is less than a fourth preset value.

With reference to the eighth aspect, in a possible implementation, when the interference corresponding to the $Q_{(1)}$ real part PTRSs is the first preset value, $Q_{(2)}$ is an even number; and when the interference corresponding to the $Q_{(2)}$ imaginary part PTRSs is the second preset value, $Q_{(1)}$ is an even number.

According to a ninth aspect, an embodiment of this application provides another communication apparatus. The communication apparatus includes a generation unit and a sending unit, where the sending unit is configured to send indication information to a second device, where the indication information indicates a quantity of consecutive phase noise tracking pilot signals PTRSs whose amplitudes are 0 and that are included in one block-phase noise tracking pilot signal Block-PTRS pattern in a third signal. The third signal includes one or more discrete Fourier transform-spread orthogonal frequency division multiplexing DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is an even number, $Q_{(2)}$ is an odd number, $Q_{(2)}$ is less than $Q_{(1)}$, amplitudes of the $Q_{(1)}$ real part PTRSs are 0, and the quantity of the phase noise tracking pilot signals PTRSs whose amplitudes are 0 is $Q_{(1)}$; or $Q_{(1)}$ is an odd number, $Q_{(2)}$ is an even number, $Q_{(2)}$ is greater than $Q_{(1)}$, amplitudes of the $Q_{(2)}$ imaginary part PTRSs are 0, and the quantity of the phase noise tracking pilot signals PTRSs whose amplitudes are 0 is $Q_{(2)}$; and a central location of location indexes of the $Q_{(1)}$ real part PTRSs is the same as a central location of location indexes of the $Q_{(2)}$ imaginary part PTRSs; and the generation unit is configured to generate the third signal; and the sending unit is further configured to send the third signal to the second device.

With reference to the ninth aspect, in a possible implementation, the quantity of the PTRSs whose amplitudes are 0 and that are included in the one Block-PTRS pattern is determined based on a quantity of orders of signal components of a filter of the first device.

According to a tenth aspect, this application provides another communication apparatus. The communication apparatus includes a generation unit and a sending unit, where the sending unit is configured to send indication information to a second device. The indication information indicates a quantity of consecutive imaginary part data signals and imaginary part PTRSs included in one block-phase noise tracking pilot signal Block-PTRS pattern in a fourth signal, and the imaginary part data signals and the imaginary part PTRSs have opposite phases and a same amplitude; or the indication information indicates a quantity of consecutive real part data signals and real part PTRSs included in one Block-PTRS pattern in a fourth signal, and the real part data signals and the real part PTRSs have opposite phases and a same amplitude. The fourth signal includes one or more discrete Fourier transform-spread orthogonal frequency division multiplexing DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is 1, and a central location of location indexes of the $Q_{(2)}$ imaginary part PTRSs and the imaginary part data signals is the same as a central location of location indexes of the $Q_{(1)}$ real part PTRSs; or $Q_{(2)}$ is 1, and a central location of location indexes of the $Q_{(1)}$ real part PTRSs and the real part data signals is the same as a central location of location indexes of the $Q_{(2)}$ imaginary part PTRSs; the generation unit is configured to generate the fourth signal; and the sending unit is further configured to send the fourth signal to the second device.

With reference to the tenth aspect, in a possible implementation, the quantity of the consecutive data signals and first PTRSs is determined based on a quantity of orders of signal components of a filter of the first device.

According to an eleventh aspect, this application provides another communication apparatus. The communication apparatus includes a generation unit and a sending unit, where the generation unit is configured to generate a fifth signal, where the fifth signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ first PTRSs and $Q_{(2)}$ second PTRSs; the first PTRS includes a real part PTRS, and the second PTRS includes an imaginary part PTRS; the first PTRS includes an imaginary part PTRS, and the second PTRS includes a real part PTRS; or each of the first PTRS and the second PTRS includes a real part PTRS and an imaginary part PTRS; and interference or an amplitude of interference corresponding to the first PTRS is a fifth preset value, where if the first PTRS includes a real part PTRS and the second PTRS includes an imaginary part PTRS, or the first PTRS includes an imaginary part PTRS and the second PTRS includes a real part PTRS, the interference corresponding to the first PTRS is generated based on the second PTRS; or if each of the first PTRS and the second PTRS includes a real part PTRS and an imaginary part PTRS, interference corresponding to the real part PTRS in the first PTRS is generated based on the imaginary part PTRS in the first PTRS and the imaginary part PTRS in the second PTRS, and interference corresponding to the imaginary part PTRS in the first PTRS is generated based on the real part PTRS in the first PTRS and the real part PTRS in the second PTRS; and the sending unit is configured to send the fifth signal to a second device.

With reference to the eleventh aspect, in a possible implementation, that one Block-PTRS pattern includes Q phase noise tracking pilot signals PTRSs and the Q PTRSs include $Q_{(1)}$ first PTRSs and $Q_{(2)}$ second PTRSs includes: the one block-PTRS pattern includes four PTRSs, and the four PTRSs include two first PTRSs and two second PTRSs, where location indexes of the four PTRSs are four consecutive locations; and the location indexes of the first PTRSs are in a second location and a fourth location, and the location indexes of the second PTRSs are in a first location and a third location; the location indexes of the first PTRSs are in a third location and a fourth location, and the location indexes of the second PTRSs are in a first location and a second location; the location indexes of the first PTRSs are in a second location and a third location, and the location indexes of the second PTRSs are in a first location and a fourth location; the location indexes of the first PTRSs are in a first location and a fourth location, and the location indexes of the second PTRSs are in a second location and a third location; the location indexes of the first PTRSs are in a first location and a third location, and the location indexes of the second PTRSs are in a second location and a fourth location; or the location indexes of the first PTRSs are in a first location and a second location, and the location indexes of the second PTRSs are in a third location and a fourth location.

With reference to the eleventh aspect, in a possible implementation, that one Block-PTRS pattern includes Q phase noise tracking pilot signals PTRSs and the Q PTRSs include $Q_{(1)}$ first PTRSs and $Q_{(2)}$ second PTRSs includes: the one block-PTRS pattern includes eight PTRSs, and the eight PTRSs include four first PTRSs and four second PTRSs, where location indexes of the eight PTRSs are eight consecutive locations; and the location indexes of the first PTRSs are in a second location, a fourth location, a fifth location, and a seventh location, and the location indexes of the second PTRSs are in a first location, a third location, a sixth location, and an eighth location; the location indexes of the first PTRSs are in a second location, a fourth location, a fifth location, and a sixth location, and the location indexes of the second PTRSs are in a first location, a third location, a seventh location, and an eighth location; the location indexes of the first PTRSs are in a second location, a third location, a fourth location, and a fifth location, and the location indexes of the second PTRSs are in a first location, a sixth location, a seventh location, and an eighth location; the location indexes of the first PTRSs are in a third location, a fourth location, a fifth location, and a sixth location, and the location indexes of the second PTRSs are in a first location, a second location, a seventh location, and an eighth location; the location indexes of the first PTRSs are in a third location, a fourth location, a fifth location, and a seventh location, and the location indexes of the second PTRSs are in a first location, a second location, a sixth location, and an eighth location; or the location indexes of the first PTRSs are in a fourth location, a fifth location, a sixth location, and a seventh location, and the location indexes of the second PTRSs are in a first location, a second location, a third location, and an eighth location.

With reference to the eleventh aspect, in a possible implementation, the one Block-PTRS pattern further includes an imaginary part data signal and a real part data signal; and if the first PTRS includes a real part PTRS and the second PTRS includes an imaginary part PTRS, that the interference corresponding to the first PTRS is generated based on the second PTRS includes: the interference corresponding to the first PTRS is generated based on the second PTRS and the imaginary part data signal; if the first PTRS includes an imaginary part PTRS and the second PTRS includes a real part PTRS, that the interference corresponding to the first PTRS is generated based on the second PTRS includes: the interference corresponding to the first PTRS is generated based on the second PTRS and the real part data signal; or if each of the first PTRS and the second PTRS includes a real part PTRS and an imaginary part PTRS, that interference corresponding to the real part PTRS in the first PTRS is generated based on the imaginary part PTRS in the first PTRS and the imaginary part PTRS in the second PTRS, and interference corresponding to the imaginary part PTRS in the first PTRS is generated based on the real part PTRS in the first PTRS and the real part PTRS in the second PTRS includes: the interference corresponding to the real part PTRS in the first PTRS is generated based on the imaginary part PTRS in the first PTRS, the imaginary part PTRS in the second PTRS, and the imaginary part data signal, and the interference corresponding to the imaginary part PTRS in the first PTRS is generated based on the real part PTRS in the first PTRS, the real part PTRS in the second PTRS, and the real part data signal.

With reference to the eleventh aspect, in a possible implementation, the fifth preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt(170), j3/sqrt(170), j9/sqrt(648), j7/sqrt(648), j5/sqrt(648), and j3/sqrt(648).

With reference to the eleventh aspect, in a possible implementation, the fifth preset value is determined based on a receiver type.

With reference to the eleventh aspect, in a possible implementation, when the interference or the amplitude of the interference corresponding to the first PTRS is the fifth preset value, energy of each of the second PTRSs is less than a sixth preset value.

With reference to the eleventh aspect, in a possible implementation, that energy of each of the second PTRSs is less than a sixth preset value includes: an amplitude of each of the second PTRSs is less than the sixth preset value.

With reference to the eleventh aspect, in a possible implementation, $Q_{(1)}$ is equal to $Q_{(2)}$, and a difference between a central location of the location indexes of the $Q_{(1)}$ first PTRSs and a central location of the location indexes of the $Q_{(2)}$ second PTRSs is one unit location.

With reference to the eleventh aspect, in a possible implementation, when the interference or the amplitude of the interference corresponding to the first PTRS is the fifth preset value, $Q_{(2)}$ is an even number.

With reference to the eleventh aspect, in a possible implementation, location indexes of a first part of PTRSs in the second PTRSs are first M locations in location indexes of the Q PTRSs, location indexes of a second part of PTRSs in the second PTRSs are last N locations in the location indexes of the Q PTRSs, and $N+M=Q_{(2)}$.

With reference to the eleventh aspect, in a possible implementation, a quantity of real part PTRSs in the first PTRSs is equal to a quantity of imaginary part PTRSs in the first PTRSs, and a quantity of real part PTRSs in the second PTRSs is equal to a quantity of imaginary part PTRSs in the second PTRSs; and a central location of the location indexes of the first PTRSs is the same as a central location of the location indexes of the second PTRSs.

With reference to the eleventh aspect, in a possible implementation, each of a quantity of real part PTRSs in the second PTRSs and a quantity of imaginary part PTRSs in the second PTRSs is 1; and a location index of the real part PTRS in the second PTRSs is a maximum value of location indexes of the Q PTRSs, and a location index of the imaginary part PTRS in the second PTRSs is a minimum value of the location indexes of the Q PTRSs; or a location index of the real part PTRS in the second PTRSs is a minimum value of location indexes of the Q PTRSs, and a location index of the imaginary part PTRS in the second PTRSs is a maximum value of the location indexes of the Q PTRSs.

With reference to the eleventh aspect, in a possible implementation, $Q_{(1)}$ is less than or equal to $Q_{(2)}$.

With reference to the eleventh aspect, in a possible implementation, the generation unit is further configured to: select a first location index subset from to-be-selected location index sets, where the location index set includes a plurality of location index subsets, and each location index subset indicates a location index of each PTRS of the first PTRSs and the second PTRSs, where a sum of a first value and a second value that correspond to the first location index subset is not greater than a sum of a first value and a second value that correspond to a second location index subset, where the first value is a sum of absolute values of differences between location indexes of real part PTRSs in the first PTRSs and location indexes of imaginary part PTRSs in the second PTRSs, and the second value is a sum of absolute values of differences between location indexes of imaginary part PTRSs in the first PTRSs and location indexes of real part PTRSs in the second PTRSs; or a third value corresponding to the first location index subset is not greater than a third value corresponding to the second location index, where the third value is a sum of absolute values of differences between location indexes of the first PTRSs and an average value of the location indexes of the first PTRSs and the location indexes of the second PTRSs; and the second location index subset is a location index subset other than the first location index subset in the to-be-selected location index sets; and the sending unit is further configured to send indication information to the second device, where the indication information indicates the first location index subset.

According to a twelfth aspect, this application provides another communication apparatus. The communication apparatus includes a generation unit and a sending unit, where the generation unit is configured to generate a sixth signal, where the sixth signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ real part PTRSs and $Q_{(2)}$ imaginary part PTRSs; and interference corresponding to the Q PTRSs is a seventh preset value, interference corresponding to the $Q_{(1)}$ real part PTRSs is generated based on the $Q_{(2)}$ imaginary part PTRSs, and interference corresponding to the $Q_{(2)}$ imaginary part PTRSs is generated based on the $Q_{(1)}$ real part PTRSs; and the sending unit is configured to send the sixth signal to a second device.

With reference to the twelfth aspect, in a possible implementation, the one Block-PTRS pattern further includes an imaginary part data signal and a real part data signal, that interference corresponding to the $Q_{(1)}$ real part PTRSs is generated based on the $Q_{(2)}$ imaginary part PTRSs includes: the interference corresponding to the $Q_{(1)}$ real part PTRSs is generated based on the $Q_{(2)}$ imaginary part PTRSs and the imaginary part data signal; and that interference corresponding to the $Q_{(2)}$ imaginary part PTRSs is generated based on the $Q_{(1)}$ real part PTRSs includes: the interference corresponding to the $Q_{(2)}$ imaginary part PTRSs is generated based on the $Q_{(1)}$ real part PTRSs and the real part data signal.

With reference to the twelfth aspect, in a possible implementation, the seventh preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt (170), j3/sqrt(170), j9/sqrt(648), j7/sqrt(648), j5/sqrt(648), and j3/sqrt(648).

With reference to the twelfth aspect, in a possible implementation, energy of each of the PTRSs is less than an eighth preset value.

According to a thirteenth aspect, this application provides another communication apparatus, including a processor. The processor is coupled to a memory; the memory is configured to store program code; and the processor is configured to invoke the program code from the memory to perform the method described in the first aspect or any possible implementation of the first aspect; perform the method described in the second aspect or any possible implementation of the second aspect; perform the method described in the third aspect or any possible implementation of the third aspect; perform the method described in the fourth aspect or any possible implementation of the fourth aspect; perform the method described in the fifth aspect or any possible implementation of the fifth aspect; or perform the method described in the sixth aspect or any possible implementation of the sixth aspect.

According to a fourteenth aspect, this application provides a computer program product. The computer program product includes a computer program or instructions, and when the computer program or the instructions is or are run on a computer, the computer is enabled to perform the method described in the first aspect or any possible implementation of the first aspect; perform the method described in the second aspect or any possible implementation of the second aspect; perform the method described in the third aspect or any possible implementation of the third aspect; perform the method described in the fourth aspect or any possible implementation of the fourth aspect; perform the method described in the fifth aspect or any possible implementation of the fifth aspect; or perform the method described in the sixth aspect or any possible implementation of the sixth aspect.

According to a fifteenth aspect, this application provides a computer-readable storage medium. The computer-readable storage medium is configured to store instructions, and when the instructions are executed, the method described in the first aspect or any possible implementation of the first aspect, the method described in the second aspect or any possible implementation of the second aspect, the method described in the third aspect or any possible implementation of the third aspect, the method described in the fourth aspect or any possible implementation of the fourth aspect, the method described in the fifth aspect or any possible implementation of the fifth aspect; or the method described in the sixth aspect or any possible implementation of the sixth aspect is implemented.

According to a sixteenth aspect, this application provides a chip system. The chip system includes at least one processor and an interface, configured to support a first device in implementing a function in the first aspect, the second aspect, the third aspect, the fourth aspect, the fifth aspect, or the sixth aspect, for example, generating or sending at least one of data and information in the foregoing method. In a possible design, the chip system further includes a memory, and the memory is configured to store program instructions and data that are necessary for the first device. The chip system may include a chip, or may include a chip and another discrete component.

In this embodiment of this application, the first device may send a DFT-s-OFDM signal to a second device, and the second device may determine a phase noise in the DFT-s-OFDM signal based on the received DFT-s-OFDM signal.

BRIEF DESCRIPTION OF DRAWINGS

To describe the technical solutions in embodiments of this application or the conventional technology more clearly, the following briefly describes the accompanying drawings required for describing the embodiments or the conventional technology.

FIG. 15 is a flowchart of another phase noise suppression method according to an embodiment of this application;

FIG. 20 is a flowchart of another phase noise suppression method according to an embodiment of this application;

FIG. 22 is a flowchart of another phase noise suppression method according to an embodiment of this application;

FIG. 23 to FIG. 25 are schematic diagrams of Block-PTRS patterns of some other DFT-s-OFDM signals according to an embodiment of this application;

FIG. 31 is a schematic diagram of a structure of a communication apparatus according to an embodiment of this application;

FIG. 32 is a schematic diagram of a structure of another communication apparatus according to an embodiment of this application; and FIG. 33 is a schematic diagram of a structure of a chip according to an embodiment of this application.

DESCRIPTION OF EMBODIMENTS

The following describes the technical solutions in embodiments of this application in more detail.

Terms used in the following embodiments of this application are merely intended to describe specific embodiments, but are not intended to limit this application. As used in the specification and the appended claims of the present application, the singular expressions "a", "one", "said", "the foregoing", "the", and "this" are intended to include also the plural expression, unless the context expressly indicates the contrary. It should be further understood that the term "and/or" as used in this application refers to and includes any or all possible combinations of one or more of the listed items.

It should be further understood that the first, the second, the third, the fourth, and the various numerical numbers in this specification are merely distinguished for ease of description, and are not intended to limit the scope of embodiments of this application.

Figure 1:
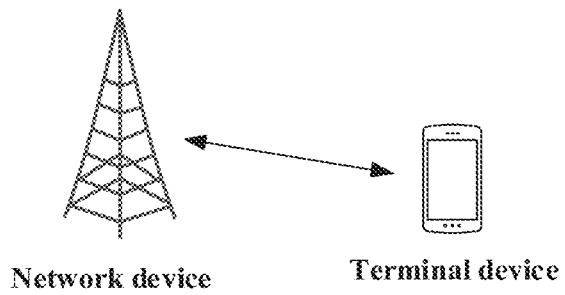
FIG. 1 is a schematic diagram of a network architecture according to an embodiment of this application.

Embodiments of this application may be applied to a network architecture shown in FIG. 1. The network architecture shown in FIG. 1 is a network architecture of a wireless communication system. The network architecture usually includes a terminal device and a network device. A quantity and a form of each device constitute no limitation on embodiments of this application. In this embodiment of this application, the terminal device and the network device may communicate with each other by using a single carrier.

It should be noted that the wireless communication system mentioned in embodiments of this application includes but is not limited to an Internet of Things (internet of things, IoT) system, a Long Term Evolution (long term evolution, LTE) system, a fifth generation mobile communication (5th-generation, 5G) system, a sixth generation mobile communication (6th-generation, 6G) system, and a future mobile communication system. In some embodiments, the technical solutions in embodiments of this application may be further applied to a wireless local area network (Wireless Local Area Network, WLAN) network, may be further applied to a Vehicle-to-X (Vehicle-to-X, V2X) network, may be further applied to a non-terrestrial network (non-terrestrial networks, NTN), a satellite and high-altitude platform (satellites and High-Altitude Platforms, HAP) network, an enhanced Internet of Things (LTE enhanced MTO, eMTC), and may be further applied to another network. In some other embodiments, the technical solutions in embodiments of this application may be further applied to a communication-radar integrated communication system, a terahertz communication system, a communication system with a higher frequency, and the like. This is not specifically limited in this application. The network device in embodiments of this application may be a base station (Base Station, BS). The base station may provide communication services for a plurality of terminal devices, or a plurality of base stations may provide communication services for a same terminal device. In this embodiment of this application, the base station is an apparatus deployed in a radio access network to provide a wireless communication function for a terminal device. The base station device may be a base station, a relay station, or an access point. The base station may be an eNB or an eNodeB (Evolved NodeB) in Long Term Evolution (Long Term Evolution, LTE). Alternatively, the base station device may be a radio controller in a cloud radio access network (Cloud Radio Access Network, CRAN) scenario. Alternatively, the base station device may be a base station device in a future 5G network or a network device in a future evolved PLMN network. Alternatively, the base station device may be a wearable device, an in-vehicle device, or the like. In this embodiment of this application, an apparatus configured to implement a function of a network device may be a network device; or may be an apparatus that can support the network device in implementing the function, for example, a chip system. The apparatus may be installed in the network device.

The terminal device in embodiments of this application may also be referred to as a terminal, and may be a device with wireless receiving and sending functions. The terminal device in embodiments of this application may include various user equipments (user equipment, UE) that have a wireless communication function, an access terminal, a UE unit, a UE station, a mobile site, a mobile station, a remote terminal, a mobile device, a UE terminal, a terminal, a wireless communication device, a UE agent, or a UE apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device with a wireless communication function, a computing device, another processing device connected to a wireless modem, an in-vehicle device, a wearable device, a terminal device in a future 5G network, a terminal device in a future evolved PLMN network, or the like. In this embodiment of this application, an apparatus configured to implement a function of a terminal may be a terminal; or may be an apparatus that can support the terminal in implementing the function, for example, a chip system. The apparatus may be installed in the terminal. In this embodiment of this application, the chip system may include a chip, or may include a chip and another discrete component.

Embodiments of this application may be applied to a device to device (device to device, D2D) system, a machine to machine (machine to machine, M2M) system, a vehicle to everything (vehicle to everything, V2X) system, or the like.

Embodiments of this application may be applied to a next-generation microwave scenario, an NR-based microwave scenario, an integrated access backhaul (integrated access backhaul, IAB) scenario, or the like.

Embodiments of this application may be applied to an uplink transmission scenario, that is, a scenario in which the terminal device sends an uplink signal to the network device; and may also be applied to a downlink transmission scenario, that is, a scenario in which the network device sends a downlink signal to the terminal device.

The network architecture and the service scenario described in embodiments of this application are intended to describe the technical solutions in embodiments of this application more clearly, but do not constitute a limitation on the technical solutions provided in embodiments of this application. A person of ordinary skill in the art may know that with evolution of the network architecture and emergence of a new service scenario, the technical solutions provided in embodiments of this application are also applicable to similar technical problems.

The following describes some concepts in embodiments of this application.

(1) Peak to Average Power Ratio (Peak to Average Power Ratio, PAPR)

A radio signal is a sine wave with a changing amplitude in time domain. The amplitude is not constant. An amplitude peak of the signal in one period is different from those in other periods. Therefore, average powers and peak powers of all periods are different. A peak power is a maximum transient power that occurs with a probability over a long period of time, and the probability is usually 0.01% (namely, $10^-4$). A ratio of the peak power under this probability to a total average power of the system is a PAPR.

The signal of the wireless communication system needs to be amplified in power before being sent far away. Due to a limitation of technology and equipment costs, a power amplifier usually performs linear amplification in only one range. If the range is exceeded, signal distortion is caused. The signal distortion causes a receive end of the received signal to be unable to correctly parse the signal. To ensure that the peak value of the signal is still within the linear range in which the power amplifier can normally perform power amplification, the average power of the sent signal needs to be reduced. This manner leads to low efficiency of the power amplifier, or is equivalent to a smaller coverage area.

Because a signal of orthogonal frequency division multiplexing (orthogonal frequency division multiplexing, OFDM) on a carrier is represented as a sinc (sinc) function, there are tails on left and right sides. In a probability, tails of a plurality of carriers may be superimposed at a distance to form a point with a very large peak power. In other words, use of an OFDM waveform easily causes a problem that the PAPR is excessively high.

(2) Single Carrier

To reduce the PAPR of the OFDM waveform, a single-carrier waveform is for transmitting data in this field. The single carrier includes but is not limited to the following waveforms: a single carrier-quadrature amplitude modulation (single carrier-quadrature amplitude modulation, SC-QAM) waveform, and a single carrier-offset quadrature amplitude modulation (Single carrier-Offset quadrature amplitude modulation, SC-OQAM) waveform; a DFT-s-OFDM waveform, a single carrier-based discrete Fourier transform-spread orthogonal frequency division multiplexing with FTSS (discrete Fourier transform-spread orthogonal frequency division multiplexing, DFT-s-OFDM with FTSS) waveform, a DFT-s-OFDM signal carrying a real part and an imaginary part separated from each other, a DFT-s-OFDM signal carrying a pulse amplitude modulation (pulse amplitude modulation, PAM) constellation, a DFT-s-OFDM signal of an addition filter carrying a real part and an imaginary part separated from each other, and a DFT-s-

OFDM signal of an addition filter carrying a PAM constellation; a unique word discrete Fourier transform-spread orthogonal frequency division multiplexing (unique word discrete Fourier transform-spreading OFDM, uw-DFT-s-OFDM) waveform, a waveform of uw-DFT-s-OFDM with frequency domain truncate spectrum shaping (uw-DFT-s-OFDM with FTSS), a uw-DFT-s-OFDM signal carrying a real part and an imaginary part separated from each other, a uw-DFT-s-OFDM signal carrying a pulse amplitude modulation constellation, a uw-DFT-s-OFDM signal of an addition filter carrying a real part and an imaginary part separated from each other, and a uw-DFT-s-OFDM signal of an addition filter carrying a PAM constellation; a zero tail discrete Fourier transform-spread orthogonal frequency division multiplexing (zero tail discrete Fourier transform-spreading OFDM, zt-DFT-s-OFDM) waveform, a waveform of zt-DFT-s-OFDM waveform with frequency domain truncate spectrum shaping (zt-DFT-s-OFDM with FTSS), a zt-DFT-s-OFDM signal carrying a real part and an imaginary part separated from each other, a zt-DFT-s-OFDM signal carrying a pulse amplitude modulation constellation, a zt-DFT-s-OFDM signal of an addition filter carrying a real part and an imaginary part separated from each other, and a zt-DFT-s-OFDM signal of an addition filter carrying a PAM constellation; and so on. In this embodiment of this application, the network device and the terminal device may communicate with each other by using the single carrier described above.

The DFT-s-OFDM technology is a single-carrier technology based on an OFDM waveform. Compared with the OFDM waveform, the DFT-s-OFDM waveform provides a higher output power and higher power amplification efficiency at the same power amplification, thereby improving coverage and reducing power consumption. In some embodiments, the DFT-s-OFDM signal is at least one of the following signals: a signal of DFT-s-OFDM with FTSS, a DFT-s-OFDM signal carrying a real part and an imaginary part separated from each other, a DFT-s-OFDM signal carrying a pulse amplitude modulation (pulse amplitude modulation, PAM) constellation, a DFT-s-OFDM signal of an addition filter carrying a real part and an imaginary part separated from each other, a DFT-s-OFDM signal of an addition filter carrying a PAM constellation, and an SC-OQAM signal.

Currently, in a long term evolution (long term evolution, LTE) system and a fifth generation (5th-generation, 5G) (or referred to as a new radio (new radio, NR)) communication system, a DFT-s-OFDM waveform may be applied to uplink transmission. However, in high frequency communication, the PAPR problem is severe because a component capability is limited. Therefore, the DFT-s-OFDM waveform may also be applied to downlink transmission. The frequency band of the high frequency communication may be 24250 MHz to 52600 MHz in the NR system, may be a frequency band above 52600 MHz supported by subsequent evolution of the NR system, or may be a higher frequency band of the next generation communication system, for example, a terahertz (THz) frequency band.

In the DFT-s-OFDM technology, additional discrete Fourier transform (discrete Fourier transform, DFT) processing is performed before the OFDM processing. Therefore, the DFT-s-OFDM technology may also be referred to as a linear precoding OFDM technology.

Figure 2:
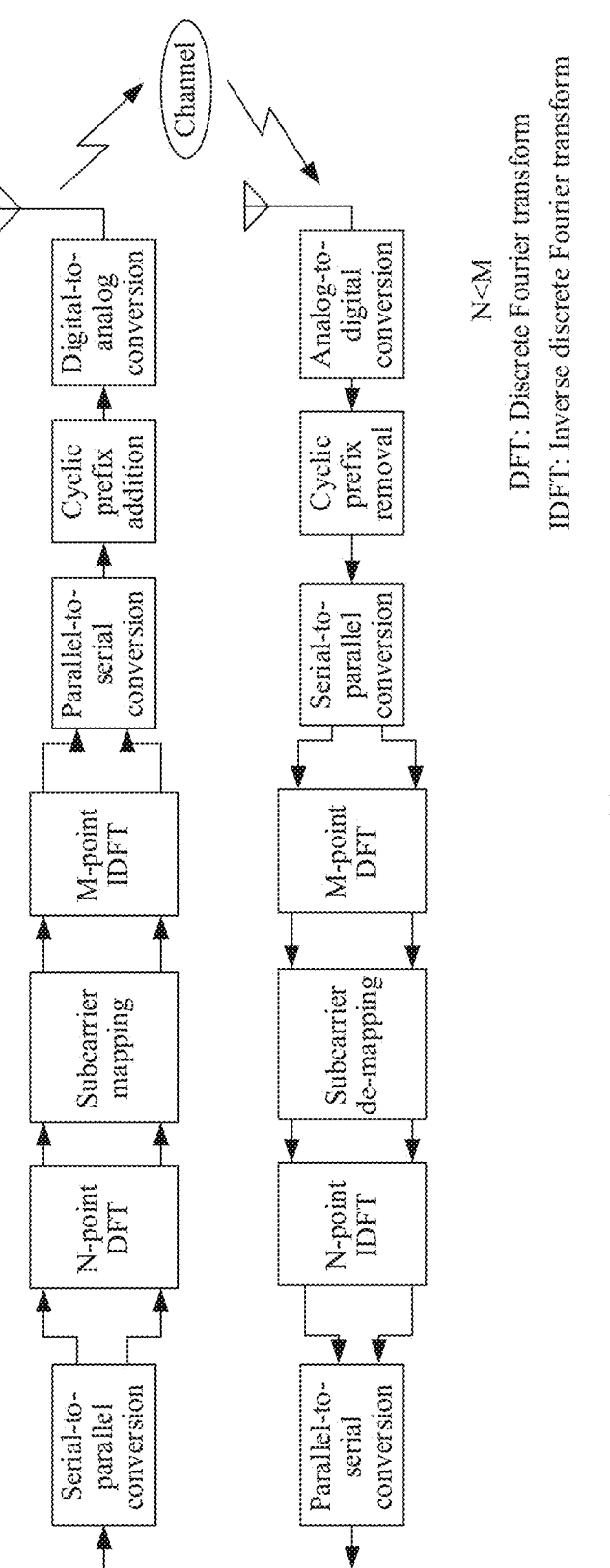
FIG. 2 is a schematic diagram of a processing process of a DFT-s-OFDM technology according to an embodiment of this application.

FIG. 2 is a schematic diagram of a processing process of a DFT-s-OFDM technology according to an embodiment of this application. The transmit end sequentially performs serial-to-parallel (serial-to-parallel) conversion and N-point discrete Fourier transform (discrete Fourier transform, DFT), subcarrier mapping, M-point inverse discrete Fourier transform (inverse discrete Fourier transform, IDFT), parallel-to-serial (parallel-to-serial) conversion, cyclic prefix (cyclic prefix, CP) addition, and digital-to-analog conversion (digital-to-analog conversion, DAC) processing on a time-domain discrete sequence, and then sends a signal through an antenna port and a channel (channel). When receiving the signal through the channel and the antenna port, the receive end sequentially performs analog-to-digital conversion (analog-to-digital conversion, ADC), cyclic prefix removal, serial-to-parallel (serial-to-parallel) conversion, M-point DFT, subcarrier de-mapping, N-point IDFT, and parallel-to-serial (parallel-to-serial) conversion on the signal, to obtain the time-domain discrete sequence.

The transmit end may obtain a frequency-domain sequence of the time-domain discrete sequence through N-point DFT. The frequency-domain sequence is input for IDFT after being subjected to subcarrier mapping, and is subjected to M-point IDFT, where N<M. Because the length of the IDFT is greater than the length of the DFT, an extra part of the IDFT is filled with zeros during input. After the IDFT, a cyclic prefix may be added to avoid symbol interference.

Compared with OFDM, DFT-s-OFDM has a lower PAPR, which can improve power transmission efficiency of a mobile terminal, prolong a service time of a battery, and reduce terminal costs.

(3) Phase Noise (Phase Noise, PN)

A phase noise (or referred to as PN for short) refers to a random change of a phase of an output signal of a communication device caused by various noises of a communication device (for example, various radio frequency components) that sends a signal. To satisfy increasing communication requirements, frequency band resources of high frequency bands (frequency bands above 6 G, mainly including 28 G, 39 G, 60 G, and 73 G) are increasingly used in communication systems to transmit signals. The high frequency bands can provide a large bandwidth and a highly integrated antenna array for communication to achieve a high throughput. However, a phase noise problem of a high frequency band is very prominent. As the frequency band increases, a higher phase noise power spectrum density indicates greater impact on a received signal. When a frequency band for sending the signal is high, deterioration of a phase noise causes poor demodulation performance of the signal and deteriorates communication quality. To estimate and compensate for a phase noise of a signal, a phase-tracking reference signal (phase-tracking reference signal, PTRS) is introduced in this field.

For example, impact of the phase noise may be shown by formula 1-1:

$$y(n)=x(n)e^{j\Theta_n} \qquad \text{formula 1-1}$$

n=0, 1, . . . , or N−1, and is a time-domain sampling point. Simply put, a phase noise is a random phase value generated at each sampling point n. A basic principle of estimating a phase noise based on a PTRS is that a known PTRS (namely, known x(n)) is placed at the transmit end, a received PTRS (namely, known (n)) is read at the receive end, and a phase noise value (that is, a θ value) can be calculated based on x(n) and y(n).

(4) DFT-s-OFDM with FTSS

To further reduce the PAPR of the DFT-s-OFDM waveform, a DFT-s-OFDM with FTSS waveform is proposed in this field. The DFT-s-OFDM with FTSS waveform is actually separating a real part (real part) from an imaginary part (imag part) of a signal. Because a peak of a real part waveform is not superimposed on a peak of an imaginary signal after the real part is separated from the imaginary part, the PAPR can be effectively reduced by such a peak staggering method.

Figure 3:
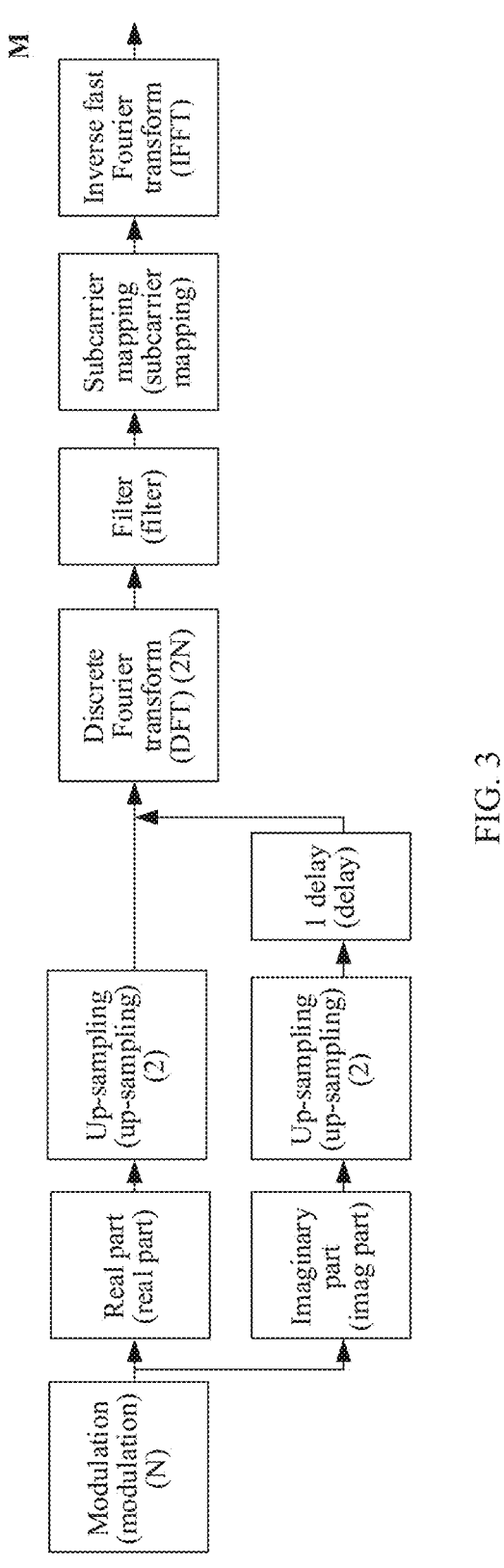
FIG. 3 is a schematic diagram of a processing process of a DFT-s-OFDM with FTSS technology according to an embodiment of this application.

FIG. 3 is a schematic diagram of a processing process of a DFT-s-OFDM with FTSS technology according to an embodiment of this application. The transmit end splits a quadrature amplitude modulation (quadrature amplitude modulation, QAM) constellation point used in a DFT-s-OFDM system into a real part and an imaginary part. (It is also possible that the input is directly defined as a phase amplitude modulation (PAM) signal instead of a QAM signal). After this change is performed, double up-sampling is performed, that is, the real part signal becomes [X, 0, X, 0, X, 0, . . . ] and the imaginary part signal becomes [jY, 0, jY, 0, jY, 0, . . . ]; and then a delay is performed on the imaginary part signal, and the imaginary part signal becomes [0, jY, 0, jY, 0, jY, . . . ]. In this case, the imaginary part signal becomes [X, jY, X, jY, X, jY, . . . ] after combination, but the total length becomes twice that of the original complex modulation signal. Then, 2N-point discrete Fourier transform (Discrete Fourier Transform, DFT) is performed on a symbol obtained after phase rotation/separation of real and imaginary parts.

Then, frequency domain truncate spectrum shaping (frequency domain truncate spectrum shaping, FTSS) is performed on a signal obtained after 2M-point DFT. A specific manner is as follows:

(1) For a downlink transmission direction, the terminal device receives a transmission resource and an FTSS parameter that are configured/indicated by the network device, including one or more of a resource bandwidth and a center frequency, a modulation scheme, an original signal bandwidth, a filter type, and a filter parameter. The resource bandwidth is a bandwidth and a center frequency for receiving a signal by the terminal device.

(2) The terminal device performs frequency filtering based on the indicated signal bandwidth and the indicated filter parameter. For a filtering manner, refer to a schematic diagram shown in FIG. 4.

Because QAM constellation modulation with real and imaginary parts separated is used, a length of a signal is twice that of conventional QAM constellation modulation, and a DFT size is also twice that of a DFT size of QAM constellation modulation. The signal obtained after the DFT has a characteristic, that is, the spectrum has a conjugate symmetry characteristic: s[n]=s*[N−n], that is, A and Flip (A*) shown in FIG. 4. Therefore, the data obtained after the DFT is actually redundant. Therefore, truncated frequency-domain filtering may be performed on a redundant signal. Truncation means that the bandwidth of the filter is less than the bandwidth remaining after DFT. For example, the bandwidth remaining after the DFT is 100 RBs, and the frequency-domain filter may be designed to have a length of 60 RBs. The filtering process is that the frequency-domain filter is directly multiplied by the signal obtained after the DFT. Because the signal itself is redundant, the truncated filtering does not cause performance loss. Finally, the inverse fast Fourier transform (IFFT) is performed, and then the CP is added and sent.

(5) SC-OQAM

The SC-OQAM waveform is a time-domain implementation of the DFT-s-OFDM with FTSS waveform, and they are substantially equivalent, in other words, a real part is separated from an imaginary part of a signal.

Figures 4, 5:
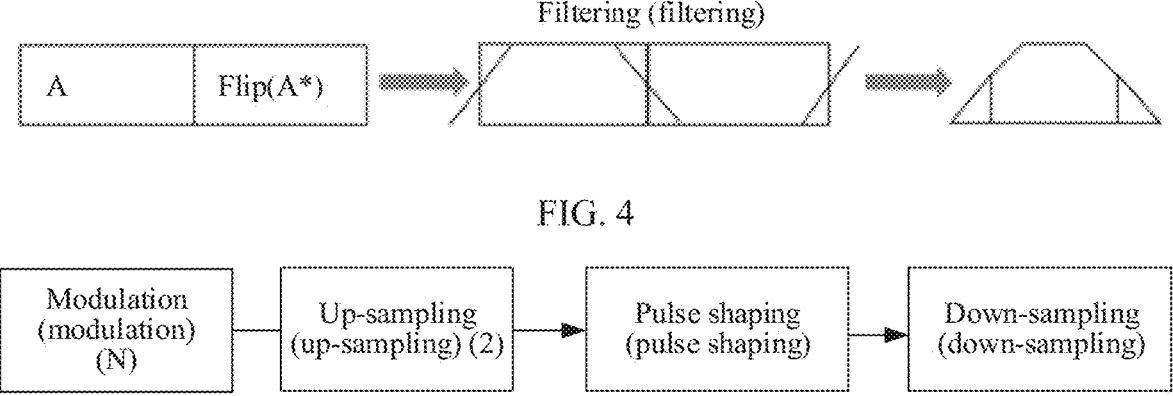
FIG. 4 is a schematic flowchart of a filtering manner according to an embodiment of this application.
FIG. 5 is an implementation block diagram of a transmit end of SC-QAM according to an embodiment of this application.

FIG. 5 is an implementation block diagram of a transmit end of single carrier-quadrature amplitude modulation (single carrier-quadrature amplitude modulation, SC-QAM) according to an embodiment of this application. In FIG. 5, the transmit end sequentially performs up-sampling (up-sampling), pulse shaping (pulse shaping), and down-sampling (down-sampling) processing on a complex modulation (modulation) signal.

Figure 6:
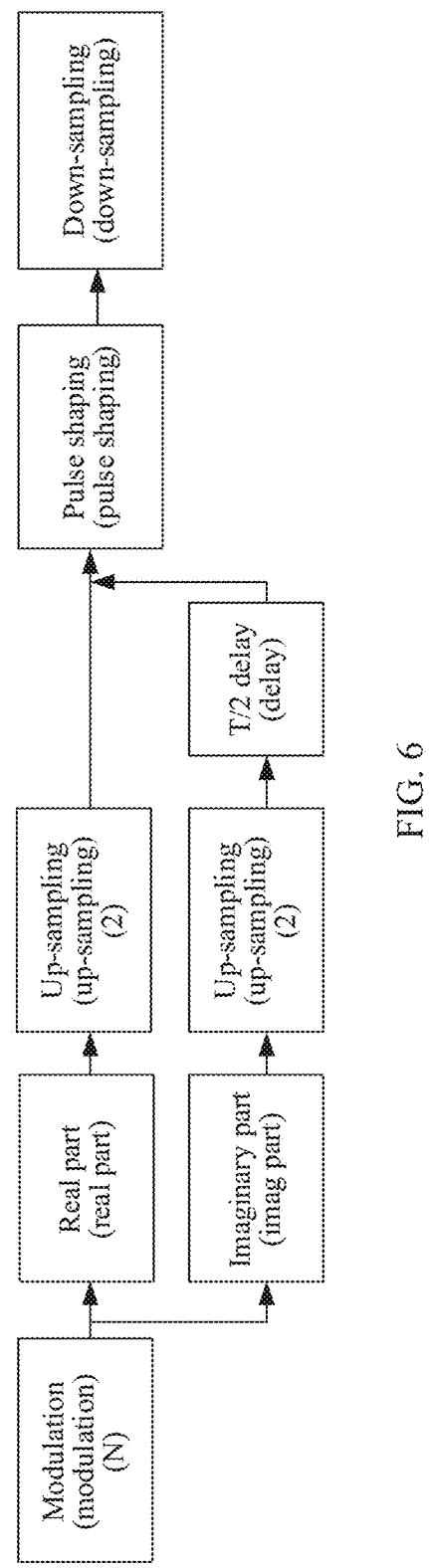
FIG. 6 is an implementation block diagram of a transmit end of SC-OQAM according to an embodiment of this application.

FIG. 6 is an implementation block diagram of a transmit end of SC-OQAM according to an embodiment of this application. Compared with the implementation of SC-QAM, SC-OQAM separates a real part from an imaginary part of a complex modulation signal, and then performs a T/2 delay (T/2 delay) on one signal (illustrated as an imaginary part (imag part) in FIG. 6) of the signals. Other implementation processes are similar to those of SC-QAM.

A difference between the implementations of the foregoing two waveforms is analyzed from the perspective of waveforms.

Figure 7:
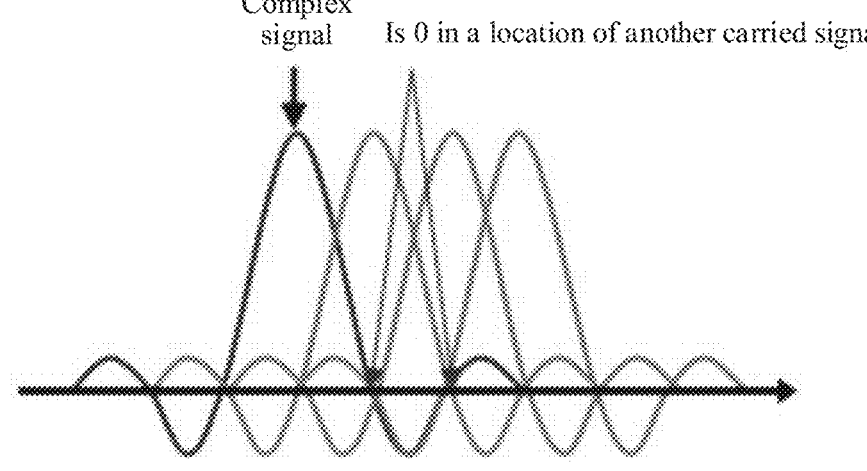
FIG. 7 is a schematic diagram of an SC-QAM waveform according to an embodiment of this application.

SC-QAM carries a complex signal (a quadrature amplitude modulation (quadrature amplitude modulation, QAM) signal or the like), and a root raised cosine (root raised cosine, RRC) filter is used as an example for a waveform. FIG. 7 is a schematic diagram of an SC-QAM waveform according to an embodiment of this application. In FIG. 7, an SC-QAM waveform carries a complex signal. Because there is an orthogonality relationship (or referred to as a complex orthogonality) between this waveform and a next waveform carrying a signal, that is, the one SC-QAM waveform is 0 at a sampling point of the signal carried by the next SC-QAM waveform, there is no interference between the two SC-QAM waveforms.

Figure 8:
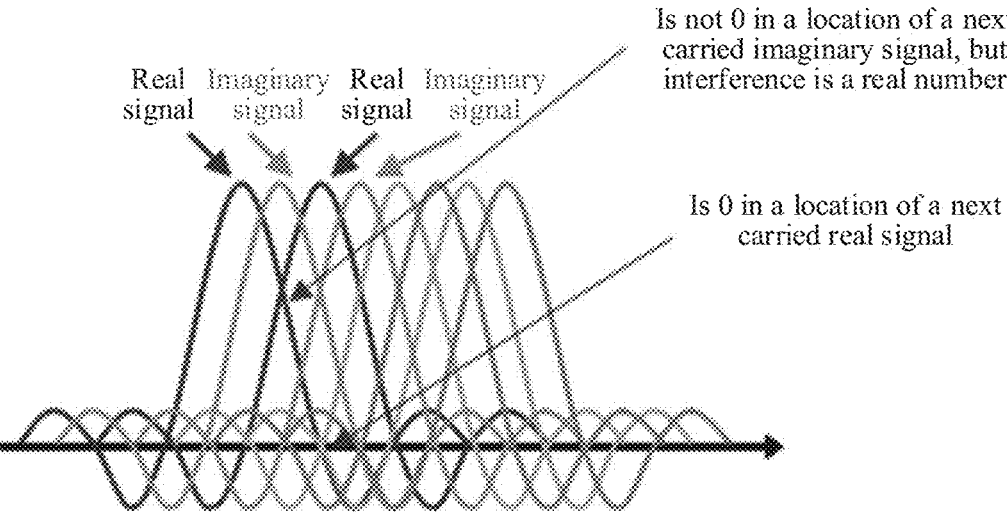
FIG. 8 is a schematic diagram of an SC-OQAM waveform according to an embodiment of this application.

For the SC-OQAM, because the real part and the imaginary part of the signal are separated, the two SC-OQAM waveforms are not in a complex orthogonality relationship, but the real and imaginary parts are in a partial orthogonality relationship. FIG. 8 is a schematic diagram of an SC-OQAM waveform according to an embodiment of this application. In FIG. 8, one SC-OQAM waveform carries a signal whose real and imaginary parts are separated. For example, one real part SC-OQAM waveform is not 0 at a sampling point of a signal carried by a next imaginary part SC-OQAM waveform, and is 0 at a sampling point of a signal carried by a next real part SC-OQAM waveform. Therefore, there is interference between the real part SC-OQAM waveform and the imaginary part SC-OQAM waveform. However, because the information carried in the next imaginary part SC-QAM waveform is orthogonal to the information carried in the one real part SC-OQAM waveform, the interference is orthogonal to the signal. It may be understood that there is an orthogonality relationship between the one real part SC-OQAM waveform, the next imaginary part SC-QAM waveform, and the next real part SC-OQAM waveform. This case may be referred to as a partial orthogonality relationship between a real part and an imaginary part. In addition, due to the partial orthogonality relationship between a real part and an imaginary part, the receive end discards the imaginary part when receiving the real part signal, and discards the real part when receiving the imaginary part signal. In this way, the information can be restored correctly.

As described in the foregoing manner, a PAPR of a waveform can be reduced in a manner of separating a real part and an imaginary part. However, because of separating a real part and an imaginary part, interference between a real part waveform and an imaginary part waveform of a waveform is introduced. Because of generating the interference, the real part signal affects a phase noise of the imaginary part signal, and the imaginary part signal affects a phase noise of the real part signal. In this manner, phase noises cannot be determined effectively. In view of this, the solutions in embodiments of this application are provided.

Figure 9:
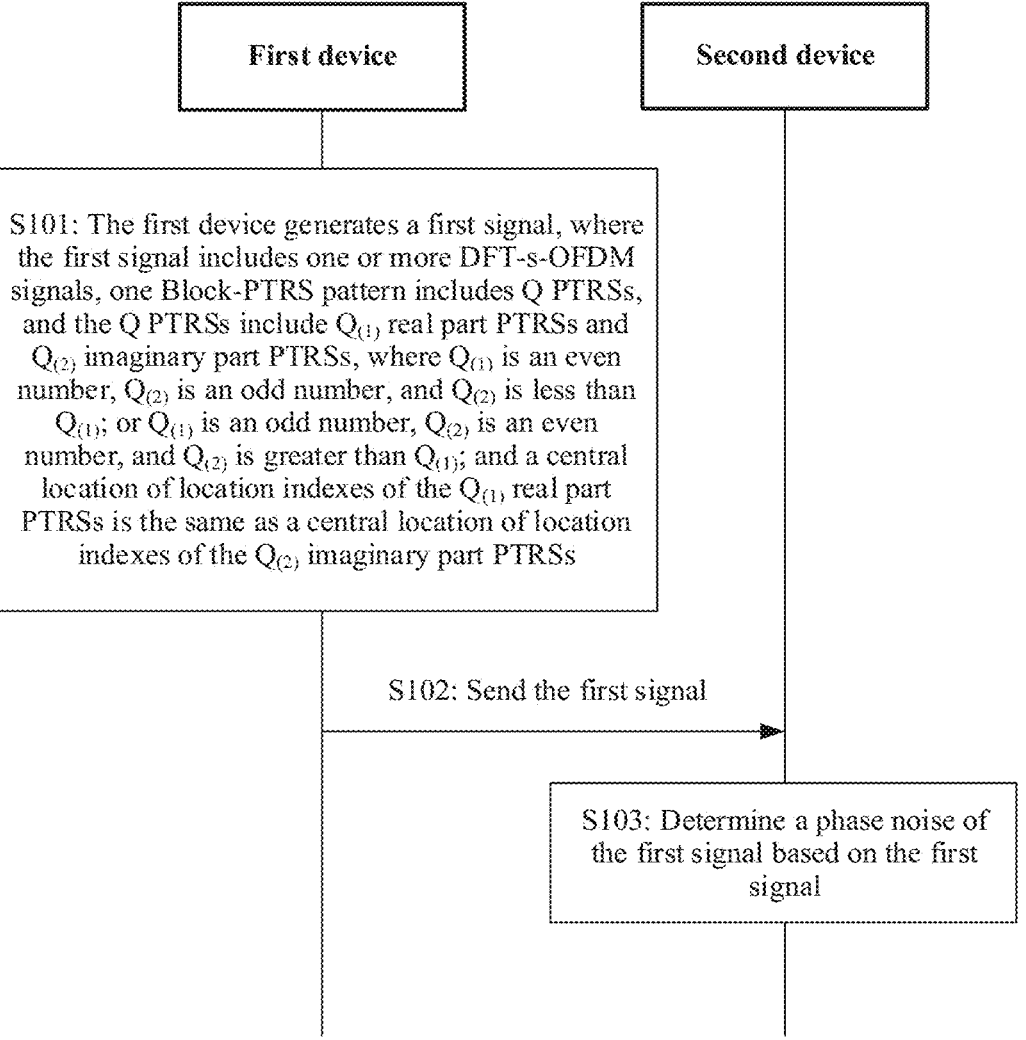
FIG. 9 is a flowchart of a phase noise suppression method according to an embodiment of this application.

The following describes a phase noise suppression method provided in embodiments of this application based on the network architecture, the terminal device, and the network device that are described in the foregoing content. FIG. 9 is a flowchart of a phase noise suppression method according to an embodiment of this application. The method may be implemented based on the network architecture shown in FIG. 1. In an implementation, the first device may be the network device in FIG. 1, and the second device may be the terminal device in FIG. 1. In another implementation, the first device may be the terminal device in FIG. 1, and the second device may be the network device in FIG. 1. The method includes the following steps.

S101: The first device generates a first signal.

Specifically, the first signal includes one or more DFT-s-OFDM signals, one DFT-s-OFDM signal includes P block-phase noise tracking pilot signal (Block-PTRS) patterns, one Block-PTRS pattern includes Q phase noise tracking pilot signals (PTRSs), and the Q PTRSs include $Q_{(1)}$ real part PTRSs and $Q_{(2)}$ imaginary part PTRSs.

The real part PTRS is a PTRS that includes only a real part signal, and the imaginary part PTRS is a PTRS that includes only an imaginary part signal.

Optionally, when $Q_{(1)}$ is greater than 1, the $Q_{(1)}$ real part PTRSs are consecutive real part signals; and when $Q_{(2)}$ is greater than 1, the $Q_{(2)}$ imaginary part PTRSs are consecutive imaginary part signals. $Q_{(1)}$ is an even number, $Q_{(2)}$ is an odd number, and $Q_{(2)}$ is less than $Q_{(1)}$; or $Q_{(1)}$ is an odd number, $Q_{(2)}$ is an even number, and $Q_{(2)}$ is greater than $Q_{(1)}$. A central location of location indexes of the $Q_{(1)}$ real part PTRSs is the same as a central location of location indexes of the $Q_{(2)}$ imaginary part PTRSs, or it is considered that a central location of location indexes of the $Q_{(1)}$ real part PTRSs is aligned with a central location of location indexes of the $Q_{(2)}$ imaginary part PTRSs. In addition, because the DFT-s-OFDM signal whose real and imaginary parts are separated is composed in a manner in which one real part signal is adjacent to one imaginary part signal, it may alternatively be considered that one Block-PTRS pattern includes Q consecutive PTRSs, where the Q consecutive PTRSs indicate that no data signal exists between the Q PTRSs.

It should be noted that, that the DFT-s-OFDM signal whose real and imaginary parts are separated is composed in a manner in which one real part signal is adjacent to one imaginary part signal may be understood as that the DFT-s-OFDM signal is sent in a manner in which a real part signal is adjacent to an imaginary part signal in a time sequence. For example, in a time sequence, 1 is used as a unit, a real part signal is sent at a moment t, an imaginary part signal is sent at a moment t+1, a real part signal is sent at a moment t+2, and so on. That the $Q_{(1)}$ real part PTRSs are consecutive real part signals may be understood as that for real part signals, the $Q_{(1)}$ real part PTRSs are consecutively sent in a time sequence, and when the $Q_{(1)}$ real part PTRSs are being sent, no real part data signal is sent. That the $Q_{(2)}$ imaginary part PTRSs are consecutive imaginary part signals may be understood as that for imaginary part signals, the $Q_{(2)}$ imaginary part PTRSs are consecutively sent in a time sequence, and when the $Q_{(2)}$ imaginary part PTRSs are being sent, no imaginary part data signal is sent. The real part data signal is a data signal that includes only the real part signal, and the imaginary part data signal is a data signal that includes only the imaginary part signal.

In some embodiments, the DFT-s-OFDM signal is at least one of the following signals: an SC-OQAM signal, a DFT-S-OFDM signal carrying real and imaginary parts separated, a DFT-S-OFDM signal carrying a PAM constellation, a DFT-S-OFDM signal carrying real and imaginary parts separated of an addition filter, a DFT-S-OFDM signal carrying a PAM constellation of an addition filter, a UW-DFT-S-OFDM signal carrying real and imaginary parts separated, a UW-DFT-S-OFDM signal carrying a PAM constellation, a UW-DFT-S-OFDM signal carrying real and imaginary parts separated of an addition filter, a UW-DFT-S-OFDM signal carrying a PAM constellation of an addition filter, a ZT-DFT-S-OFDM signal carrying real and imaginary parts separated, a ZT-DFT-S-OFDM signal carrying a PAM constellation, a ZT-DFT-S-OFDM signal carrying real and imaginary parts separated of an addition filter, and a ZT-DFT-S-OFDM signal carrying a PAM constellation of an addition filter.

Figures 10, 11:
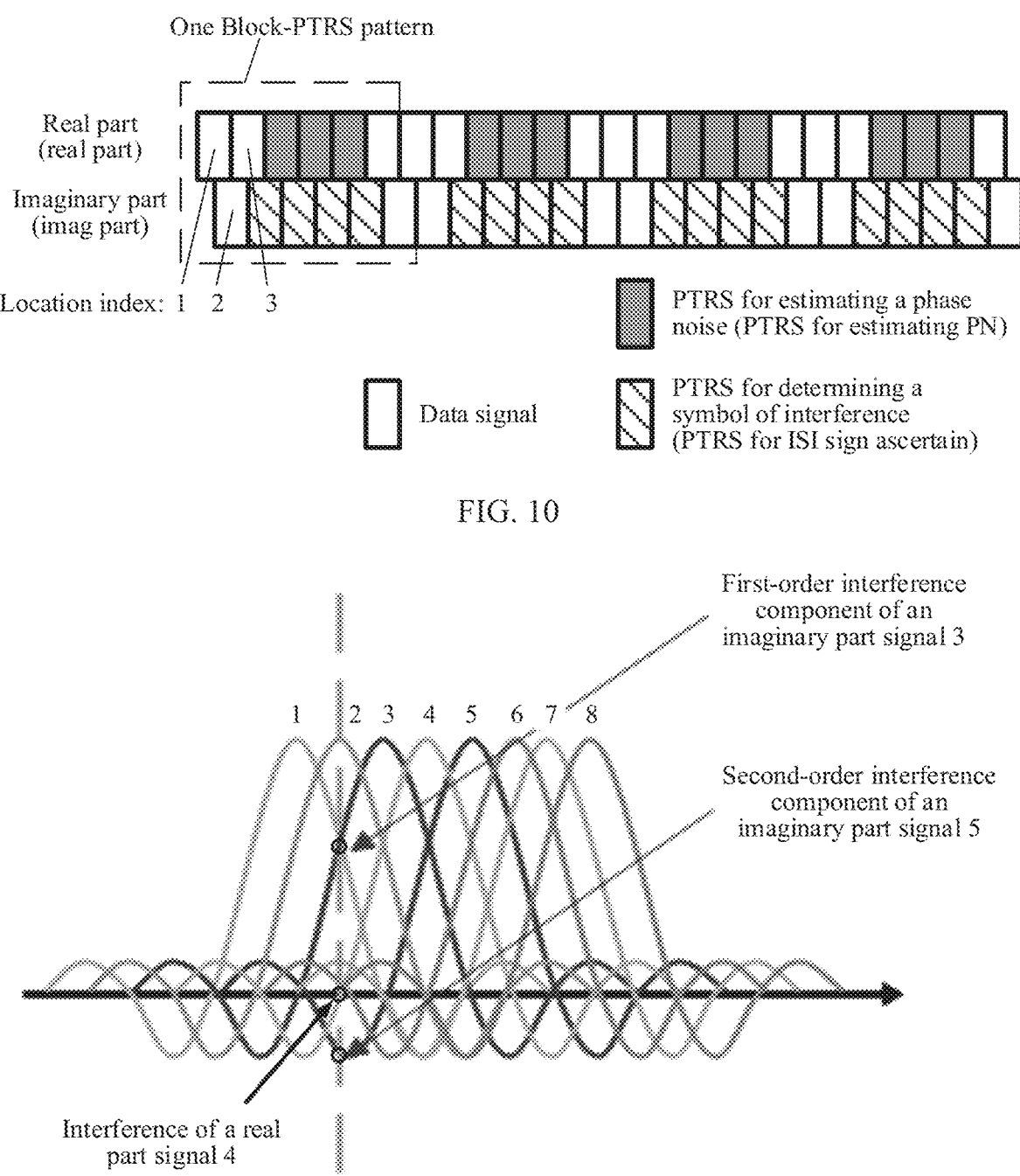
FIG. 10 is a schematic diagram of a Block-PTRS pattern of a DFT-s-OFDM signal according to an embodiment of this application.
FIG. 11 is a schematic diagram of a waveform interference according to an embodiment of this application.

For example, FIG. 10 is a schematic diagram of a Block-PTRS pattern of a DFT-s-OFDM signal according to an embodiment of this application. In FIG. 10, one DFT-s-OFDM signal includes four block-phase noise tracking pilot signal Block-PTRS patterns (PTRSs and data signals included in a dashed box in FIG. 10 form one Block-PTRS pattern), the one block-PTRS pattern includes Q (for example, seven) consecutive phase noise tracking pilot signals PTRSs, and the seven PTRSs include $Q_{(1)}$ (for example, three consecutive) real part PTRSs and $Q_{(2)}$ (for example, four consecutive) imaginary part PTRSs. It should be noted that the data signal in FIG. 10 is merely an example. In practical application, one Block-PTRS pattern may include more or fewer data signals. A quantity of data signals is not limited in this embodiment of this application.

In addition, FIG. 10 further illustrates a distribution manner of location indexes. For example, from left to right, location indexes of one real part signal and one imaginary part signal are adjacent, and one signal occupies one index location. It should be noted that location indexes represent a time sequence relationship of sending signals, and a relationship in ascending order of the location indexes of the signals represents a time sequence of sending the signals from front to back. In other words, the signals are sequentially sent in order of location index. In FIG. 10, specifically, in a first Block-PTRS pattern, location indexes of three real part PTRSs are 5, 7, and 9, and a central location of the location indexes of the two real part PTRSs is 7; and location indexes of four imaginary part PTRSs are 4, 6, 8, and 10, and a central location of the location indexes of the three imaginary part PTRSs is 7. A central location of location indexes of the $Q_{(1)}$ real part PTRSs is the same as a central location of location indexes of the $Q_{(2)}$ imaginary part PTRSs, or it is considered that a central location of location indexes of the $Q_{(1)}$ real part PTRSs is aligned with a central location of location indexes of the $Q_{(2)}$ imaginary part PTRSs.

In some other implementations, it may alternatively be considered that one signal occupies 0.5 index locations, and distribution of location indexes is 0.5, 1, 1.5, 2, and the like.

In the example of FIG. 10, $Q_{(1)}$ is an even number, $Q_{(2)}$ is an odd number, and $Q_{(2)}$ is less than $Q_{(1)}$. In this case, an even number of real part PTRSs are for determining interference symbols (which may be understood as positive and negative signs), and an odd number of imaginary part PTRSs are for estimating a phase noise.

In some other implementations, $Q_{(1)}$ is an odd number, $Q_{(2)}$ is an even number, and $Q_{(2)}$ is greater than $Q_{(1)}$. In this case, an even number of imaginary part PTRSs are for determining interference symbols, and an odd number of real part PTRSs are for estimating a phase noise. The different PTRS usages will be analyzed in the following content.

In the foregoing embodiment, based on the even number of imaginary part PTRSs or the even number of real part PTRSs in the first signal, a symbol of interference received by the first signal may be determined. When the symbol of the interference is determined, a phase noise of the first signal may be solved.

S102: The first device sends the first signal to a second device.

S103: After the second device receives the first signal sent by the first device, the second device determines a phase noise of the first signal based on the first signal.

The following describes a reason why the phase noise can be determined in the foregoing embodiment.

It is assumed that no phase noise exists in the first signal received by the second device. A real part PTRS in the first signal is used as an example. A real part PTRS (for ease of description, briefly referred to as a received signal) in the received first signal may be shown by formula 1-2.

$$x = P + j \sum_{n=1}^{N} ISI \qquad \text{formula 1-2}$$

P is a real part PTRS, and $$j \sum_{n=1}^{N} ISI$$

is a sum of interference caused to the received signal.

Interference received by the received signal is represented on an imaginary part. Therefore, the real part signal P may be demodulated by discarding the imaginary part. Specifically, the interference is represented as a sum term, because interference of an imaginary part signal may have multi-order components. That is to say, an imaginary part signal not only has an interference component (for example, a first-order interference component) for a nearest real part signal, but also has an interference component (for example, a second-order interference component) for a next real part signal; and may have an interference component (for example, an X-order interference component) for each of the following X real part signals.

It should be noted that a quantity of orders of interference components is related to a roll-off design of a waveform of the first signal. For example, if a roll-off factor of the waveform of the first signal is 0.2, a quantity of orders of interference components may be a maximum of seven orders (on a single side). For example, that a quantity of orders of interference components may be a maximum of seven orders may be represented as that an imaginary part signal interferes with a maximum of seven (on a single side) consecutive real part signals adjacent to the imaginary part signal. The seven (on a single side) consecutive real part signals are sorted in ascending order of distance. There is a seventh-order interference component for the seventh real part signal. In this embodiment of this application, a roll-off design of the waveform of the first signal is not limited.

For ease of understanding, FIG. 11 is used as an example for description. FIG. 11 is a schematic diagram of a waveform interference according to an embodiment of this application. FIG. 11 includes a plurality of real part signals (for example, a real part signal 2, a real part signal 4, a real part signal 6, and a real part signal 8) and a plurality of imaginary part signals (for example, an imaginary part signal 1, an imaginary part signal 3, an imaginary part signal 5, and an imaginary part signal 7).

Interference received by the real part signal 2 in FIG. 11 is now analyzed. As can be seen from FIG. 11, the real part signal 2 receives a first-order interference component of the imaginary part signal 3 and a second-order interference component of the imaginary part signal 5. It should be noted that the figure shows only an example of the first-order interference component of the imaginary part signal 3 and the second-order interference component of the imaginary part signal 5 that are received by the real part signal 2. However, other imaginary part signals also cause interference to the real part signal 2, for example, a first-order interference component of the imaginary part signal 1 and a third-order interference component of the imaginary part signal 7. However, the real part signal 4 (and other real part signals) is 0 at a sampling point of the signal carried by the waveform of the real part signal 2, that is, the real part signal 4 causes no interference to the real part signal 2.

When impact of a phase noise is considered, it may be learned based on formula 1-1 and formula 1-2 that the received signal may be shown by formula 1-3:

$$xe^{j\theta} = \left(P + j\sum_{n=1}^{N} ISI\right)e^{j\theta} \qquad \text{formula 1-3}$$

Formula 1-4 may be obtained by performing Euler expansion on formula 1-3:

$$xe^{j\theta} = \left(P + j\sum_{n=1}^{N} ISI\right)(\cos\theta + j\sin\theta) = \qquad \text{formula 1-4}$$

$$P\cos\theta - \sum_{n=1}^{N} ISI\sin\theta + j\left(P\sin\theta + \sum_{n=1}^{N} ISI\cos\theta\right)$$

It can be seen from formula 1-4 that a real part of the received signal becomes $$P\cos\theta - \sum_{n=1}^{N} ISI\sin\theta.$$

Since both the interference term and the phase noise are unknown in this formula, the interference cannot be separated from the signal. In other words, in this manner, a phase noise causes a problem that an imaginary part signal leaks to a real part signal, to greatly reduce signal communication quality.

Next, the received signal is represented as y=a+bj, and another expression of the received signal may be obtained based on formula 1-4. For details, refer to formula 1-5.

$$y = a + bj = xe^{j\theta} = \left(P + j\sum_{n=1}^{N} ISI\right)e^{j\theta} = (P + jI)e^{j\theta} \qquad \text{formula 1-5}$$

P is a known real part PTRS, and I is a sum of unknown interference signals (that is, $$j\sum_{n=1}^{N} ISI).$$

As can be learned through analysis, amplitudes at both ends of the equation should be equal, that is, formula 1-6:

$$|y| = |(P+jI)e^{j\theta}| \qquad \text{formula 1-6}$$

Formula 1-7 may be obtained by solving formula 1-6:

$$I = \pm\sqrt{a^2 + b^2 - P^2} \qquad \text{formula 1-7}$$

Based on formula 1-6, Euler decomposition $e^{j\theta} = \cos\theta + j\sin\theta$ is performed on $e^{j\theta}$. Because real parts and imaginary parts of the equation should be separately equal, formula 1-8 can be obtained:

$$\begin{cases} p\cos\theta - I\sin\theta = a\,(\text{real parts are equal}) \\ p\sin\theta + I\cos\theta = b\,(\text{imaginary parts are equal}) \end{cases} \qquad \text{formula 1-8}$$

By jointly solving formula 1-7 and formula 1-8, it can be found that two $\theta$ values (namely, phase noise values) can be solved. This is because I has two different solutions being positive and negative, and then correspondingly, each solution of I has a corresponding $\theta$ value. Therefore, a unique phase noise value cannot be solved.

Figure 12:
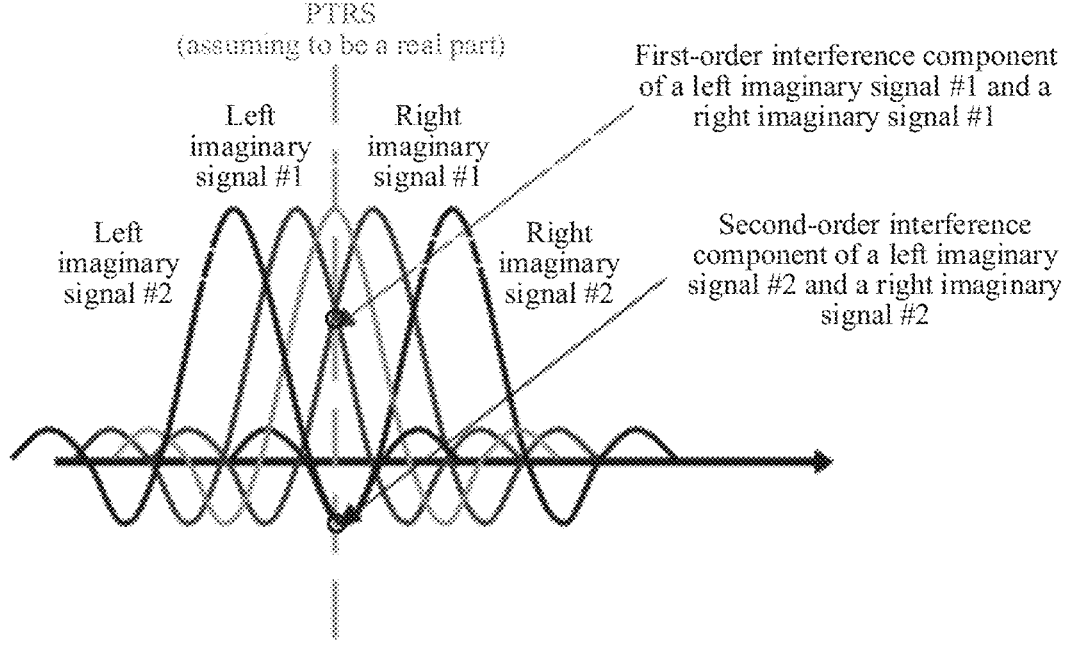
FIG. 12 is a schematic diagram of a multi-order interference component according to an embodiment of this application.

Impact of interference caused to one real part PTRS is analyzed. FIG. 12 is a schematic diagram of a multi-order interference component according to an embodiment of this application. In FIG. 12, interference caused to one real part PTRS comes from a first-order interference component of a left imaginary signal (namely, an imaginary part signal) #1 and a right imaginary signal #1, and a second-order interference component of a left imaginary signal #2 and a right imaginary signal #2. A contribution of the first-order interference component to a total interference value is significantly greater than that of interference components in other orders. Therefore, an imaginary part signal next to one real part PTRS may be designed (or referred to as constrained) to determine a symbol of a total value of interference caused to the one real part PTRS.

However, in the embodiment corresponding to FIG. 9, one block-PTRS pattern includes Q PTRSs, and the Q PTRSs include $Q_{(1)}$ real part PTRSs and $Q_{(2)}$ imaginary part PTRSs. A central location of location indexes of the $Q_{(1)}$ real part PTRSs is the same as a central location of location indexes of the $Q_{(2)}$ imaginary part PTRSs. Specifically, there may be two possible implementation cases for the Q PTRSs. The following describes the two cases separately.

(1) First Case $Q_{(1)}$ is an odd number, $Q_{(2)}$ is an even number, and $Q_{(2)}$ is greater than $Q_{(1)}$. For example, for this implementation, refer to the embodiment corresponding to FIG. 10. Specifically, $Q_{(1)}$ is 3 and $Q_{(2)}$ is 4. In some other embodiments, there may alternatively be other values. For example, $Q_{(1)}$ may be 1, and $Q_{(2)}$ may be 2. For another example, $Q_{(1)}$ may be 7, and $Q_{(2)}$ may be 8. In this case, an even number of imaginary part PTRSs are for determining interference symbols (which may be understood as positive and negative signs), and an odd number of imaginary part PTRSs are for estimating a phase noise. Because a total value of interference caused to one real part PTRS mostly comes from an imaginary part signal closest to the real part PTRS, and in this manner, $Q_{(2)}$ is less than $Q_{(1)}$, all imaginary part signals closest to the one real part PTRS are imaginary part PTRSs. These imaginary part PTRSs may be for determining a symbol of the total value of the interference caused to the one real part PTRS.

In a possible implementation, when $Q_{(1)}$ is an odd number and $Q_{(2)}$ is an even number, phases of the $Q_{(2)}$ imaginary part PTRSs are the same. Because the phases of the $Q_{(2)}$ imaginary part PTRSs are the same, a symbol of a total value of interference caused to one real part PTRS is the same as a symbol of the phase of the $Q_{(2)}$ imaginary part PTRSs.

In another possible implementation, when $Q_{(1)}$ is an odd number and $Q_{(2)}$ is an even number, amplitudes (or referred to as sizes, energy, or values) of the $Q_{(2)}$ imaginary part PTRSs are the same. The amplitudes of the $Q_{(2)}$ imaginary part PTRSs are the same, and amplitudes and phases of the PTRSs are jointly agreed on by the transmit end and the receive end. Therefore, a symbol of a total value of interference caused to one real part PTRS can be uniquely determined.

In another possible implementation, when $Q_{(1)}$ is an odd number and $Q_{(2)}$ is an even number, amplitudes and phases of the $Q_{(2)}$ imaginary part PTRSs are the same. Because both the amplitudes and the phases of the $Q_{(2)}$ imaginary part PTRSs are the same, a symbol of a total value of interference caused to a real part PTRS is the same as a symbol of the phase of the $Q_{(2)}$ imaginary part PTRSs.

(2) Second Case $Q_{(1)}$ is an even number, $Q_{(2)}$ is an odd number, and $Q_{(2)}$ is less than $Q_{(1)}$. In this case, an even number of real part PTRSs are for determining interference symbols (which may be understood as positive and negative signs), and an odd number of imaginary part PTRSs are for estimating a phase noise. Because a total value of interference caused to one imaginary part PTRS mostly comes from a real part signal closest to the real part PTRS, and in this manner, $Q_{(2)}$ is less than $Q_{(1)}$, all real part signals closest to the one imaginary part PTRS are real part PTRSs. These real part PTRSs may be for determining a symbol of the total value of the interference caused to the one imaginary part PTRS.

In a possible implementation, when $Q_{(1)}$ is an even number and $Q_{(2)}$ is an odd number, phases of the $Q_{(1)}$ real part PTRSs are the same. Because the phases of the $Q_{(1)}$ real part PTRSs are the same, a symbol of a total value of interference caused to one imaginary part PTRS is the same as a symbol of the phase of the $Q_{(1)}$ real part PTRSs.

In another possible implementation, when $Q_{(1)}$ is an even number and $Q_{(2)}$ is an odd number, amplitudes of the $Q_{(1)}$ real part PTRSs are the same. The amplitudes of the $Q_{(1)}$ real part PTRSs are the same, and amplitudes and phases of the PTRSs are jointly agreed on by the transmit end (that is, the first device) and the receive end (that is, the second device). Therefore, a symbol of a total value of interference caused to one real part PTRS can be uniquely determined.

In another possible implementation, when $Q_{(1)}$ is an even number and $Q_{(2)}$ is an odd number, phases and amplitudes of the $Q_{(1)}$ real part PTRSs are the same. Because both the phases and the amplitudes of the $Q_{(1)}$ real part PTRSs are the same, a symbol of a total value of interference caused to one imaginary part PTRS is the same as a symbol of the phase of the $Q_{(1)}$ real part PTRSs.

Figure 13:
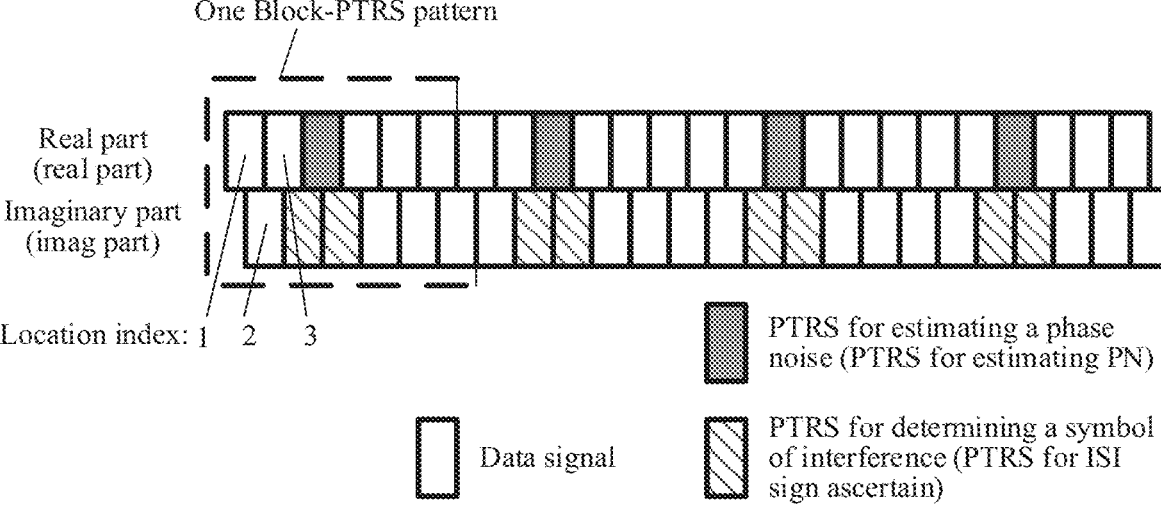
FIG. 13 is a schematic diagram of a Block-PTRS pattern of another DFT-s-OFDM signal according to an embodiment of this application.

Given that a contribution of the first-order interference component to a total interference value is significantly greater than that of interference components in other orders, and to save PTRS overheads, in some other implementations, that $Q_{(1)}$ is an even number and $Q_{(2)}$ is an odd number includes: $Q_{(1)}$ is 2 and $Q_{(2)}$ is 1; and that $Q_{(1)}$ is an odd number and $Q_{(2)}$ is an even number includes: $Q_{(1)}$ is 1 and $Q_{(2)}$ is 2. In this implementation, for a schematic diagram of a Block-PTRS pattern of a DFT-s-OFDM signal, refer to FIG. 13.

Figure 14:
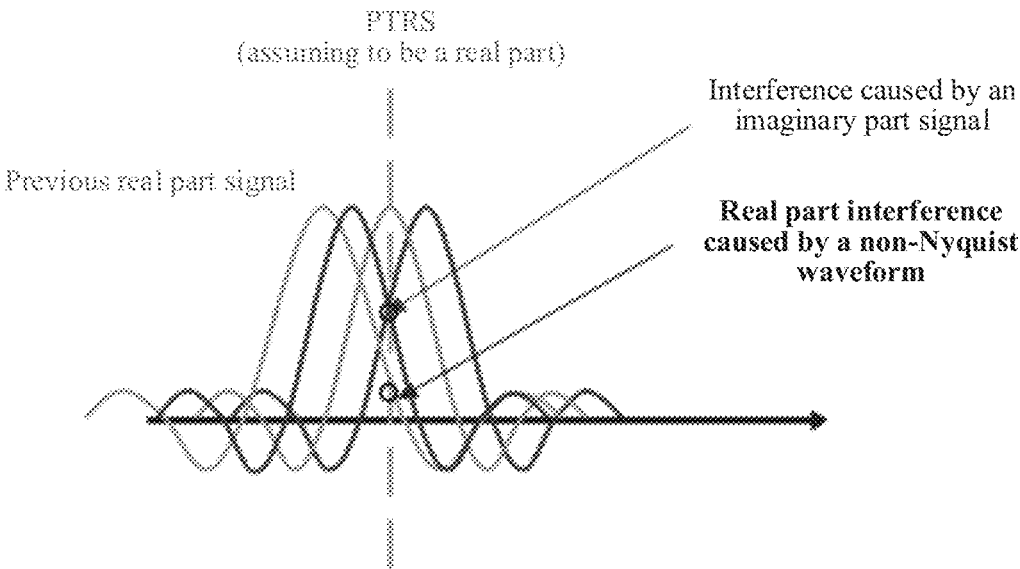
FIG. 14 is a schematic diagram of interference caused to a non-Nyquist waveform according to an embodiment of this application.

In addition, because the first device may have a non-Nyquist waveform, in this case, for a real part PTRS, in addition to interference of an imaginary part signal, a previous real part signal of the real part PTRS may also interfere with this real part signal. FIG. 14 is a schematic diagram of interference caused to a non-Nyquist waveform according to an embodiment of this application.

In this case, for an expression of a received real part signal, refer to formula 1-9:

$$y = \left( P + \sum_{n=1}^{N} ISI_{real} + j\sum_{n=1}^{N} ISI_{imginary} \right) e^{j\theta} \qquad \text{formula 1–9}$$

P is a real part PTRS, $$j\sum_{n=1}^{N} ISI$$

is a sum of imaginary part interference (interference caused by the imaginary part signal) caused to the real part signal, and $$\sum_{n=1}^{N} ISI_{real}$$

is a sum of real part interference (interference caused by the real part signal) caused to the real part signal.

If $ISI_{real}$ is in phase with P, energy of the PTRS is enhanced by the interference signal. Because the interference actually causes power of the P signal to increase, an anti-noise capability of a point at which the PTRS is located can be improved. Therefore, in some other embodiments, the phases of the $Q_{(1)}$ real part PTRSs are the same, and the phases of the $Q_{(2)}$ imaginary part PTRSs are the same.

FIG. 15 is a flowchart of another phase noise suppression method according to an embodiment of this application. The method may be implemented based on the network architecture shown in FIG. 1. In an implementation, the first device may be the network device in FIG. 1, and the second device may be the terminal device in FIG. 1. In another implementation, the first device may be the terminal device in FIG. 1, and the second device may be the network device in FIG. 1. The method includes the following steps.

S201: The first device generates a second signal.

Specifically, the second signal includes one or more DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs. Interference corresponding to the $Q_{(1)}$ real part PTRSs is a first preset value, the interference corresponding to the $Q_{(1)}$ real part PTRSs is generated based on the $Q_{(2)}$ imaginary part PTRSs, and $Q_{(1)}$ is less than or equal to $Q_{(2)}$; or interference corresponding to the $Q_{(2)}$ imaginary part PTRSs is a second preset value, the interference corresponding to the $Q_{(2)}$ imaginary part PTRSs is generated based on the $Q_{(1)}$ real part PTRSs, and $Q_{(1)}$ is greater than or equal to $Q_{(2)}$. The real part PTRS is a PTRS that includes only a real part signal, and the imaginary part PTRS is a PTRS that includes only an imaginary part signal.

Optionally, when $Q_{(1)}$ is greater than 1, the $Q_{(1)}$ real part PTRSs are consecutive real part signals; and when $Q_{(2)}$ is greater than 1, the $Q_{(2)}$ imaginary part PTRSs are consecutive imaginary part signals. It should be noted that, that the DFT-s-OFDM signal whose real and imaginary parts are separated is composed in a manner in which one real part signal is adjacent to one imaginary part signal may be understood as that the DFT-s-OFDM signal is sent in a manner in which a real part signal is adjacent to an imaginary part signal in a time sequence. For example, in a time sequence, 1 is used as a unit, a real part signal is sent at a moment t, an imaginary part signal is sent at a moment t+1, a real part signal is sent at a moment t+2, and so on. That the $Q_{(1)}$ real part PTRSs are consecutive real part signals may be understood as that for real part signals, the $Q_{(1)}$ real part PTRSs are consecutively sent in a time sequence, and when the $Q_{(1)}$ real part PTRSs are being sent, no real part data signal is sent. That the $Q_{(2)}$ imaginary part PTRSs are consecutive imaginary part signals may be understood as that for imaginary part signals, the $Q_{(2)}$ imaginary part PTRSs are consecutively sent in a time sequence, and when the $Q_{(2)}$ imaginary part PTRSs are being sent, no imaginary part data signal is sent. The real part data signal is a data signal that includes only the real part signal, and the imaginary part data signal is a data signal that includes only the imaginary part signal.

Figure 16:
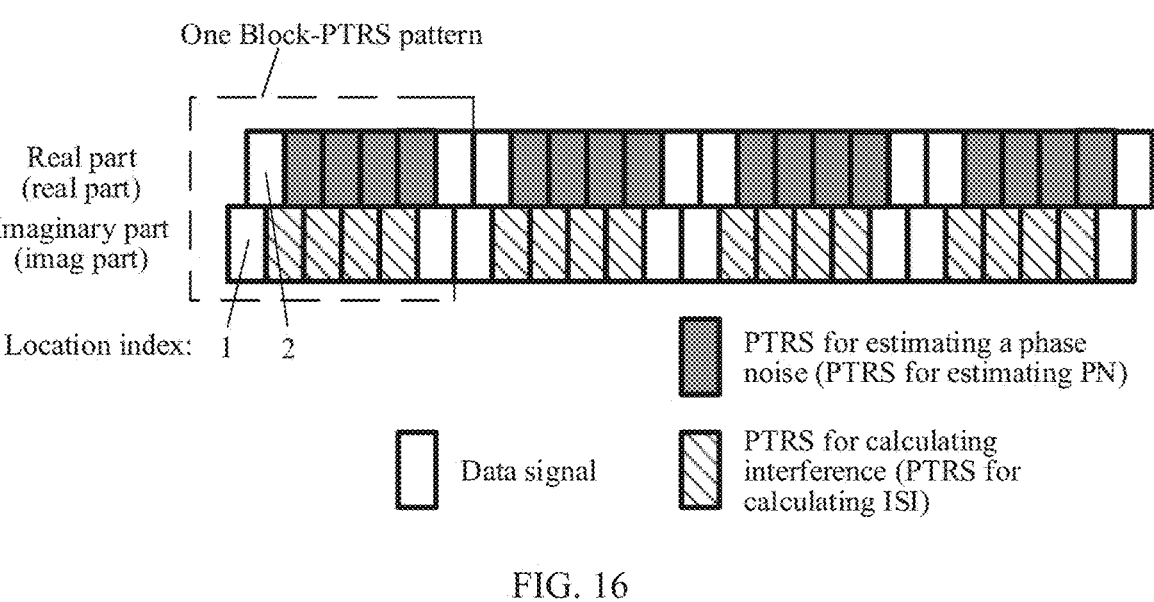
FIG. 16 is a schematic diagram of a Block-PTRS pattern of another DFT-s-OFDM signal according to an embodiment of this application.

In some embodiments, the DFT-s-OFDM signal is at least one of the following signals: an SC-OQAM signal, a DFT-S-OFDM signal carrying real and imaginary parts separated, a DFT-S-OFDM signal carrying a PAM constellation, a DFT-S-OFDM signal carrying real and imaginary parts separated of an addition filter, a DFT-S-OFDM signal carrying a PAM constellation of an addition filter, a UW-DFT-S-OFDM signal carrying real and imaginary parts separated, a UW-DFT-S-OFDM signal carrying a PAM constellation, a UW-DFT-S-OFDM signal carrying real and imaginary parts separated of an addition filter, a UW-DFT-S-OFDM signal carrying a PAM constellation of an addition filter, a ZT-DFT-S-OFDM signal carrying real and imaginary parts separated, a ZT-DFT-S-OFDM signal carrying a PAM constellation, a ZT-DFT-S-OFDM signal carrying real and imaginary parts separated of an addition filter, and a ZT-DFT-S-OFDM signal carrying a PAM constellation of an addition filter. For example, FIG. 16 is a schematic diagram of a Block-PTRS pattern of another DFT-s-OFDM signal according to an embodiment of this application. In FIG. 16, one DFT-s-OFDM signal includes four block-phase noise tracking pilot signal Block-PTRS patterns, one block-PTRS pattern includes Q (for example, eight) PTRSs, and the eight PTRSs include $Q_{(1)}$ (for example, four consecutive) real part PTRSs and $Q_{(2)}$ (for example, four consecutive) imaginary part PTRSs. It should be noted that the data signal in FIG. 16 is merely an example. In practical application, one Block-PTRS pattern may include more or fewer data signals. A quantity of data signals is not limited in this embodiment of this application.

In addition, FIG. 16 further illustrates a distribution manner of location indexes. For example, from left to right, location indexes of one real part signal and one imaginary part signal are adjacent, and one signal occupies one index location. It should be noted that location indexes represent a time sequence relationship of sending signals, and a relationship in ascending order of the location indexes of the signals represents a time sequence of sending the signals from front to back. In other words, the signals are sequentially sent in order of location index. In FIG. 16, specifically, in a first Block-PTRS pattern, location indexes of four real part PTRSs are 4, 6, 8, and 10, and a central location of the location indexes of the four real part PTRSs is 7; and location indexes of four imaginary part PTRSs are 3, 5, 7, and 9, and a central location of the location indexes of the four imaginary part PTRSs is 6. A difference between a central location of the location indexes of the $Q_{(1)}$ real part PTRSs and a central location of the location indexes of the $Q_{(2)}$ imaginary part PTRSs is one unit location. In other words, when $Q_{(1)}$ is equal to $Q_{(2)}$, a difference between a central location of the location indexes of the $Q_{(1)}$ real part PTRSs and a central location of the location indexes of the $Q_{(2)}$ imaginary part PTRSs is one unit location (for example, 1).

In some other implementations, it may alternatively be considered that one signal occupies 0.5 index locations, and distribution of location indexes is 0.5, 1, 1.5, 2, and the like. In this case, the unit location is 0.5.

In the example in FIG. 16, interference corresponding to the $Q_{(1)}$ real part PTRSs is a first preset value, the interference corresponding to the $Q_{(1)}$ real part PTRSs is generated based on the $Q_{(2)}$ imaginary part PTRSs, and $Q_{(1)}$ is equal to $Q_{(2)}$. In some other implementations, $Q_{(1)}$ may alternatively be less than $Q_{(2)}$. In this case, the $Q_{(1)}$ real part PTRSs are for estimating a phase noise, and the $Q_{(2)}$ imaginary part PTRSs are for calculating interference.

In some other implementations, interference corresponding to the $Q_{(2)}$ imaginary part PTRSs is a second preset value, the interference corresponding to the $Q_{(2)}$ imaginary part PTRSs is generated based on the $Q_{(1)}$ real part PTRSs, and $Q_{(1)}$ is greater than or equal to $Q_{(2)}$. In this case, the $Q_{(2)}$ imaginary part PTRSs are for estimating a phase noise, and the $Q_{(1)}$ real part PTRSs are for calculating interference. The different PTRS usages will be analyzed in the following content.

In the foregoing embodiment, the interference corresponding to the $Q_{(1)}$ real part PTRSs is the first preset value, or the interference corresponding to the $Q_{(2)}$ imaginary part PTRSs is the second preset value. When the value of the interference is determined, a phase noise of the second signal may be solved.

S202: The first device sends the second signal to a second device.

S203: After the second device receives the second signal sent by the first device, the second device determines a phase noise of the second signal based on the second signal.

The following describes a reason why the phase noise can be determined in the foregoing embodiment.

It is assumed that no phase noise exists in the second signal received by the second device. A real part PTRS in the second signal is used as an example. A real part PTRS (for ease of description, briefly referred to as a received signal) in the received second signal may be shown by formula 2-1.

$$x = P + j\sum_{n=1}^{N} ISI \qquad \text{formula 2-1}$$

P is a real part PTRS, and $$j\sum_{n=1}^{N} ISI$$

is a sum of interference caused to the received signal.

Interference received by the received signal is represented on an imaginary part. Therefore, the real part signal P may be demodulated by discarding the imaginary part. Specifically, the interference is represented as a sum term, because interference of an imaginary part signal may have multi-order components. That is to say, an imaginary part signal not only has an interference component (for example, a first-order interference component) for a nearest real part signal, but also has an interference component (for example, a second-order interference component) for a next real part signal; and may have an interference component (for example, an X-order interference component) for each of the following X real part signals.

It should be noted that a quantity of orders of interference components is related to a roll-off design of a waveform of the second signal. For example, if a roll-off factor of the waveform of the second signal is 0.2, a quantity of orders of interference components may be a maximum of seven orders (on a single side). For example, that a quantity of orders of interference components may be a maximum of seven orders may be represented as that an imaginary part signal interferes with a maximum of seven (on a single side) consecutive real part signals adjacent to the imaginary part signal. The seven (on a single side) consecutive real part signals are sorted in ascending order of distance. There is a seventh-order interference component for the seventh real part signal. In this embodiment of this application, a roll-off design of the waveform of the second signal is not limited.

For ease of understanding, FIG. 11 is used as an example for description. FIG. 11 is a schematic diagram of a waveform interference according to an embodiment of this application. FIG. 11 includes a plurality of real part signals (for example, a real part signal 2, a real part signal 4, a real part signal 6, and a real part signal 8) and a plurality of imaginary part signals (for example, an imaginary part signal 1, an imaginary part signal 3, an imaginary part signal 5, and an imaginary part signal 7).

Interference received by the real part signal 2 in FIG. 11 is now analyzed. As can be seen from FIG. 11, the real part signal 2 receives a first-order interference component of the imaginary part signal 3 and a second-order interference component of the imaginary part signal 5. It should be noted that FIG. 11 shows only an example of the first-order interference component of the imaginary part signal 3 and the second-order interference component of the imaginary part signal 5 that are received by the real part signal 2. However, other imaginary part signals also cause interference to the real part signal 2, for example, a first-order interference component of the imaginary part signal 1 and a third-order interference component of the imaginary part signal 7. However, the real part signal 4 (and other real part signals) is 0 at a sampling point of the signal carried by the waveform of the real part signal 2, that is, the real part signal 4 causes no interference to the real part signal 2.

When impact of a phase noise is considered, it may be learned based on formula 1-1 and formula 2-1 that the received signal may be shown by formula 2-2:

$$xe^{j\theta} = \left(P + j\sum_{n=1}^{N} ISI\right)e^{j\theta} \qquad \text{formula 2-2}$$

Formula 2-3 may be obtained by performing Euler expansion on formula 2-2:

$$xe^{j\theta} = \left(P + j\sum_{n=1}^{N} ISI\right)(\cos\theta + j\sin\theta) =$$

$$P\cos\theta - \sum_{n=1}^{N} ISI\,\sin\theta + j\left(P\,\sin\theta + \sum_{n=1}^{N} ISI\,\cos\theta\right)$$

$$\text{formula 2-3}$$

It can be seen from formula 2-3 that a real part of the received signal becomes $$P\cos\theta - \sum_{n=1}^{N} ISI\sin\theta.$$

Since both the interference term and the phase noise are unknown in this formula, the interference cannot be separated from the signal. In other words, in this manner, a phase noise causes a problem that an imaginary part signal leaks to a real part signal, to greatly reduce signal communication quality.

However, in the embodiment corresponding to FIG. 15, the interference corresponding to the $Q_{(1)}$ real part PTRSs is the first preset value, or the interference corresponding to the $Q_{(2)}$ imaginary part PTRSs is the second preset value. In other words, $$\sum_{n=1}^{N} ISI$$

in the real part signal or the imaginary part signal is known. When the value of the interference is determined, a phase noise of the second signal may be solved.

Specifically, in the embodiment corresponding to FIG. 15, the second signal includes one or more DFT-s-OFDM signals, one DFT-s-OFDM signal includes P block-phase noise tracking pilot signal Block-PTRS patterns, and one Block-PTRS pattern includes Q phase noise tracking pilot signals PTRSs. Specifically, there may be two possible implementation cases for the Q PTRSs. The following describes the two cases separately.

(1) First Case

Interference corresponding to the $Q_{(1)}$ real part PTRSs is a first preset value, the interference corresponding to the $Q_{(1)}$ real part PTRSs is generated based on the $Q_{(2)}$ imaginary part PTRSs, and $Q_{(1)}$ is less than or equal to $Q_{(2)}$. For example, for this implementation in which $Q_{(1)}$ is equal to $Q_{(2)}$, refer to the embodiment corresponding to FIG. 16. Specifically, $Q_{(1)}$ is 4 and $Q_{(2)}$ is 4. In some other embodiments, there may alternatively be other values. For example, $Q_{(1)}$ may be 5, and $Q_{(2)}$ may be 6. For another example, $Q_{(1)}$ may be 4, and $Q_{(2)}$ may be 6.

In this case, the $Q_{(1)}$ real part PTRSs are for estimating a phase noise, and the $Q_{(2)}$ imaginary part PTRSs are for calculating interference, so that interference corresponding to the $Q_{(1)}$ real part PTRSs is the first preset value. Optionally, in some embodiments, interference corresponding to each of the $Q_{(1)}$ real part PTRSs is the first preset value.

In some embodiments, the one Block-PTRS pattern further includes an imaginary part data signal and a real part data signal, that interference corresponding to the $Q_{(1)}$ real part PTRSs is generated based on the $Q_{(2)}$ imaginary part PTRSs includes: the interference corresponding to the $Q_{(1)}$ real part PTRSs is generated based on the $Q_{(2)}$ imaginary part PTRSs and the imaginary part data signal. Optionally, the interference corresponding to each of the $Q_{(1)}$ real part PTRSs is generated based on the $Q_{(2)}$ imaginary part PTRSs. Further, the interference corresponding to each of the $Q_{(1)}$ real part PTRSs is generated based on the $Q_{(2)}$ imaginary part PTRSs and the imaginary part data signal.

An embodiment corresponding to FIG. 16 is used as an example for description. The $Q_{(1)}$ real part PTRSs are four real part PTRSs (whose location indexes are 4, 6, 8, and 10 respectively). For example, the first preset value is 1. Interference received by the first real part PTRS (whose location index is 4) is generated based on an imaginary part signal (including an imaginary part PTRS and an imaginary part data signal). In FIG. 16, for interference caused to the first real part PTRS, refer to formula 2-4:

$$F_1 P_1 + F_1 P_2 + F_2 P_3 + F_3 P_4 + ISI_{data_i} = 1 \qquad \text{formula 2-4}$$

$F_n$ is a manner of calculating an n-order interference component corresponding to the first device. For example, $F_1$ is a manner of calculating a first-order interference component corresponding to the first device. $P_n$ is a value of an $n^{th}$ imaginary part PTRS. For example, $P_1$ is a value of a first imaginary part PTRS (whose location index is 3). $F_n P_n$ is a value of an n-order interference component of an $m^{th}$ imaginary part PTRS. $ISI_{data_i}$ is a value of interference that is received by a first real part PTRS (whose location index is 4) and that is caused by a data signal to the first real part PTRS. n and m are positive integers, where $1 \leq n \leq 4$, and $1 \leq m \leq 4$.

The following describes a manner of determining the $Q_{(2)}$ imaginary part PTRSs.

FIG. 16 is used as an example to analyze the first Block-PTRS pattern. For example, the first preset value is 1. For a total value of interference caused to the four real part PTRSs (whose location indexes are 4, 6, 8, and 10 respectively), refer to formula 2-5:

$$\begin{cases} F_1 P_1 + F_1 P_2 + F_2 P_3 + F_3 P_4 + ISI_{data_1} = 1 \qquad \text{formula 2-5} \\ F_2 P_1 + F_1 P_2 + F_1 P_3 + F_2 P_4 + ISI_{data_2} = 1 \\ F_3 P_1 + F_2 P_2 + F_1 P_3 + F_1 P_4 + ISI_{data_3} = 1 \\ F_4 P_1 + F_3 P_2 + F_2 P_3 + F_1 P_4 + ISI_{data_4} = 1 \end{cases}$$

In formula 2-5, total values of interference of the four real part PTRSs are sequentially listed. For a manner of calculating interference caused to each real part PTRS, refer to descriptions corresponding to formula 2-5. $ISI_{data_n}$ is a value of interference that is received by an $n^{th}$ real part PTRS and that is caused by an imaginary part data signal to the $n^{th}$ real part PTRS. For example, $ISI_{data_i}$ is a value of interference that is received by a first real part PTRS (whose location index is 4) and that is caused by an imaginary part data signal to F ISI P the first real part PTRS. Specifically, $F_n$ and $ISI_{data_n}$ are known. Therefore, the value of $P_n$ may be calculated.

In some possible implementations, the first preset value is at least one of the following values: $\sqrt{2}/2$, 1, $\sqrt{2}$, $3/\sqrt{10}$, $5/\sqrt{42}$, $3/\sqrt{42}$, $7/\sqrt{170}$, $5/\sqrt{170}$, $3/\sqrt{170}$, $9/\sqrt{648}$, $7/\sqrt{648}$, $5/\sqrt{648}$, $3/\sqrt{648}$, $j\sqrt{2}/2$, j, $j\sqrt{2}$, $j3/\sqrt{10}$, $j5/\sqrt{42}$, $j3/\sqrt{42}$, $j7/\sqrt{170}$, $j5/\sqrt{170}$, $j3/\sqrt{170}$, $j9/\sqrt{648}$, $j7/\sqrt{648}$, $j5/\sqrt{648}$, and $j3/\sqrt{648}$. In another expression manner, a square root function (sqrt(x)= $\sqrt{x}$) is for expressing the first preset value, and then the first preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt (648), 3/sqrt(648), jsqrt(2)/2, j, jsqrt(2), j3/sqrt(10), j5/sqrt (42), j3/sqrt(42), j7/sqrt(170), j5/sqrt(170), j3/sqrt(170), j9/sqrt(648), j7/sqrt(648), j5/sqrt(648), and j3/sqrt(648). It should be noted that, in practical application, the first preset value may be an approximate value of the values listed above, for example, $\sqrt{2}/2$, which may be 0.707. These values listed above are factors commonly used when constellation modulation is performed, for example, an outermost constellation point sqrt(2)/2 of a constellation symbol, and a constellation point normalization factor 3/sqrt(10). These values are all defined by a protocol, and therefore are easily accepted preset values. In addition, the outermost constellation point represents maximum signal energy that can be achieved by each symbol. Therefore, using the value of the outermost constellation point can maximize the signal-to-noise ratio of the PTRS without affecting the PAPR.

In some other possible implementations, the first preset value may alternatively be a value in a small range near a fixed value. For example, a value range of the first preset value may be [z−δ, z+δ], where z may be one of the foregoing listed possible values of the first preset value, and δ is a very small value, for example, 0.1 or 0.05. In this manner, interference caused to a real part PTRS may be relaxed into an inequality. For example, if the fixed value is 1, for interference caused to a first real part PTRS, refer to formula 2-6:

$$|F_1 P_1 + F_1 P_2 + F_2 \pm F_3 P_4 + ISI_{data_i}| 1 + \delta \qquad \text{formula 2-6}$$

Similarly, for a total value of interference caused to the four real part PTRSs (whose location indexes are 4, 6, 8, and 10 respectively), refer to formula 2-7:

$$\begin{cases} |F_1 P_1 + F_1 P_2 + F_2 P_3 + F_3 P_4 + ISI_{data_1}| \leq 1 + \delta \qquad \text{formula 2-7} \\ |F_2 P_1 + F_1 P_2 + F_1 P_3 + F_2 P_4 + ISI_{data_2}| \leq 1 + \delta \\ |F_3 P_1 + F_2 P_2 + F_1 P_3 + F_1 P_4 + ISI_{data_3}| \leq 1 + \delta \\ |F_4 P_1 + F_3 P_2 + F_2 P_3 + F_1 P_4 + ISI_{data_4}| \leq 1 + \delta \end{cases}$$

It should be noted that a restriction on the values of the four imaginary part PTRSs is relaxed in formula 2-8. In this manner, a value range of energy (or referred to as an amplitude, a size, or a value) of the $Q_{(2)}$ imaginary part PTRSs may be further agreed on. A value of $P_n$ may be solved with reference to the value range of the energy of the $Q_{(2)}$ imaginary part PTRSs and formula 2-8.

In a possible implementation, when the interference corresponding to the $Q_{(1)}$ real part PTRSs is the first preset value, energy of each of the $Q_{(2)}$ imaginary part PTRSs is less than a third preset value. Optionally, amplitudes, envelopes, sizes, or values of the $Q_{(2)}$ imaginary part PTRSs are less than the third preset value. Without loss of generality, energy is used as an example for description in this application.

Optionally, the third preset value may be preset, for example, 1.5 or 2. In this manner, a restriction on the values of the $Q_{(2)}$ imaginary part PTRSs may be relaxed, and further, an energy range of the $Q_{(2)}$ imaginary part PTRSs can be agreed on, to avoid a problem that the PAPR of the second signal is excessively large because energy of the $Q_{(2)}$ imaginary part PTRSs is excessively large.

In some embodiments, both $Q_{(1)}$ and $Q_{(2)}$ are even numbers. In this manner, the Block-PTRS pattern used in this solution is compatible with that in an existing solution. A difference lies in that this solution restricts an association between PTRS signals in a Block-PTRS pattern. In this manner, changes of the Block-PTRS pattern can be reduced, to facilitate forward compatibility of the solution.

(2) Second Case

Interference corresponding to the $Q_{(2)}$ imaginary part PTRSs is a second preset value, the interference corresponding to the $Q_{(2)}$ imaginary part PTRSs is generated based on the $Q_{(1)}$ real part PTRSs, and $Q_{(1)}$ is greater than or equal to $Q_{(2)}$.

Figure 17:
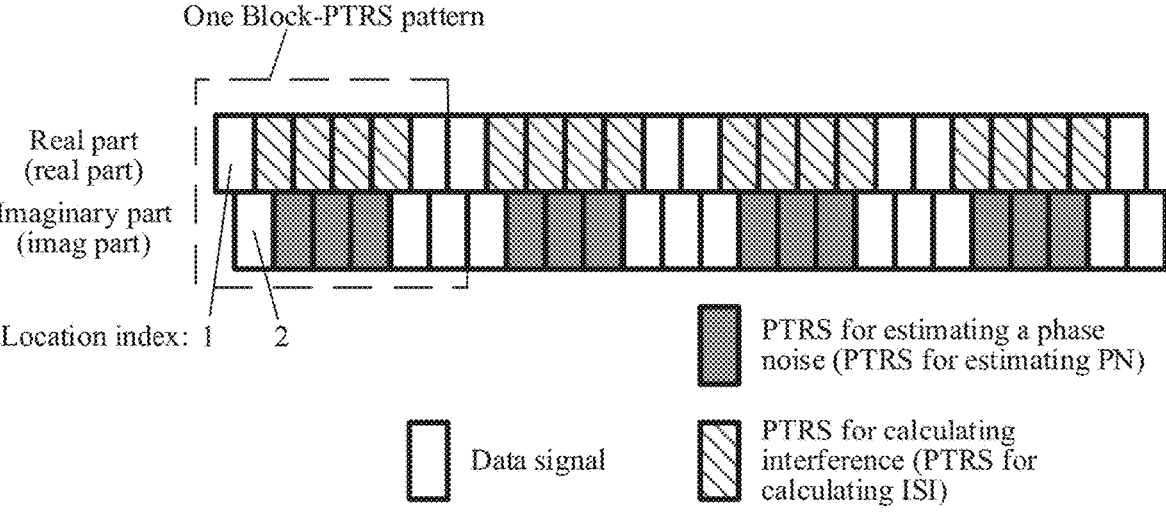
FIG. 17 is a schematic diagram of a Block-PTRS pattern of another DFT-s-OFDM signal according to an embodiment of this application.

FIG. 17 is a schematic diagram of a Block-PTRS pattern of another DFT-s-OFDM signal according to an embodiment of this application. FIG. 17 shows an example of such an implementation in which $Q_{(1)}$ is greater than $Q_{(2)}$. In some other embodiments, there may alternatively be other values. For example, $Q_{(1)}$ may be 6, and $Q_{(2)}$ may be 5. For another example, $Q_{(1)}$ may be 6, and $Q_{(2)}$ may be 3. For another example, $Q_{(1)}$ may be 4, and $Q_{(2)}$ may be 4.

In FIG. 17, one DFT-s-OFDM signal includes four block-phase noise tracking pilot signal Block-PTRS patterns, one block-PTRS pattern includes Q (for example, seven) PTRSs, and the seven PTRSs include $Q_{(1)}$ (for example, four) consecutive real part PTRSs and $Q_{(2)}$ (for example, three) consecutive imaginary part PTRSs. It should be noted that the data signal in FIG. 17 is merely an example. In practical application, one Block-PTRS pattern may include more or fewer data signals. A quantity of data signals is not limited in this embodiment of this application.

In addition, FIG. 17 further illustrates a distribution manner of location indexes. For example, from left to right, location indexes of one real part signal and one imaginary part signal are adjacent, and one signal occupies one index location. Specifically, in a first Block-PTRS pattern, location indexes of four real part PTRSs are 3, 5, 7, and 9, and a central location of the location indexes of the four real part PTRSs is 6; and location indexes of three imaginary part PTRSs are 4, 6, and 8, and a central location of the location indexes of the three imaginary part PTRSs is 6. A central location of location indexes of the four real part PTRSs is the same as a central location of location indexes of the three imaginary part PTRSs.

In this case, the $Q_{(2)}$ imaginary part PTRSs are for estimating a phase noise, and the $Q_{(1)}$ real part PTRSs are for calculating interference, so that interference corresponding to the $Q_{(2)}$ imaginary part PTRSs is the second preset value. Optionally, in some embodiments, interference corresponding to each of the $Q_{(2)}$ imaginary part PTRSs is the second preset value. Optionally, that the interference corresponding to the $Q_{(1)}$ real part PTRSs is the first preset value includes: the interference value corresponding to the $Q_{(1)}$ real part PTRSs is the first preset value, or an amplitude of the interference value corresponding to the $Q_{(1)}$ real part PTRSs is the first preset value; and that the interference corresponding to the $Q_{(2)}$ imaginary part PTRSs is the second preset value includes: the interference value corresponding to the $Q_{(2)}$ imaginary part PTRSs is the second preset value, or an amplitude of the interference value corresponding to the $Q_{(2)}$ imaginary part PTRSs is the second preset value.

In some embodiments, the one Block-PTRS pattern further includes an imaginary part data signal and a real part data signal, that interference corresponding to the $Q_{(2)}$ imaginary part PTRSs is generated based on the $Q_{(1)}$ real part PTRSs includes: the interference corresponding to the $Q_{(2)}$ imaginary part PTRSs is generated based on the $Q_{(1)}$ real part PTRSs and the real part data signal. Optionally, the interference corresponding to each of the $Q_{(2)}$ imaginary part PTRSs is generated based on the $Q_{(1)}$ real part PTRSs. Further, the interference corresponding to each of the $Q_{(2)}$ imaginary part PTRSs is generated based on the $Q_{(1)}$ real part PTRSs and the real part data signal.

An embodiment corresponding to FIG. 17 is used as an example for description. The $Q_{(1)}$ real part PTRSs are four real part PTRSs (whose location indexes are 3, 5, 7, and 9 respectively), and the $Q_{(2)}$ imaginary part PTRSs are three imaginary part PTRSs (whose location indexes are 4, 6, and 8). For example, the second preset value is 1. Interference received by the first imaginary part PTRS (whose location index is 3) is generated based on a real part signal (including a real part PTRS and a real part data signal). In FIG. 17, for interference caused to the first imaginary part PTRS, refer to formula 2-8:

$$F_1 P_1^* + F_1 P_2^* + F_2 P_3^* + F_3 P_4^* + ISI^*_{data_i} = 1 \qquad \text{formula 2-8}$$

$F_n$ is a manner of calculating an n-order interference component corresponding to the first device. For example, $F_1$ is a manner of calculating a first-order interference component corresponding to the first device. $P_n^*$ is a value of an $n^{th}$ real part PTRS. For example, $P_1^*$ is a value of a first real part PTRS (whose location index is 3). $F_n P_m^*$ is a value of an n-order interference component of an $m^{th}$ real part PTRS. $ISI_{data_i}$ is a value of interference that is received by a first imaginary part PTRS (whose location index is 4) and that is caused by a data signal to the first imaginary part PTRS. n and m are positive integers, where $1 \leq n \leq 4$, and $1 \leq m \leq 4$.

The following describes a manner of determining the $Q_{(1)}$ real part PTRSs.

FIG. 17 is used as an example to analyze the first Block-PTRS pattern. For example, the second preset value is 1. For a total value of interference caused to the three imaginary part PTRSs (whose location indexes are 4, 6, and 8 respectively), refer to formula 2-9:

$$\begin{cases} F_1 P_1^* + F_1 P_2^* + F_2 P_3^* + F_3 P_4^* + ISI_{data_1} = 1 \\ F_2 P_1^* + F_1 P_2^* + F_1 P_3^* + F_2 P_4^* + ISI_{data_2} = 1 \\ F_3 P_1^* + F_2 P_2^* + F_1 P_3^* + F_1 P_4^* + ISI_{data_3} = 1 \end{cases} \qquad \text{formula 2-9}$$

In formula 2-9, total values of interference of the three imaginary part PTRSs are sequentially listed. For a manner of calculating interference caused to each imaginary part PTRS, refer to descriptions corresponding to formula 2-10. $ISI_{data_n}$ is a value of interference that is received by an $n^{th}$ imaginary part PTRS and that is caused by a real part data signal to the $n^{th}$ real part PTRS. For example, $ISI_{data_i}$ is a value of interference that is received by a first real part PTRS (whose location index is 4) and that is caused by a real part data signal to the F ISI first imaginary part PTRS. Specifically, $F_n$ and $ISI_{data_n}$ are known. Therefore, the $Q_{(1)}$ real part PTRSs may be values of P that satisfy formula 2-10.

In some possible implementations, the second preset value is at least one of the following values: $\sqrt{2}/2$, 1, $\sqrt{2}$, $3/\sqrt{10}$, $5/\sqrt{42}$, $3/\sqrt{42}$, $7/\sqrt{170}$, $5/\sqrt{170}$, $3/\sqrt{170}$, $9/\sqrt{648}$, $7/\sqrt{648}$, $5/\sqrt{648}$, $3/\sqrt{648}$, $j\sqrt{2}/2$, j, $j\sqrt{2}$, $j3/\sqrt{10}$, $j5/\sqrt{42}$, $j3/\sqrt{42}$, $j7/\sqrt{170}$, $j5/\sqrt{170}$, $j3/\sqrt{170}$, $j9/\sqrt{648}$, $j7/\sqrt{648}$, $j5/\sqrt{648}$, and $j3/\sqrt{648}$. In another expression manner, a square root function $(sqrt(x) = \sqrt{x})$ is for expressing the second preset value, and then the second preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt(170), j3/sqrt(170), j9/sqrt(648), j7/sqrt(648), j5/sqrt(648), and j3/sqrt(648). It should be noted that, in practical application, the second preset value may be an approximate value of the values listed above, for example, V212, which may be 0.707. These values listed above are factors commonly used when constellation modulation is performed, for example, an outermost constellation point sqrt(2)/2 of a constellation symbol, and a constellation point normalization factor 3/sqrt (10). These values are all defined by a protocol, and therefore are easily accepted preset values. In addition, the outermost constellation point represents maximum signal energy that can be achieved by each symbol. Therefore, using the value of the outermost constellation point can maximize the signal-to-noise ratio of the PTRS without affecting the PAPR.

In some possible implementations, the first preset value and the second preset value are determined based on a receiver type. For example, the receiver type may include a matched filtering receiver, a rectangular window receiver, an RC receiver, and the like. The first device may determine, based on the receiver type, a calculation manner (which may be, for example, a calculation formula) for calculating inter-code interference (or referred to as inter-symbol interference) (inter-symbol interference, ISI), and calculates the first preset value and the second preset value based on the calculation manner, a value of the data signal, and a preset receiving value of the PTRS.

Optionally, before the first device generates the second signal, the method further includes: The first device obtains first indication information sent by the second device, where the first indication information indicates the receiver type. The receiver type is determined by the second device.

Optionally, the first device sends second indication information to the second device, where the second indication information indicates the receiver type. The receiver type is determined by the first device.

In some other possible implementations, the second preset value may alternatively be a value in a small range near a fixed value. For example, a value range of the second preset value may be [z−δ, z+δ], where z may be one of the foregoing listed possible values of the second preset value, and δ is a very small value, for example, 0.1 or 0.05. In this manner, interference caused to an imaginary part PTRS may be relaxed into an inequality. For example, if the fixed value is 1, for interference caused to a first imaginary part PTRS, refer to formula 2-10:

$$|F_1 P_1{}^* + F_1 P_2{}^* + F_2 P_3{}^* + F_3 P_4{}^* + ISI_{data_1}| \leq 1+\delta \qquad \text{formula 2-10}$$

Similarly, for a total value of interference caused to the three imaginary part PTRSs (whose location indexes are 4, 6, and 8 respectively), refer to formula 2-11:

$$\begin{cases} |F_1 P_1^* + F_1 P_2^* + F_2 P_3^* + F_3 P_4^* + ISI_{data_1}| \leq 1 + \delta & \text{formula 2-11} \\ |F_2 P_1^* + F_1 P_2^* + F_1 P_3^* + F_2 P_4^* + ISI_{data_2}| \leq 1 + \delta \\ |F_3 P_1^* + F_2 P_2^* + F_1 P_3^* + F_1 P_4^* + ISI_{data_3}| \leq 1 + \delta \end{cases}$$

It should be noted that a restriction on the values of the four real part PTRSs is relaxed in formula 2-11. In this manner, a value range of energy (or referred to as an amplitude, a size, or a value) of the $Q_{(1)}$ real part PTRSs may be further agreed on. A value of $P_n{}^*$ may be solved with reference to the value range of the energy of the $Q_{(1)}$ real part PTRSs and formula 2-8.

In a possible implementation, when the interference corresponding to the $Q_{(2)}$ imaginary part PTRSs is the second preset value, energy of each of the $Q_{(1)}$ real part PTRSs is less than a fourth preset value. Optionally, amplitudes, envelopes, sizes, or values of the $Q_{(1)}$ real part PTRSs are less than the fourth preset value. Without loss of generality, energy is used as an example for description in this application.

Optionally, the fourth preset value may be preset, for example, 1.5 or 2. In this manner, a restriction on the values of the $Q_{(1)}$ real parts may be relaxed, and further, an energy range of the $Q_{(1)}$ real parts can be agreed on, to avoid a problem that the PAPR of the second signal is excessively large because energy of the $Q_{(1)}$ real parts is excessively large.

In some embodiments, both $Q_{(1)}$ and $Q_{(2)}$ are even numbers. In this manner, the Block-PTRS pattern used in this solution is compatible with that in an existing solution. A difference lies in that this solution restricts an association between PTRS signals in a Block-PTRS. In this manner, changes of the Block-PTRS pattern can be reduced, to facilitate forward compatibility of the solution.

Figure 18:
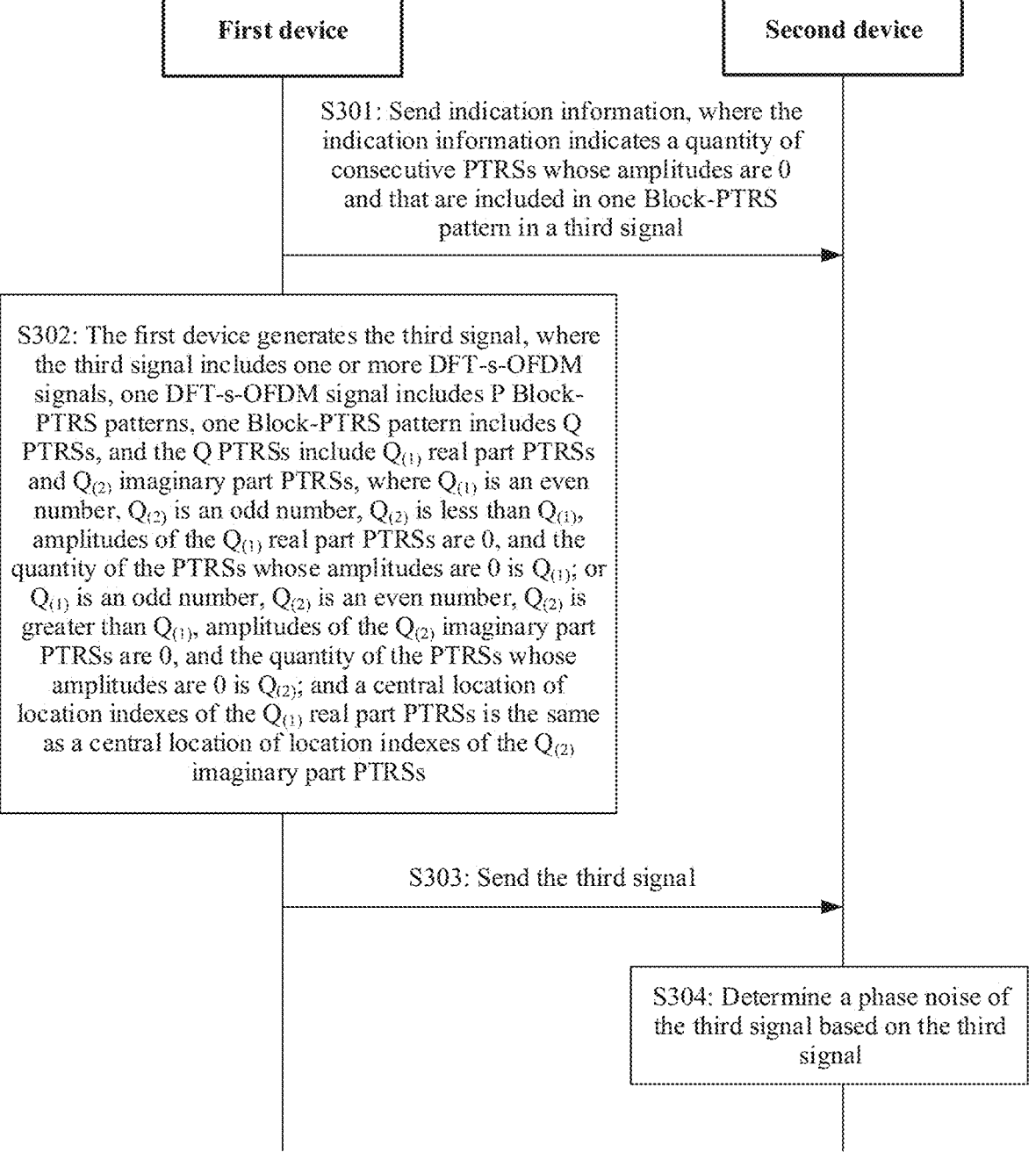
FIG. 18 is a flowchart of another phase noise suppression method according to an embodiment of this application.

FIG. 18 is a flowchart of another phase noise suppression method according to an embodiment of this application. The method may be implemented based on the network architecture shown in FIG. 1. In an implementation, the first device may be the network device in FIG. 1, and the second device may be the terminal device in FIG. 1. The method includes the following steps.

S301: The first device sends indication information to a second device.

The indication information indicates a quantity of consecutive phase noise tracking pilot signals (PTRSs) whose amplitudes are 0 and that are included in one block-phase noise tracking pilot signal (Block-PTRS) pattern in a third signal.

In some embodiments, the quantity of the PTRSs whose amplitudes are 0 and that are included in the one Block-PTRS pattern is determined based on a quantity of orders of signal components of a filter of the first device. For example, if a roll-off factor of the waveform of the third signal is 0.2, a quantity of orders of interference components may be a maximum of seven orders (on a single side). That is to say, one real part signal can receive a maximum of seven orders of interference components of one imaginary part signal. In this case, the quantity of the PTRSs whose amplitudes are 0 and that are included in the one Block-PTRS is 14.

In some embodiments, the indication information may be included in at least one of the following signaling: radio resource control (radio resource control, RRC) signaling, a media access control-control element (media access control-control element, MAC-CE) signaling, and downlink control information (downlink control information, DCI) signaling.

In a possible implementation, the indication information may be a value of the quantity of the PTRSs whose amplitudes are 0 and that are included in the one Block-PTRS.

In another possible implementation, the indication information may alternatively be an index value, and there is a correspondence between the index value and the quantity of the PTRSs whose amplitudes are 0 and that are included in the one Block-PTRS. The second device may determine, based on the index value, the quantity of the PTRSs whose amplitudes are 0 and that are included in the one Block-PTRS. Optionally, the second device may store a data table that records the correspondence between the index value and the quantity of the PTRSs whose amplitudes are 0 and that are included in the one Block-PTRS.

Optionally, the data table may alternatively be an equivalent representation manner. The quantity of the PTRSs whose amplitudes are 0 and that are included in the one Block-PTRS pattern is determined based on a quantity of orders of signal components of a filter of the first device.

Therefore, the data table may also store a correspondence between the index value and a quantity of orders of signal components of the filter of the first device. Because there is a correspondence between an extended bandwidth and a roll-off factor of a time-domain filter and a quantity of orders of signal components of the filter of the first device, the data table may further store a correspondence between the index value and the extended bandwidth or the roll-off factor of the time-domain filter.

S302: The first device generates the third signal.

The third signal includes one or more DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is an even number, $Q_{(2)}$ is an odd number, $Q_{(2)}$ is less than $Q_{(1)}$, amplitudes of the $Q_{(1)}$ real part PTRSs are 0, and the quantity of the PTRSs whose amplitudes are 0 is $Q_{(1)}$; or $Q_{(1)}$ is an odd number, $Q_{(2)}$ is an even number, $Q_{(2)}$ is greater than $Q_{(1)}$, amplitudes of the $Q_{(2)}$ imaginary part PTRSs are 0, and the quantity of the PTRSs whose amplitudes are 0 is $Q_{(2)}$; and A central location of location indexes of the $Q_{(1)}$ real part PTRSs is the same as a central location of location indexes of the $Q_{(2)}$ imaginary part PTRSs, or it is considered that a central location of location indexes of the $Q_{(1)}$ real part PTRSs is aligned with a central location of location indexes of the $Q_{(2)}$ imaginary part PTRSs. The real part PTRS is a PTRS that includes only a real part signal, and the imaginary part PTRS is a PTRS that includes only an imaginary part signal.

Optionally, when $Q_{(1)}$ is greater than 1, the $Q_{(1)}$ real part PTRSs are consecutive real part signals; and when $Q_{(2)}$ is greater than 1, the $Q_{(2)}$ imaginary part PTRSs are consecutive imaginary part signals. It should be noted that, that the DFT-s-OFDM signal whose real and imaginary parts are separated is composed in a manner in which one real part signal is adjacent to one imaginary part signal may be understood as that the DFT-s-OFDM signal is sent in a manner in which a real part signal is adjacent to an imaginary part signal in a time sequence. For example, in a time sequence, 1 is used as a unit, a real part signal is sent at a moment t, an imaginary part signal is sent at a moment t+1, a real part signal is sent at a moment t+2, and so on. That the $Q_{(1)}$ real part PTRSs are consecutive real part signals may be understood as that for real part signals, the $Q_{(1)}$ real part PTRSs are consecutively sent in a time sequence, and when the $Q_{(1)}$ real part PTRSs are being sent, no real part data signal is sent. That the $Q_{(2)}$ imaginary part PTRSs are consecutive imaginary part signals may be understood as that for imaginary part signals, the $Q_{(2)}$ imaginary part PTRSs are consecutively sent in a time sequence, and when the $Q_{(2)}$ imaginary part PTRSs are being sent, no imaginary part data signal is sent. The real part data signal is a data signal that includes only the real part signal, and the imaginary part data signal is a data signal that includes only the imaginary part signal.

In some embodiments, the DFT-s-OFDM signal is at least one of the following signals: an SC-OQAM signal, a DFT-S-OFDM signal carrying real and imaginary parts separated, a DFT-S-OFDM signal carrying a PAM constellation, a DFT-S-OFDM signal carrying real and imaginary parts separated of an addition filter, a DFT-S-OFDM signal carrying a PAM constellation of an addition filter, a UW-DFT-S-OFDM signal carrying real and imaginary parts separated, a UW-DFT-S-OFDM signal carrying a PAM constellation, a UW-DFT-S-OFDM signal carrying real and imaginary parts separated of an addition filter, a UW-DFT-S-OFDM signal carrying a PAM constellation of an addition filter, a ZT-DFT- S-OFDM signal carrying real and imaginary parts separated, a ZT-DFT-S-OFDM signal carrying a PAM constellation, a ZT-DFT-S-OFDM signal carrying real and imaginary parts separated of an addition filter, and a ZT-DFT-S-OFDM signal carrying a PAM constellation of an addition filter.

Figure 19:
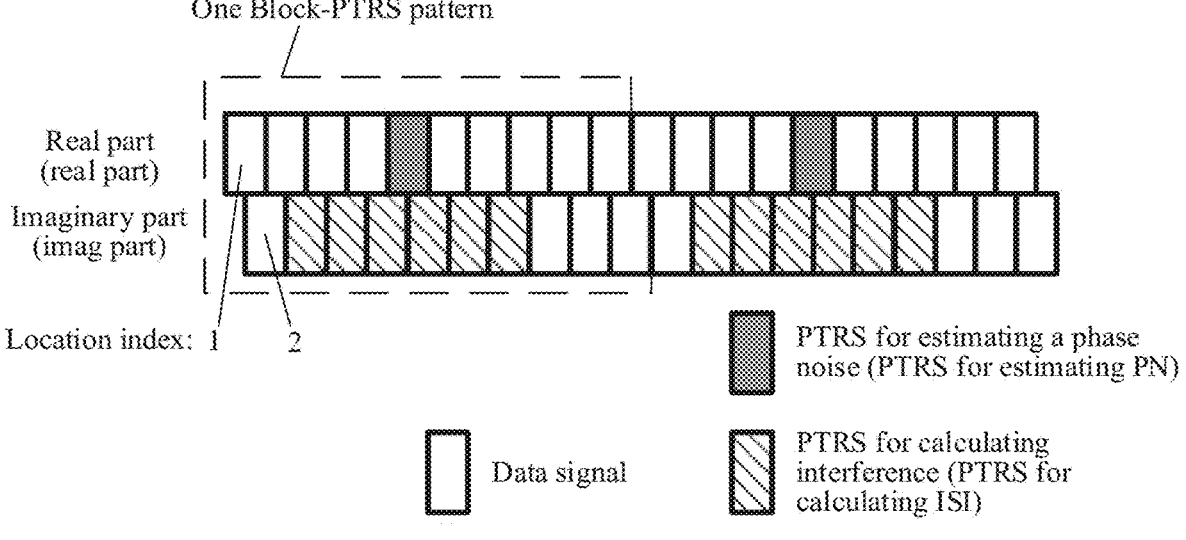
FIG. 19 is a schematic diagram of a Block-PTRS pattern of another DFT-s-OFDM signal according to an embodiment of this application.

For example, FIG. 19 is a schematic diagram of a Block-PTRS pattern of a DFT-s-OFDM signal according to an embodiment of this application. In FIG. 19, one DFT-s-OFDM signal includes two block-phase noise tracking pilot signal Block-PTRS patterns (PTRSs and data signals included in a dashed box in FIG. 19 form one Block-PTRS pattern), the one block-PTRS pattern includes Q (for example, seven) phase noise tracking pilot signals PTRSs, and the seven PTRSs include $Q_{(1)}$ (for example, one) real part PTRSs and $Q_{(2)}$ (for example, six consecutive) imaginary part PTRSs. It should be noted that the data signal in FIG. 10 is merely an example. In practical application, one Block-PTRS pattern may include more or fewer data signals. A quantity of data signals is not limited in this embodiment of this application.

In addition, FIG. 19 further illustrates a distribution manner of location indexes. For example, from left to right, location indexes of one real part signal and one imaginary part signal are adjacent, and one signal occupies one index location. It should be noted that location indexes represent a time sequence relationship of sending signals, and a relationship in ascending order of the location indexes of the signals represents a time sequence of sending the signals from front to back. In other words, the signals are sequentially sent in order of location index. In FIG. 19, specifically, in a first Block-PTRS pattern, a location index of one real part PTRS is 9, and a central location of the location index of the one real part PTRS is 9; and location indexes of six imaginary part PTRSs are 4, 6, 8, 10, 12, and 14, and a central location of the location indexes of the six imaginary part PTRSs is 9. A central location of location indexes of the $Q_{(1)}$ real part PTRSs is the same as a central location of location indexes of the $Q_{(2)}$ imaginary part PTRSs, or it may be considered that a central location of location indexes of the $Q_{(1)}$ real part PTRSs is aligned with a central location of location indexes of the $Q_{(2)}$ imaginary part PTRSs.

In some other implementations, it may alternatively be considered that one signal occupies 0.5 index locations, and distribution of location indexes is 0.5, 1, 1.5, 2, and the like.

In the example of FIG. 19, $Q_{(1)}$ is an odd number, $Q_{(2)}$ is an even number, and $Q_{(2)}$ is greater than $Q_{(1)}$. In this case, an odd number of real part PTRSs are for estimating a phase noise, and an even number of imaginary part PTRSs are for calculating interference. Amplitudes of the $Q_{(2)}$ imaginary part PTRSs are 0. That is to say, interference caused by an even number of imaginary part PTRSs to an odd number of real part PTRSs is 0.

In some other implementations, $Q_{(1)}$ is an even number, $Q_{(2)}$ is an odd number, and $Q_{(2)}$ is less than $Q_{(1)}$. In this case, an odd number of imaginary part PTRSs are for estimating a phase noise, and an even number of real part PTRSs are for calculating interference (which may be understood as determining a value of the interference). Amplitudes of the $Q_{(1)}$ real part PTRSs are 0. That is to say, interference caused by an even number of real part PTRSs to an odd number of imaginary part PTRSs is 0. When the value of the interference is 0, a phase noise of the third signal may be solved.

S303: The first device sends the third signal to the second device.

S304: After the second device receives the third signal sent by the first device, the second device determines a phase noise of the third signal based on the third signal.

It should be noted that, in this embodiment, after the network device sends the indication information to the terminal device, it may be considered that the network device and the terminal device agree on a manner of generating a DFT-s-OFDM signal. In a subsequent communication process, alternatively, the terminal device may send, to the network device, a DFT-s-OFDM signal generated in a manner similar to a manner of generating the third signal.

The following describes a reason why the phase noise can be determined in the foregoing embodiment.

It is assumed that no phase noise exists in the third signal received by the second device. A real part PTRS in the third signal is used as an example. A real part PTRS (for ease of description, briefly referred to as a received signal) in the received third signal may be shown by formula 3-1.

$$x = P + j\sum_{n=1}^{N} ISI \qquad \text{formula } 3\text{--}1$$

P is a real part PTRS, and $$j\sum_{n=1}^{N} ISI$$

is a sum of interference caused to the received signal.

Interference received by the received signal is represented on an imaginary part. Therefore, the real part signal P may be demodulated by discarding the imaginary part. Specifically, the interference is represented as a sum term, because interference of an imaginary part signal may have multi-order components. That is to say, an imaginary part signal not only has an interference component (for example, a first-order interference component) for a nearest real part signal, but also has an interference component (for example, a second-order interference component) for a next real part signal; and may have an interference component (for example, an X-order interference component) for each of the following X real part signals.

It should be noted that a quantity of orders of interference components is related to a roll-off design of a waveform of the third signal. For example, if a roll-off factor of the waveform of the third signal is 0.2, a quantity of orders of interference components may be a maximum of seven orders (on a single side). For example, that a quantity of orders of interference components may be a maximum of seven orders may be represented as that an imaginary part signal interferes with a maximum of seven (on a single side) consecutive real part signals adjacent to the imaginary part signal. The seven (on a single side) consecutive real part signals are sorted in ascending order of distance. There is a seventh-order interference component for the seventh real part signal. In this embodiment of this application, a roll-off design of the waveform of the third signal is not limited.

For ease of understanding, FIG. 11 is used as an example for description. FIG. 11 is a schematic diagram of a waveform interference according to an embodiment of this application. FIG. 11 includes a plurality of real part signals (for example, a real part signal 2, a real part signal 4, a real part signal 6, and a real part signal 8) and a plurality of imaginary part signals (for example, an imaginary part signal 1, an imaginary part signal 3, an imaginary part signal 5, and an imaginary part signal 7).

Interference received by the real part signal 2 in FIG. 11 is now analyzed. As can be seen from FIG. 11, the real part signal 2 receives a first-order interference component of the imaginary part signal 3 and a second-order interference component of the imaginary part signal 5. It should be noted that the figure shows only an example of the first-order interference component of the imaginary part signal 3 and the second-order interference component of the imaginary part signal 5 that are received by the real part signal 2. However, other imaginary part signals also cause interference to the real part signal 2, for example, a first-order interference component of the imaginary part signal 1 and a third-order interference component of the imaginary part signal 7. However, the real part signal 4 (and other real part signals) is 0 at a sampling point of the signal carried by the waveform of the real part signal 2, that is, the real part signal 4 causes no interference to the real part signal 2.

When impact of a phase noise is considered, it may be learned based on formula 1-1 and formula 3-1 that the received signal may be shown by formula 3-2:

$$xe^{j\theta} = \left(P + j\sum_{n=1}^{N} ISI\right)e^{j\theta} \qquad \text{formula } 3\text{--}2$$

Formula 3-3 may be obtained by performing Euler expansion on formula 3-2:

$$xe^{j\theta} = \left(P + j\sum_{n=1}^{N} ISI\right)(\cos\theta + j\sin\theta) = \qquad \text{formula } 3\text{--}3$$

$$P\cos\theta - \sum_{n=1}^{N} ISI\sin\theta + j\left(P\sin\theta + \sum_{n=1}^{N} ISI\cos\theta\right)$$

It can be seen from formula 3-3 that a real part of the received signal becomes $$P\cos\theta - \sum_{n=1}^{N} ISI\sin\theta.$$

Since both the interference term and the phase noise are unknown in this formula, the interference cannot be separated from the signal. In other words, in this manner, a phase noise causes a problem that an imaginary part signal leaks to a real part signal, to greatly reduce signal communication quality.

Impact of interference caused to one real part PTRS is analyzed. FIG. 12 is a schematic diagram of a multi-order interference component according to an embodiment of this application. In FIG. 12, interference caused to one real part PTRS comes from a first-order interference component of a left imaginary signal (namely, an imaginary part signal) #1 and a right imaginary signal #1, and a second-order interference component of a left imaginary signal #2 and a right imaginary signal #2. A quantity of orders of interference components is related to a roll-off design of a waveform of the third signal. For example, if a quantity of orders of interference components can be a maximum of three orders (on a single side), and it is agreed on that amplitudes of three left imaginary part signals and three right imaginary part signals of the one real part signal are all 0, interference received by the one real part signal is 0. That is to say, in this case, in formula 3-3, $$\sum_{n=1}^{N} ISI = 0.$$

When the value of the interference is 0, a phase noise of the third signal may be solved.

In the embodiment corresponding to FIG. 18, the third signal includes one or more DFT-s-OFDM signals, one DFT-s-OFDM signal includes P block-phase noise tracking pilot signal Block-PTRS patterns, and one Block-PTRS pattern includes Q phase noise tracking pilot signals PTRSs. The Q PTRSs include $Q_{(1)}$ real part PTRSs and $Q_{(2)}$ imaginary part PTRSs. A central location of location indexes of the $Q_{(1)}$ real part PTRSs is the same as a central location of location indexes of the $Q_{(2)}$ imaginary part PTRSs. Specifically, there may be two possible implementation cases for the Q PTRSs. The following describes the two cases separately.

(1) First Case $Q_{(1)}$ is an odd number, $Q_{(2)}$ is an even number, $Q_{(2)}$ is greater than $Q_{(1)}$, and amplitudes of the $Q_{(2)}$ imaginary part PTRSs are 0. For example, for this implementation, refer to the embodiment corresponding to FIG. 19. Specifically, $Q_{(1)}$ is 1 and $Q_{(2)}$ is 6. In some other embodiments, there may alternatively be other values. For example, $Q_{(1)}$ may be 3, and $Q_{(2)}$ may be 8.

In this case, an even number of imaginary part PTRSs are for calculating interference, and an odd number of real part PTRSs are for estimating a phase noise. Because interference caused to each of the odd number of real part PTRSs is 0, the second device may calculate the phase noise of the third signal.

In some embodiments, $Q_{(2)}$ is determined based on a quantity of orders of signal components of a filter of the first device. Optionally, when $Q_{(1)}$ is equal to 1, $Q_{(2)}$ is equal to twice the quantity of orders (on a single side) of signal components of the filter of the first device. Optionally, when $Q_{(1)}$ is equal to x, $Q_{(2)}$ is equal to a sum of x−1 and twice the quantity of orders (on a single side) of signal components of the filter of the first device.

(2) Second Case $Q_{(1)}$ is an even number, $Q_{(2)}$ is an odd number, $Q_{(2)}$ is less than $Q_{(1)}$, and amplitudes of the $Q_{(1)}$ real part PTRSs are 0. In this case, an even number of real part PTRSs are for calculating interference, and an odd number of imaginary part PTRSs are for estimating a phase noise. Because interference caused to each of the odd number of imaginary part PTRSs is 0, the second device may calculate the phase noise of the third signal.

In some embodiments, $Q_{(1)}$ is determined based on a quantity of orders of signal components of a filter of the first device. Optionally, when $Q_{(2)}$ is equal to 1, $Q_{(1)}$ is equal to twice the quantity of orders (on a single side) of signal components of the filter of the first device. Optionally, when $Q_{(2)}$ is equal to x, $Q_{(1)}$ is equal to a sum of x−1 and twice the quantity of orders (on a single side) of signal components of the filter of the first device.

FIG. 20 is a flowchart of another phase noise suppression method according to an embodiment of this application. The method may be implemented based on the network architecture shown in FIG. 1. In an implementation, the first device may be the network device in FIG. 1, and the second device may be the terminal device in FIG. 1. The method includes the following steps.

S401: The first device sends indication information to a second device.

the indication information indicates a quantity of consecutive imaginary part data signals and imaginary part PTRSs included in one Block-PTRS pattern in a fourth signal, and the imaginary part data signals and the imaginary part PTRSs have opposite phases and a same amplitude; or the indication information indicates a quantity of consecutive real part data signals and real part PTRSs included in one Block-PTRS pattern in a fourth signal, and the real part data signals and the real part PTRSs have opposite phases and a same amplitude. The real part PTRS is a PTRS that includes only a real part signal, and the imaginary part PTRS is a PTRS that includes only an imaginary part signal.

In some embodiments, the quantity of the consecutive imaginary part data signals and imaginary part PTRSs included in the one Block-PTRS, or the quantity of the consecutive real part data signals and real part PTRSs included in the one Block-PTRS pattern (briefly referred to as K below for ease of description) is determined based on a quantity of orders of signal components of a filter of the first device. For example, if a roll-off factor of the waveform of the third signal is 0.2, a quantity of orders of interference components may be a maximum of seven orders (on a single side). That is to say, one real part signal can receive a maximum of seven orders of interference components of one imaginary part signal. In this case, K is 14. In some embodiments, the indication information may be included in at least one of the following signaling: radio resource control (radio resource control, RRC) signaling, a media access control-control element (media access control-control element, MAC-CE) signaling, and downlink control information (downlink control information, DCI) signaling.

In a possible implementation, the indication information may be a value of K.

In another possible implementation, the indication information may alternatively be an index value, and there is a correspondence between the index value and K. The second device may determine a value of K based on the index value. Optionally, the second device may store a data table that records the correspondence between the index value and K. Optionally, the data table may alternatively be an equivalent representation manner. K is determined based on a quantity of orders of signal components of a filter of the first device. Therefore, the data table may also store a correspondence between the index value and a quantity of orders of signal components of the filter of the first device. Because there is a correspondence between an extended bandwidth or a roll-off factor of a time-domain filter and a quantity of orders of signal components of the filter of the first device, the data table may further store a correspondence between the index value and the extended bandwidth or the roll-off factor of the time-domain filter.

S402: The first device generates the fourth signal.

The fourth signal includes one or more DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is 1, and a central location of location indexes of the $Q_{(2)}$ imaginary part PTRSs and the imaginary part data signals is the same as a central location of location indexes of the $Q_{(1)}$ real part PTRSs; or $Q_{(2)}$ is 1, and a central location of location indexes of the $Q_{(1)}$ real part PTRSs and the real part data signals is the same as a central location of location indexes of the $Q_{(2)}$ imaginary part PTRSs.

In some embodiments, the DFT-s-OFDM signal is at least one of the following signals: an SC-OQAM signal, a DFT-S-OFDM signal carrying real and imaginary parts separated, a DFT-S-OFDM signal carrying a PAM constellation, a DFT-S-OFDM signal carrying real and imaginary parts separated of an addition filter, a DFT-S-OFDM signal carrying a PAM constellation of an addition filter, a UW-DFT-S-OFDM signal carrying real and imaginary parts separated, a UW-DFT-S-OFDM signal carrying a PAM constellation, a UW-DFT-S-OFDM signal carrying real and imaginary parts separated of an addition filter, a UW-DFT-S-OFDM signal carrying a PAM constellation of an addition filter, a ZT-DFT-S-OFDM signal carrying real and imaginary parts separated, a ZT-DFT-S-OFDM signal carrying a PAM constellation, a ZT-DFT-S-OFDM signal carrying real and imaginary parts separated of an addition filter, and a ZT-DFT-S-OFDM signal carrying a PAM constellation of an addition filter.

Figure 21:
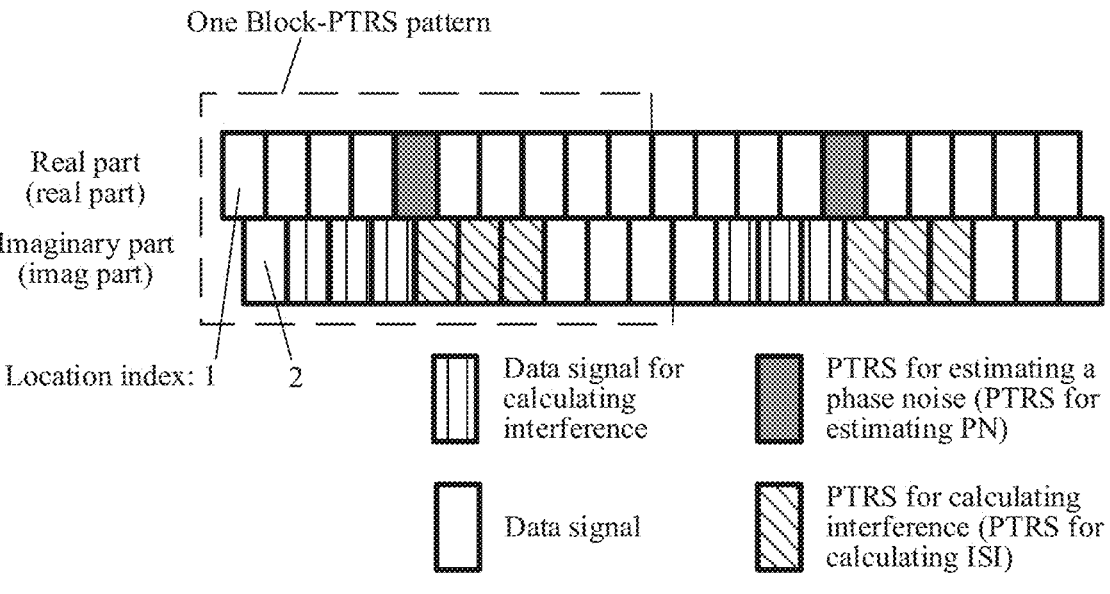
FIG. 21 is a schematic diagram of a Block-PTRS pattern of another DFT-s-OFDM signal according to an embodiment of this application.

For example, FIG. 21 is a schematic diagram of a Block-PTRS pattern of another DFT-s-OFDM signal according to an embodiment of this application. In FIG. 21, one DFT-s-OFDM signal includes two block-phase noise tracking pilot signal Block-PTRS patterns (PTRSs and data signals included in a dashed box in FIG. 21 form one Block-PTRS pattern), the one block-PTRS pattern includes Q (for example, four) phase noise tracking pilot signals PTRSs, and the four PTRSs include $Q_{(1)}$ (for example, one) real part PTRSs and $Q_{(2)}$ (for example, three consecutive) imaginary part PTRSs. It should be noted that the data signal in FIG. 10 is merely an example. In practical application, one Block-PTRS pattern may include more or fewer data signals. A quantity of data signals is not limited in this embodiment of this application.

In addition, FIG. 21 further illustrates a distribution manner of location indexes. For example, from left to right, location indexes of one real part signal and one imaginary part signal are adjacent, and one signal occupies one index location. Specifically, in a first Block-PTRS pattern, a location index of one real part PTRS is 9, and a central location of the location index of the one real part PTRS is 9. The first Block-PTRS pattern further includes consecutive imaginary part data signals and imaginary part PTRSs (for example, three imaginary part data signals for calculating interference and three imaginary part PTRSs for calculating interference). Location indexes of the three imaginary part data signals are 4, 6, and 8, and location indexes of the three imaginary part PTRSs are 10, 12, and 14. A central location of the location indexes of the three imaginary part data signals and the three imaginary part PTRSs is 9. A central location of the location indexes of the $Q_{(2)}$ imaginary part PTRSs and the imaginary part data signals is the same as a central location of the location indexes of the $Q_{(1)}$ real part PTRSs, or it is considered that a central location of the location indexes of the $Q_{(2)}$ imaginary part PTRSs and the imaginary part data signals is aligned with a central location of the location indexes of the $Q_{(1)}$ real part PTRSs.

In some other implementations, it may alternatively be considered that one signal occupies 0.5 index locations, and distribution of location indexes is 0.5, 1, 1.5, 2, and the like.

In the example of FIG. 21, the imaginary part data signal and the imaginary part PTRS have opposite phases and a same amplitude. It should be noted that, that the imaginary part data signal and the imaginary part PTRS have opposite phases and a same amplitude means that a central location of location indexes of the $Q_{(1)}$ real part PTRSs is used as a symmetric center, and an imaginary part data signal and an imaginary part PTRS at symmetric locations have opposite phases and a same amplitude. For example, an imaginary part data signal whose location index is 4 and an imaginary part PTRS whose location index is 14 have opposite phases and a same amplitude; an imaginary part data signal whose location index is 6 and an imaginary part PTRS whose location index is 12 have opposite phases and a same amplitude; and an imaginary part data signal whose location index is 8 and an imaginary part PTRS whose location index is 10 have opposite phases and a same amplitude. In this manner, a total value of interference caused to a real part PTRS whose location index is 9 is 0. Therefore, the phase noise of the fourth signal may be solved.

In some other implementations, the indication information indicates a quantity of consecutive real part data signals and real part PTRSs included in one Block-PTRS pattern in a fourth signal, and the real part data signals and the real part PTRSs have opposite phases and a same amplitude. $Q_{(2)}$ is 1, and a central location of the location indexes of the $Q_{(1)}$ real part PTRSs and the real part data signals is the same as a central location of the location indexes of the $Q_{(2)}$ imaginary part PTRSs, or it is considered that a central location of the location indexes of the $Q_{(1)}$ real part PTRSs and the real part data signals is aligned with a central location of the location indexes of the $Q_{(2)}$ imaginary part PTRSs. In this manner, a total value of interference caused to the $Q_{(2)}$ imaginary part PTRSs is 0. Therefore, the phase noise of the fourth signal may be solved.

S403: The first device sends the fourth signal to the second device.

S404: After the second device receives the fourth signal sent by the first device, the second device determines a phase noise of the fourth signal based on the fourth signal.

It should be noted that, in this embodiment, after the network device sends the indication information to the terminal device, it may be considered that the network device and the terminal device agree on a manner of generating a DFT-s-OFDM signal. In a subsequent communication process, alternatively, the terminal device may send, to the network device, a DFT-s-OFDM signal generated in a manner similar to a manner of generating the fourth signal.

The following describes a reason why the phase noise can be determined in the foregoing embodiment.

It is assumed that no phase noise exists in the fourth signal received by the second device. A real part PTRS in the fourth signal is used as an example. A real part PTRS (for ease of description, briefly referred to as a received signal) in the received fourth signal may be shown by formula 4-1.

$$x = P + j\sum_{n=1}^{N} ISI \qquad \text{formula 4-1}$$

P is a real part PTRS, and $$j\sum_{n=1}^{N} ISI$$

is a sum of interference caused to the received signal.

Interference received by the received signal is represented on an imaginary part. Therefore, the real part signal P may be demodulated by discarding the imaginary part. Specifically, the interference is represented as a sum term, because interference of an imaginary part signal may have multi-order components. That is to say, an imaginary part signal not only has an interference component (for example, a first-order interference component) for a nearest real part signal, but also has an interference component (for example, a second-order interference component) for a next real part signal; and may have an interference component (for example, an X-order interference component) for each of the following X real part signals.

It should be noted that a quantity of orders of interference components is related to a roll-off design of a waveform of the fourth signal. For example, if a roll-off factor of the waveform of the fourth signal is 0.2, a quantity of orders of interference components may be a maximum of seven orders (on a single side). For example, that a quantity of orders of interference components may be a maximum of seven orders may be represented as that an imaginary part signal inter-feres with a maximum of seven (on a single side) consecu-tive real part signals adjacent to the imaginary part signal. The seven (on a single side) consecutive real part signals are sorted in ascending order of distance. There is a seventh-order interference component for the seventh real part signal. In this embodiment of this application, a roll-off design of the waveform of the fourth signal is not limited.

For ease of understanding, FIG. 11 is used as an example for description. FIG. 11 is a schematic diagram of a wave-form interference according to an embodiment of this appli-cation. FIG. 11 includes a plurality of real part signals (for example, a real part signal 2, a real part signal 4, a real part signal 6, and a real part signal 8) and a plurality of imaginary part signals (for example, an imaginary part signal 1, an imaginary part signal 3, an imaginary part signal 5, and an imaginary part signal 7).

Interference received by the real part signal 2 in FIG. 11 is now analyzed. As can be seen from FIG. 11, the real part signal 2 receives a first-order interference component of the imaginary part signal 3 and a second-order interference component of the imaginary part signal 5. It should be noted that the figure shows only an example of the first-order interference component of the imaginary part signal 3 and the second-order interference component of the imaginary part signal 5 that are received by the real part signal 2. However, other imaginary part signals also cause interfer-ence to the real part signal 2, for example, a first-order interference component of the imaginary part signal 1 and a third-order interference component of the imaginary part signal 7. However, the real part signal 4 (and other real part signals) is 0 at a sampling point of the signal carried by the waveform of the real part signal 2, that is, the real part signal 4 causes no interference to the real part signal 2.

When impact of a phase noise is considered, it may be learned based on formula 1-1 and formula 4-1 that the received signal may be shown by formula 4-2:

$$xe^{j\theta} = \left(P + j\sum_{n=1}^{N} ISI\right)e^{j\theta} \qquad \text{formula 4–2}$$

Formula 4-3 may be obtained by performing Euler expan-sion on formula 4-2:

$$xe^{j\theta} = \left(P + j\sum_{n=1}^{N} ISI\right)(\cos\theta + j\sin\theta) = \qquad \text{formula 4–3}$$

-continued
$$P\cos\theta - \sum_{n=1}^{N} ISI\,\sin\theta + j\left(P\,\sin\theta + \sum_{n=1}^{N} ISI\,\cos\theta\right)$$

It can be seen from formula 4-3 that a real part of the received signal becomes $$P\cos\theta - \sum_{n=1}^{N} ISI\sin\theta.$$

Since both the interference term and the phase noise are unknown in this formula, the interference cannot be sepa-rated from the signal. In other words, in this manner, a phase noise causes a problem that an imaginary part signal leaks to a real part signal, to greatly reduce signal communication quality.

Impact of interference caused to one real part PTRS is analyzed. FIG. 12 is a schematic diagram of a multi-order interference component according to an embodiment of this application. In FIG. 12, interference caused to one real part PTRS comes from a first-order interference component of a left imaginary signal (namely, an imaginary part signal) #1 and a right imaginary signal #1, and a second-order inter-ference component of a left imaginary signal #2 and a right imaginary signal #2. A quantity of orders of interference components is related to a roll-off design of a waveform of the fourth signal. For example, if a quantity of orders of interference components can be a maximum of three orders (on a single side), and it is agreed on that three right imaginary part signals and three left imaginary part signals of the one real part signal have a same amplitude and opposite phases, interference caused by the right imaginary part signals to the one real part signal and interference caused by the left imaginary part signals to the one real part signal can be mutually canceled, and then a total value of interference received by the one real part signal is 0. That is to say, in this case, in formula 4-3, $$\sum_{n=1}^{N} ISI = 0.$$

When the value of the interference is 0, a phase noise of the fourth signal may be solved.

In the embodiment corresponding to FIG. 20, the fourth signal includes one or more discrete Fourier transform-spread orthogonal frequency division multiplexing DFT-s-OFDM signals, one DFT-s-OFDM signal includes P Block-PTRS patterns, one Block-PTRS pattern includes Q PTRSs, and the Q PTRSs include $Q_{(1)}$ consecutive real part PTRSs and $Q_{(2)}$ consecutive imaginary part PTRSs. Specifically, there may be two possible implementation cases for the Q PTRSs. The following describes the two cases separately.

(1) First Case $Q_{(1)}$ is 1, and a central location of location indexes of the $Q_{(2)}$ imaginary part PTRSs and the imaginary part data signals is the same as a central location of location indexes of the $Q_{(1)}$ real part PTRSs. For this implementation, refer to the embodiment corresponding to FIG. 21. Specifically, $Q_{(1)}$ is 1 and $Q_{(2)}$ is 3. In this case, the indication information indicates a quantity of consecutive imaginary part data signals and imaginary part PTRSs included in one Block- PTRS pattern in a fourth signal, and the imaginary part data signals and the imaginary part PTRSs have opposite phases and a same amplitude.

In this case, the consecutive imaginary part data signals and imaginary part PTRSs are for calculating interference, so that interference caused to the real part PTRSs is 0. The real part PTRSs are for estimating a phase noise.

In some embodiments, a quantity of consecutive imaginary part data signals and imaginary part PTRSs that are included in one block-PTRS pattern is determined based on a quantity of orders of signal components of a filter of the first device. Optionally, when $Q_{(1)}$ is equal to 1, a quantity of consecutive imaginary part data signals and imaginary part PTRSs that are included in one block-PTRS pattern is equal to twice the quantity of orders (on a single side) of signal components of the filter of the first device.

(2) Second Case $Q_{(2)}$ is 1, and a central location of location indexes of the $Q_{(1)}$ real part PTRSs and the real part data signals is the same as a central location of location indexes of the $Q_{(2)}$ imaginary part PTRSs. In this case, the indication information indicates a quantity of consecutive real part data signals and real part PTRSs included in one Block-PTRS pattern in a fourth signal, and the real part data signals and the real part PTRSs have opposite phases and a same amplitude.

In this case, the consecutive real part data signals and real part PTRSs are for calculating interference, so that interference caused to the imaginary part PTRSs is 0. The imaginary part PTRSs are for estimating a phase noise.

In some embodiments, a quantity of consecutive real part data signals and real part PTRSs that are included in one block-PTRS pattern is determined based on a quantity of orders of signal components of a filter of the first device. Optionally, when $Q_{(2)}$ is equal to 1, a quantity of consecutive real part data signals and real part PTRSs that are included in one block-PTRS pattern is equal to twice the quantity of orders (on a single side) of signal components of the filter of the first device.

FIG. 22 is a flowchart of another phase noise suppression method according to an embodiment of this application. The method may be implemented based on the network architecture shown in FIG. 1. In an implementation, the first device may be the network device in FIG. 1, and the second device may be the terminal device in FIG. 1. In another implementation, the first device may be the terminal device in FIG. 1, and the second device may be the network device in FIG. 1. The method includes the following steps.

S501: The first device generates a fifth signal.

The fifth signal includes one or more DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ first PTRSs and $Q_{(2)}$ second PTRSs; the first PTRS includes a real part PTRS, and the second PTRS includes an imaginary part PTRS; the first PTRS includes an imaginary part PTRS, and the second PTRS includes a real part PTRS; or each of the first PTRS and the second PTRS includes a real part PTRS and an imaginary part PTRS; and interference or an amplitude of interference corresponding to the first PTRS is a fifth preset value, where if the first PTRS includes a real part PTRS and the second PTRS includes an imaginary part PTRS, or the first PTRS includes an imaginary part PTRS and the second PTRS includes a real part PTRS, the interference corresponding to the first PTRS is generated based on the second PTRS; or if each of the first PTRS and the second PTRS includes a real part PTRS and an imaginary part PTRS, interference corresponding to the real part PTRS in the first PTRS is generated based on the imaginary part PTRS in the first PTRS and the imaginary part PTRS in the second PTRS, and interference corresponding to the imaginary part PTRS in the first PTRS is generated based on the real part PTRS in the first PTRS and the real part PTRS in the second PTRS. The real part PTRS is a PTRS that includes only a real part signal, and the imaginary part PTRS is a PTRS that includes only an imaginary part signal.

In some embodiments, the DFT-s-OFDM signal is at least one of the following signals: an SC-OQAM signal, a DFT-S-OFDM signal carrying real and imaginary parts separated, a DFT-S-OFDM signal carrying a PAM constellation, a DFT-S-OFDM signal carrying real and imaginary parts separated of an addition filter, a DFT-S-OFDM signal carrying a PAM constellation of an addition filter, a UW-DFT-S-OFDM signal carrying real and imaginary parts separated, a UW-DFT-S-OFDM signal carrying a PAM constellation, a UW-DFT-S-OFDM signal carrying real and imaginary parts separated of an addition filter, a UW-DFT-S-OFDM signal carrying a PAM constellation of an addition filter, a ZT-DFT-S-OFDM signal carrying real and imaginary parts separated, a ZT-DFT-S-OFDM signal carrying a PAM constellation, a ZT-DFT-S-OFDM signal carrying real and imaginary parts separated of an addition filter, and a ZT-DFT-S-OFDM signal carrying a PAM constellation of an addition filter.

For example, FIG. 23 is a schematic diagram of a Block-PTRS pattern of another DFT-s-OFDM signal according to an embodiment of this application. In FIG. 23, one DFT-s-OFDM signal includes four block-phase noise tracking pilot signal Block-PTRS patterns, one block-PTRS pattern includes Q (for example, eight) PTRSs, and the eight PTRSs include $Q_{(1)}$ (for example, four) first PTRSs and $Q_{(2)}$ (for example, four) second PTRSs. Real part PTRSs in the first PTRSs and real part PTRSs in the second PTRSs are consecutive, and imaginary part PTRSs in the first PTRSs and imaginary part PTRSs in the second PTRSs are consecutive. It should be noted that the data signal in FIG. 23 is merely an example. In practical application, one Block-PTRS pattern may include more or fewer data signals. A quantity of data signals is not limited in this embodiment of this application.

In addition, FIG. 23 further illustrates a distribution manner of location indexes. For example, from left to right, location indexes of one real part signal and one imaginary part signal are adjacent, and one signal occupies one index location. It should be noted that location indexes represent a time sequence relationship of sending signals, and a relationship in ascending order of the location indexes of the signals represents a time sequence of sending the signals from front to back. In other words, the signals are sequentially sent in order of location index. In FIG. 23, specifically, in a first Block-PTRS pattern, location indexes of four first PTRSs are 5, 6, 7, and 8, and a central location of the location indexes of the four first PTRSs is 6.5; and location indexes of four imaginary part PTRSs are 3, 4, 9, and 10, and a central location of the location indexes of the four second PTRSs is 6.5. A central location of location indexes of the $Q_{(1)}$ first PTRSs is the same as a central location of location indexes of the $Q_{(2)}$ first PTRSs. In other words, when $Q_{(1)}$ is equal to $Q_{(2)}$, a central location of location indexes of the $Q_{(1)}$ first PTRSs is the same as a central location of location indexes of the $Q_{(2)}$ second PTRSs, or it is considered that a central location of location indexes of the $Q_{(1)}$ first PTRSs is aligned with a central location of location indexes of the $Q_{(2)}$ second PTRSs.

In some embodiments, if a quantity of real part PTRSs in the first PTRSs is equal to a quantity of imaginary part PTRSs in the first PTRSs, and a quantity of real part PTRSs in the second PTRSs is equal to a quantity of imaginary part PTRSs in the second PTRSs, a central location of location indexes of the first PTRSs is the same as a central location of location indexes of the second PTRSs, or it is considered that a central location of location indexes of the first PTRSs is aligned with a central location of location indexes of the second PTRSs.

In some other implementations, it may alternatively be considered that one signal occupies 0.5 index locations, and distribution of location indexes is 0.5, 1, 1.5, 2, and the like.

In the example in FIG. 23, the interference corresponding to the first PTRS is a fifth preset value, the interference corresponding to the real part PTRS in the first PTRS is generated based on the imaginary part PTRS in the first PTRS and the imaginary part PTRS in the second PTRS, and the interference corresponding to the imaginary part PTRS in the first PTRS is generated based on the real part PTRS in the first PTRS and the real part PTRS in the second PTRS.

In the foregoing embodiment, interference or an amplitude of interference corresponding to the first PTRS is a fifth preset value. When the value of the interference is determined, a phase noise of the fifth signal may be solved. It should be noted that for a case in which the first PTRS includes a real part PTRS and the second PTRS includes an imaginary part PTRS, refer to the case that is described in the embodiment corresponding to FIG. 15 and in which interference corresponding to the $Q_{(1)}$ real part PTRSs is a first preset value (which has the same meaning as the fifth preset value herein). For a case in which the first PTRS includes an imaginary part PTRS and the second PTRS includes a real part PTRS, refer to the case that is described in the embodiment corresponding to FIG. 15 and in which interference corresponding to the $Q_{(2)}$ imaginary part PTRSs is a second preset value (which has the same meaning as the fifth preset value herein).

S502: The first device sends the fifth signal to a second device.

S503: After the second device receives the fifth signal sent by the first device, the second device determines a phase noise of the fifth signal based on the fifth signal.

The following describes a reason why the phase noise can be determined in the foregoing embodiment.

It is assumed that no phase noise exists in the fifth signal received by the second device. A real part PTRS in the fifth signal is used as an example. A real part PTRS (for ease of description, briefly referred to as a received signal) in the received fifth signal may be shown by formula 5-1.

$$x = P + j\sum_{n=1}^{N}ISI \qquad \text{formula 5-1}$$

P is a real part PTRS, and $$j\sum_{n=1}^{N}ISI$$

is a sum of interference caused to the received signal.

Interference received by the received signal is represented on an imaginary part. Therefore, the real part signal P may be demodulated by discarding the imaginary part. Specifically, the interference is represented as a sum term, because interference of an imaginary part signal may have multi-order components. That is to say, an imaginary part signal not only has an interference component (for example, a first-order interference component) for a nearest real part signal, but also has an interference component (for example, a second-order interference component) for a next real part signal; and may have an interference component (for example, an X-order interference component) for each of the following X real part signals.

It should be noted that a quantity of orders of interference components is related to a roll-off design of a waveform of the fifth signal. For example, if a roll-off factor of the waveform of the fifth signal is 0.2, a quantity of orders of interference components may be a maximum of seven orders (on a single side). For example, that a quantity of orders of interference components may be a maximum of seven orders may be represented as that an imaginary part signal interferes with a maximum of seven (on a single side) consecutive real part signals adjacent to the imaginary part signal. The seven (on a single side) consecutive real part signals are sorted in ascending order of distance. There is a seventh-order interference component for the seventh real part signal. In this embodiment of this application, a roll-off design of the waveform of the fifth signal is not limited.

For ease of understanding, FIG. 11 is used as an example for description. FIG. 11 is a schematic diagram of a waveform interference according to an embodiment of this application. FIG. 11 includes a plurality of real part signals (for example, a real part signal 2, a real part signal 4, a real part signal 6, and a real part signal 8) and a plurality of imaginary part signals (for example, an imaginary part signal 1, an imaginary part signal 3, an imaginary part signal 5, and an imaginary part signal 7).

Interference received by the real part signal 2 in FIG. 11 is now analyzed. As can be seen from FIG. 11, the real part signal 2 receives a first-order interference component of the imaginary part signal 3 and a second-order interference component of the imaginary part signal 5. It should be noted that the figure shows only an example of the first-order interference component of the imaginary part signal 3 and the second-order interference component of the imaginary part signal 5 that are received by the real part signal 2. However, other imaginary part signals also cause interference to the real part signal 2, for example, a first-order interference component of the imaginary part signal 1 and a third-order interference component of the imaginary part signal 7. However, the real part signal 4 (and other real part signals) is 0 at a sampling point of the signal carried by the waveform of the real part signal 2, that is, the real part signal 4 causes no interference to the real part signal 2.

When impact of a phase noise is considered, it may be learned based on formula 1-1 and formula 5-1 that the received signal may be shown by formula 5-2:

$$xe^{j\theta} = \left(P + j\sum_{n=1}^{N}ISI\right)e^{j\theta} \qquad \text{formula 5-2}$$

Formula 5-3 may be obtained by performing Euler expansion on formula 5-2:

$$xe^{j\theta} = \left(P + j\sum_{n=1}^{N}ISI\right)(\cos\theta + j\sin\theta) = \qquad \text{formula 5-3}$$

-continued $$P \cos \theta - \sum_{n=1}^{N} ISI \sin \theta + j \left( P \sin \theta + \sum_{n=1}^{N} ISI \cos \theta \right)$$

It can be seen from formula 5-3 that a real part of the received signal becomes $$P\cos\theta - \sum_{n=1}^{N} ISI\sin\theta.$$

Since both the interference term and the phase noise are unknown in this formula, the interference cannot be separated from the signal. In other words, in this manner, a phase noise causes a problem that an imaginary part signal leaks to a real part signal, to greatly reduce signal communication quality.

However, in the embodiment corresponding to FIG. 22, interference corresponding to the first PTRS is a fifth preset value. In other words, $$\sum_{n=1}^{N} ISI$$

in the real part signal or the imaginary part signal is known. When the value of the interference is determined, a phase noise of the fifth signal may be solved.

The following uses FIG. 23 as an example to specifically describe the embodiment corresponding to FIG. 22.

In the embodiment corresponding to FIG. 23, interference or an amplitude of interference corresponding to the first PTRS is a fifth preset value, the interference corresponding to the real part PTRS in the first PTRS is generated based on the imaginary part PTRS in the first PTRS and the imaginary part PTRS in the second PTRS, and the interference corresponding to the imaginary part PTRS in the first PTRS is generated based on the real part PTRS in the first PTRS and the real part PTRS in the second PTRS.

Optionally, the interference or the amplitude of the interference corresponding to each PTRS in the first PTRSs is the fifth preset value. Further, the interference corresponding to each PTRS in the real part PTRSs in the first PTRSs is generated based on the imaginary part PTRSs in the first PTRSs and the imaginary part PTRSs in the second PTRSs; and the interference corresponding to each PTRS in the imaginary part PTRSs in the first PTRSs is generated based on the real part PTRSs in the first PTRSs and the real part PTRSs in the second PTRSs.

Optionally, if the first PTRS includes a real part PTRS and the second PTRS includes an imaginary part PTRS, or the first PTRS includes an imaginary part PTRS and the second PTRS includes a real part PTRS, the interference corresponding to each PTRS in the first PTRSs is generated based on the second PTRS. In some embodiments, the one Block-PTRS pattern further includes an imaginary part data signal and a real part data signal; and if the first PTRS includes a real part PTRS and the second PTRS includes an imaginary part PTRS, that the interference corresponding to the first PTRS is generated based on the second PTRS includes: the interference corresponding to the first PTRS is generated based on the second PTRS and the imaginary part data signal. If the first PTRS includes an imaginary part PTRS and the second PTRS includes a real part PTRS, that the interference corresponding to the first PTRS is generated based on the second PTRS includes: the interference corresponding to the first PTRS is generated based on the second PTRS and the real part data signal. If each of the first PTRS and the second PTRS includes a real part PTRS and an imaginary part PTRS, that interference corresponding to the real part PTRS in the first PTRS is generated based on the imaginary part PTRS in the first PTRS and the imaginary part PTRS in the second PTRS, and interference corresponding to the imaginary part PTRS in the first PTRS is generated based on the real part PTRS in the first PTRS and the real part PTRS in the second PTRS includes: the interference corresponding to the real part PTRS in the first PTRS is generated based on the imaginary part PTRS in the first PTRS, the imaginary part PTRS in the second PTRS, and the imaginary part data signal, and the interference corresponding to the imaginary part PTRS in the first PTRS is generated based on the real part PTRS in the first PTRS, the real part PTRS in the second PTRS, and the real part data signal.

Optionally, in some embodiments, if the first PTRS includes a real part PTRS and the second PTRS includes an imaginary part PTRS, that the interference corresponding to the first PTRS is generated based on the second PTRS includes: the interference corresponding to each PTRS in the first PTRSs is generated based on the second PTRS and the imaginary part data signal. In some embodiments, if the first PTRS includes an imaginary part PTRS and the second PTRS includes a real part PTRS, that the interference corresponding to the first PTRS is generated based on the second PTRS includes: the interference corresponding to each PTRS in the first PTRSs is generated based on the second PTRS and the real part data signal. In some embodiments, if each of the first PTRS and the second PTRS includes a real part PTRS and an imaginary part PTRS, that interference corresponding to each PTRS in the real part PTRSs in the first PTRSs is generated based on the imaginary part PTRS in the first PTRS and the imaginary part PTRS in the second PTRS includes: the interference corresponding to each PTRS in the real part PTRSs in the first PTRSs is generated based on an imaginary part PTRS in the first PTRS, an imaginary part PTRS in the second PTRS, and the imaginary part data signal. That the interference corresponding to each PTRS in the imaginary part PTRSs in the first PTRSs is generated based on the real part PTRSs in the first PTRSs and the real part PTRSs in the second PTRSs includes: the interference corresponding to each PTRS in the imaginary part PTRSs in the first PTRSs is generated based on a real part PTRS in the first PTRS, a real part PTRS in the second PTRS, and the real part data signal.

The embodiment corresponding to FIG. 23 is used as an example for description. Location indexes of the first PTRSs are respectively 5, 6, 7, and 8, location indexes of the second PTRSs are, for example, 3, 4, 9, and 10, and the fifth preset value is 1. Interference received by the $1^{st}$ first PTRS (whose location index is 5) is generated based on an imaginary part signal (including an imaginary part PTRS and an imaginary part data signal). In FIG. 23, for interference caused to the $1^{st}$ first PTRS, refer to formula 5-4:

$$F_1 P_2{}^* + F_1 P_2 + F_2 P_4 + F_3 P_4{}^* + ISI_{data_i} = 1 \qquad \text{formula 5-4}$$

$F_n$ is a manner of calculating an n-order interference component corresponding to the first device. For example, $F_1$ is a manner of calculating a first-order interference component corresponding to the first device. $P_n$ is a value of an $n^{th}$ first PTRS. For example, $P_1$ is a value of a $1^{st}$ first PTRS (whose location index is 5). $P_n{}^*$ is a value of an $n^{th}$ second PTRS. For example, $P_1^*$ is a value of a $1^{st}$ second PTRS (whose location index is 3). $F_n P_m$ is a value of an n-order interference component of an $m^{th}$ first PTRS. $F_n P_m^*$ is a value of an n-order interference component of an $m^{th}$ second PTRS. $ISI_{data_i}$ is a value of interference that is received by a $1^{st}$ first PTRS (whose location index is 5) and that is caused by a data signal to the $1^{st}$ first PTRS. n and m are positive integers, where $1 \leq n \leq 4$, and $1 \leq m \leq 4$.

The following describes a manner of determining the $Q_{(2)}$ second PTRSs.

FIG. 23 is used as an example to analyze the first Block-PTRS pattern. For example, the first preset value is 1. For a total value of interference caused to four first PTRSs, refer to formula 5-5:

$$\begin{cases} F_1 P_2^* + F_1 P_2 + F_2 P_4 + F_3 P_4^* + ISI_{data_1} = 1 \\ F_2 P_1^* + F_1 P_1 + F_1 P_3 + F_2 P_3^* + ISI_{data_2} = 1 \\ F_2 P_2^* + F_1 P_2 + F_1 P_4 + F_1 P_4^* + ISI_{data_3} = 1 \\ F_4 P_1^* + F_3 P_1 + F_2 P_3 + F_1 P_3^* + ISI_{data_4} = 1 \end{cases} \qquad \text{formula 5-5}$$

In formula 5-5, total values of interference of the four first PTRSs are sequentially listed. For a manner of calculating interference caused to each first PTRS, refer to descriptions corresponding to formula 5-4. $ISI_{data_n}$ is a value of interference that is received by an $n^{th}$ first PTRS and that is caused by a data signal to the $n^{th}$ first PTRS. For example, $ISI_{data_i}$ is a value of interference that is received by a $1^{st}$ first PTRS (whose location index is 4) and that is caused by a data signal to the $1^{st}$ first PTRS. Specifically, $F_n$ and $ISI_{data_n}$ are known. Therefore, a relationship between $P_n$ and $P_n^*$ may be determined. Based on the solved relationship, the first device may adjust amplitudes and/or phases of the first PTRS and the second PTRS.

In some possible implementations, the first device may first determine the amplitudes of the first PTRS and the second PTRS, and then determine the phases of the first PTRS and the second PTRS based on the solved relationship. In some other possible implementations, the first device may first determine the phases of the first PTRS and the second PTRS, and then determine the amplitudes of the first PTRS and the second PTRS based on the solved relationship.

In some possible implementations, the fifth preset value is at least one of the following values: $\sqrt{2}/2$, 1, $\sqrt{2}$, $3/\sqrt{10}$, $5/\sqrt{42}$, $3/\sqrt{42}$, $7/\sqrt{170}$, $5/\sqrt{170}$, $3/\sqrt{170}$, $9/\sqrt{648}$, $7/\sqrt{648}$, $5/\sqrt{648}$, $3/\sqrt{648}$, $j\sqrt{2}/2$, j, $j\sqrt{2}$, $j3/\sqrt{10}$, $j5/\sqrt{42}$, $j3/\sqrt{42}$, $j7/\sqrt{170}$, $j5/\sqrt{170}$, $j3/\sqrt{170}$, $j9/\sqrt{648}$, $j7/\sqrt{648}$, $j5/\sqrt{648}$, and $j3/\sqrt{648}$. In another expression manner, a square root function (sqrt(x)= $\sqrt{x}$) is for expressing the fifth preset value, and then the fifth preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt (648), 3/sqrt(648), jsqrt(2)/2, j, jsqrt(2), j3/sqrt(10), j5/sqrt (42), j3/sqrt(42), j7/sqrt(170), j5/sqrt(170), j3/sqrt(170), j9/sqrt(648), j7/sqrt(648), j5/sqrt(648), and j3/sqrt(648). It should be noted that, in practical application, the fifth preset value may be an approximate value of the values listed above, for example, $\sqrt{2}/2$, which may be 0.707. These values listed above are factors commonly used when constellation modulation is performed, for example, an outermost constellation point sqrt(2)/2 of a constellation symbol, and a constellation point normalization factor 3/sqrt(10). These values are all defined by a protocol, and therefore are easily accepted preset values. In addition, the outermost constellation point represents maximum signal energy that can be achieved by each symbol. Therefore, using the value of the outermost constellation point can maximize the signal-to-noise ratio of the PTRS without affecting the PAPR.

In some possible implementations, the fifth preset value is determined based on a receiver type. For example, the receiver type may include a matched filtering receiver, a rectangular window receiver, a raised cosine filter (raised cosine filter) receiver, and the like. The first device may determine, based on the receiver type, a calculation manner (which may be, for example, a calculation formula) for calculating inter-code interference (or referred to as inter-symbol interference) (inter-symbol interference, ISI), and calculates the fifth preset value based on the calculation manner, a value of the data signal, and a preset receiving value of the PTRS.

Optionally, before the first device generates the second signal, the method further includes: The first device obtains first indication information sent by the second device, where the first indication information indicates the receiver type. The receiver type is determined by the second device.

Optionally, the first device sends second indication information to the second device, where the second indication information indicates the receiver type. The receiver type is determined by the first device.

In some other possible implementations, the fifth preset value may alternatively be a value in a small range near a fixed value. For example, a value range of the fifth preset value may be $[z-\delta, z+\delta]$, where z may be one of the foregoing listed possible values of the first preset value, and $\delta$ is a very small value, for example, 0.1 or 0.05. In this manner, interference caused to a first PTRS may be relaxed into an inequality. For example, if the fixed value is 1, for interference caused to a $1^{st}$ first PTRS, refer to formula 5-6:

$$|F_1 P_2^* + F_1 P_2 + F_2 P_4 + F_3 P_4^* + ISI_{data_i}| \leq 1 + \delta \qquad \text{formula 5-6}$$

Similarly, for a total value of interference caused to four first PTRSs, refer to formula 5-7:

$$\begin{cases} |F_1 P_2^* + F_1 P_2 + F_2 P_4 + F_3 P_4^* + ISI_{data_1}| \leq 1 + \delta & \text{formula 5-7} \\ |F_2 P_1^* + F_1 P_1 + F_1 P_3 + F_2 P_3^* + ISI_{data_2}| \leq 1 + \delta \\ |F_2 P_2^* + F_1 P_2 + F_1 P_4 + F_1 P_4^* + ISI_{data_3}| \leq 1 + \delta \\ |F_4 P_1^* + F_3 P_1 + F_2 P_3 + F_1 P_3^* + ISI_{data_4}| \leq 1 + \delta \end{cases}$$

It should be noted that a restriction on the values of the second PTRSs is relaxed in formula 5-7. In this manner, a value range of energy (or referred to as an amplitude, a size, or a value) of the second PTRSs may be further agreed on. A value of $P_n^*$ may be solved with reference to the value range of the energy of the second PTRSs and formula 5-7.

In a possible implementation, energy of each of the second PTRSs is less than a sixth preset value. Optionally, amplitudes, envelopes, sizes, or values of the second PTRSs are less than the sixth preset value. Without loss of generality, energy is used as an example for description in this application.

Optionally, the sixth preset value may be preset, for example, 1.5 or 2. In this manner, a restriction on the values of the second PTRSs may be relaxed, and further, an energy range of the second PTRSs can be agreed on, to avoid a problem that the PAPR of the fifth signal is excessively large because energy of the second PTRSs is excessively large.

In a possible implementation, a quantity of first PTRSs may alternatively be different from a quantity of second PTRSs. Optionally, in this case, $Q_{(1)}$ is less than or equal to $Q_{(2)}$. Optionally, in this case, location indexes of a first part of PTRSs in the second PTRSs are first M locations in location indexes of the Q PTRSs, location indexes of a second part of PTRSs in the second PTRSs are last N locations in the location indexes of the Q PTRSs, and $N+M=Q_{(2)}$.

Figures 24, 25:
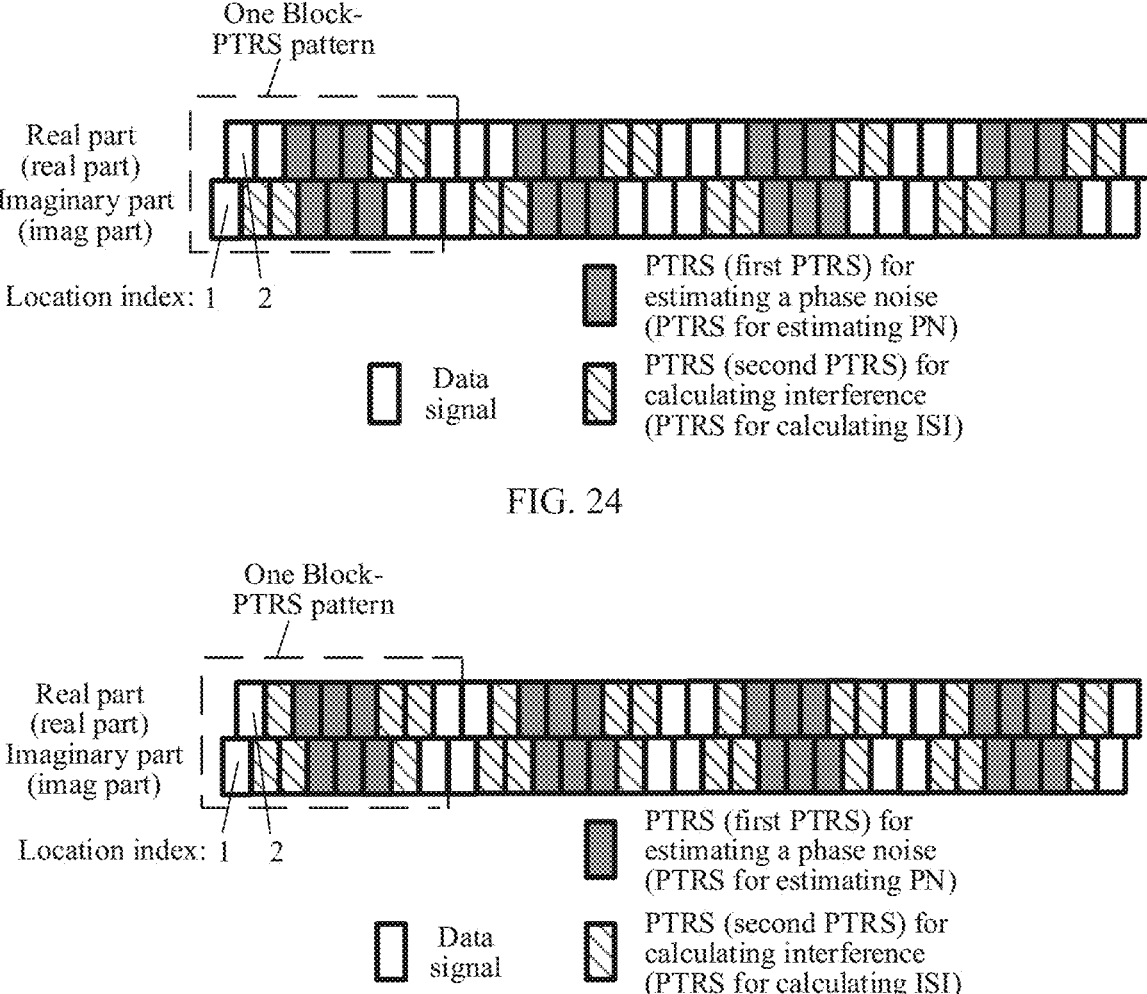

For example, FIG. 24 is a schematic diagram of a Block-PTRS pattern of another DFT-s-OFDM signal according to an embodiment of this application. In this example, location indexes of a first part of PTRSs in the second PTRSs are first M locations (namely, first two locations) in location indexes of the Q PTRSs, location indexes of a second part of PTRSs in the second PTRSs are last N locations (namely, last two locations) in the location indexes of the Q PTRSs, and a quantity of the second PTRSs is 4.

For example, FIG. 25 is a schematic diagram of a Block-PTRS pattern of another DFT-s-OFDM signal according to an embodiment of this application. In this example, location indexes of a first part of PTRSs in the second PTRSs are first M locations (namely, first three locations) in location indexes of the Q PTRSs, location indexes of a second part of PTRSs in the second PTRSs are last N locations (namely, last three locations) in the location indexes of the Q PTRSs, and a quantity of the second PTRSs is 6.

In some embodiments, both a quantity of real part PTRS in the second PTRSs and a quantity of imaginary part PTRSs in the second PTRSs are 1. A location index of the real part PTRS in the second PTRSs is a maximum value of location indexes of the Q PTRSs, and a location index of the imaginary part PTRS in the second PTRSs is a minimum value of the location indexes of the Q PTRSs; or a location index of the real part PTRS in the second PTRSs is a minimum value of location indexes of the Q PTRSs, and a location index of the imaginary part PTRS in the second PTRSs is a maximum value of the location indexes of the Q PTRSs.

Figures 26A, 26B:
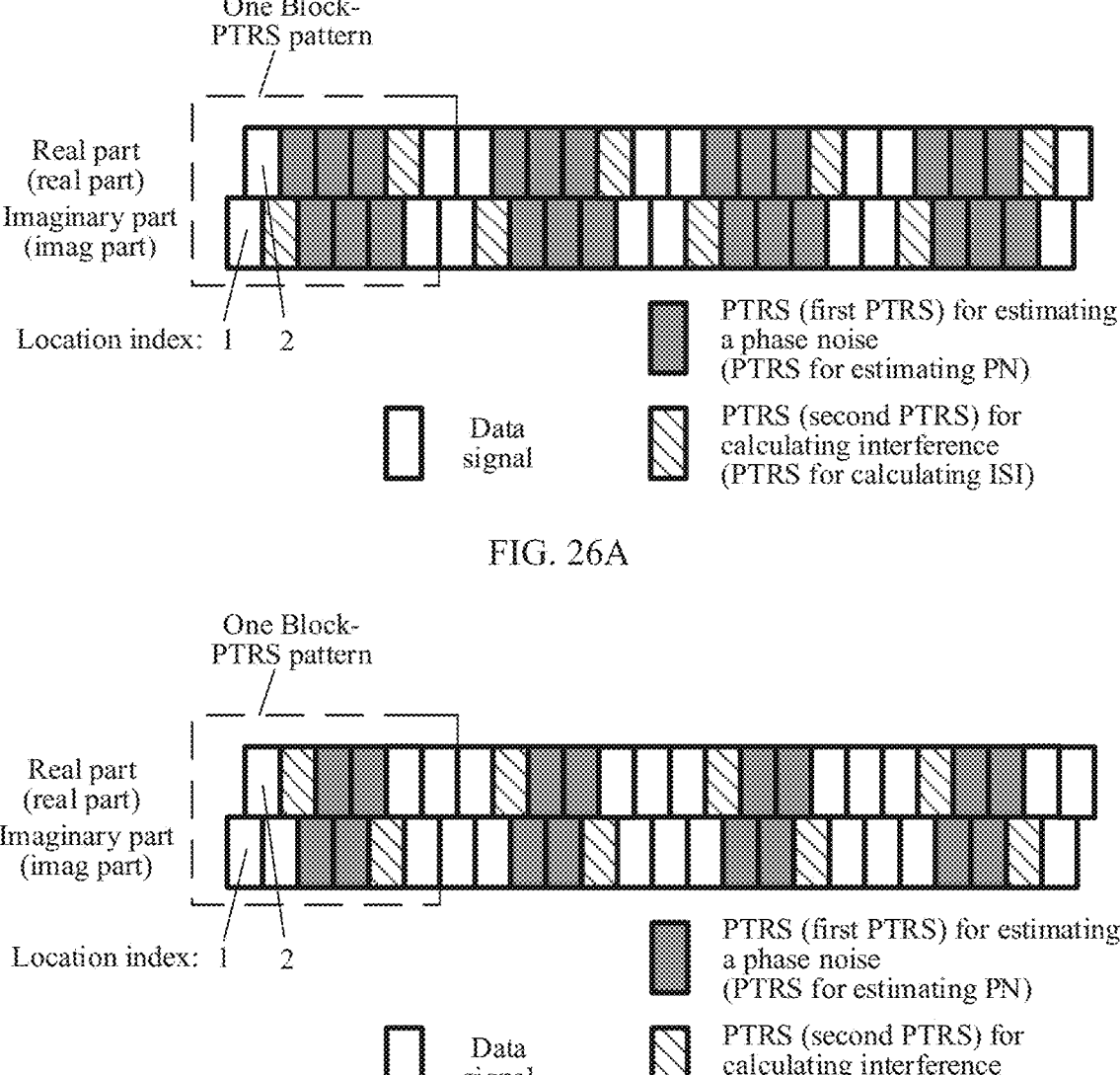
FIG. 26A and FIG. 26B are schematic diagrams of Block-PTRS patterns of some other DFT-s-OFDM signals according to an embodiment of this application.

For example, FIG. 26A is a schematic diagram of a Block-PTRS pattern of another DFT-s-OFDM signal according to an embodiment of this application. In this example, a location index of the real part PTRS in the second PTRSs is a maximum value of location indexes of the Q PTRSs, and a location index of the imaginary part PTRS in the second PTRSs is a minimum value of the location indexes of the Q PTRSs.

For example, FIG. 26B is a schematic diagram of a Block-PTRS pattern of another DFT-s-OFDM signal according to an embodiment of this application. In this example, a location index of the real part PTRS in the second PTRSs is a minimum value of location indexes of the Q PTRSs, and a location index of the imaginary part PTRS in the second PTRSs is a maximum value of the location indexes of the Q PTRSs.

Figure 27A:
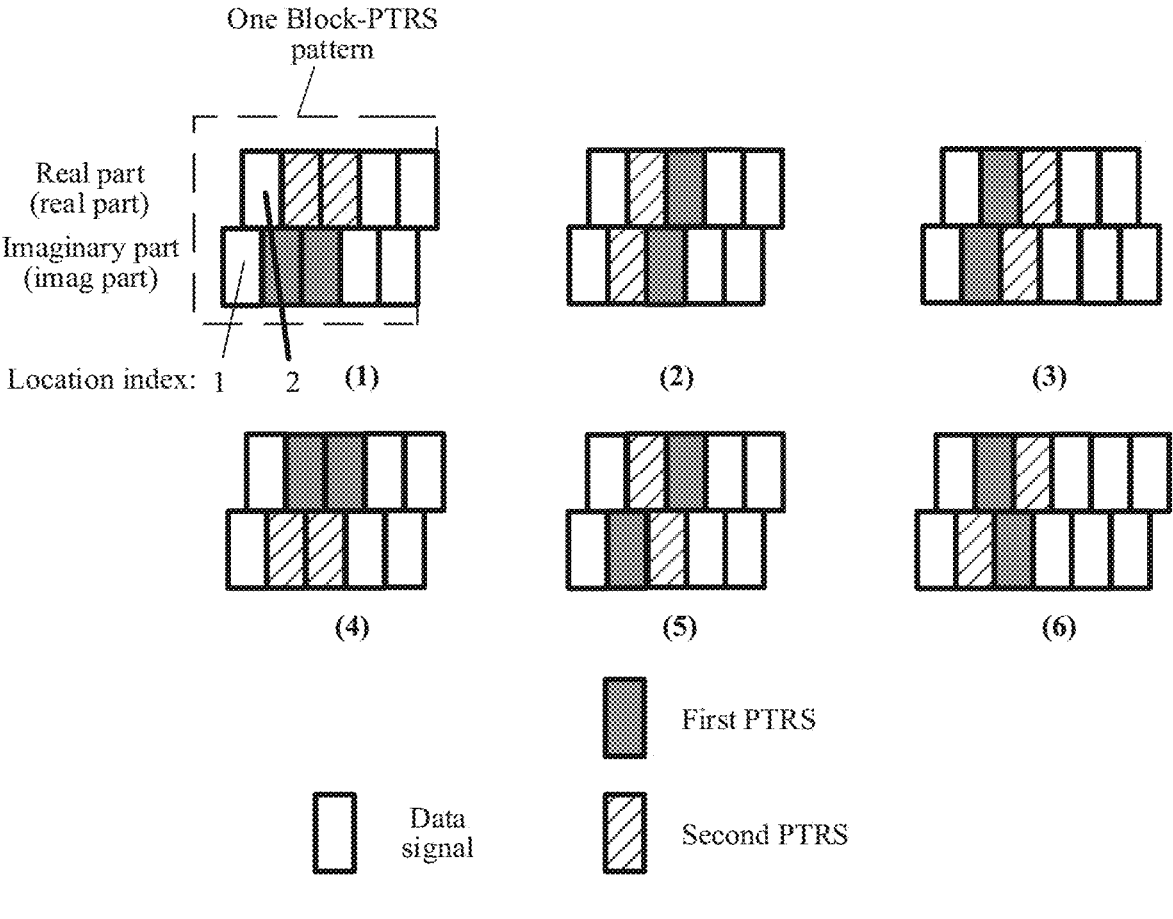
FIG. 27A and FIG. 27B are schematic diagrams of Block-PTRS patterns of some other DFT-s-OFDM signals according to an embodiment of this application.

In some embodiments, the one block-PTRS pattern includes four PTRSs, and the four PTRSs include two first PTRSs and two second PTRSs, where location indexes of the four PTRSs are four consecutive locations; and the location indexes of the first PTRSs are in a second location and a fourth location, and the location indexes of the second PTRSs are in a first location and a third location; the location indexes of the first PTRSs are in a third location and a fourth location, and the location indexes of the second PTRSs are in a first location and a second location; the location indexes of the first PTRSs are in a second location and a third location, and the location indexes of the second PTRSs are in a first location and a fourth location; the location indexes of the first PTRSs are in a first location and a fourth location, and the location indexes of the second PTRSs are in a second location and a third location; the location indexes of the first PTRSs are in a first location and a third location, and the location indexes of the second PTRSs are in a second location and a fourth location; or the location indexes of the first PTRSs are in a first location and a second location, and the location indexes of the second PTRSs are in a third location and a fourth location. For example, for the foregoing described several possible manners of selecting the location indexes of the first PTRSs and the second PTRSs, refer to FIG. 27A. Each case in FIG. 27A illustrates one Block-PTRS pattern in a communication signal. Remaining Block-PTRS patterns of the communication signal may be shown with reference to the one Block-PTRS pattern. In this example, location indexes of the four PTRSs are four consecutive locations, and location indexes of the first PTRSs and the second PTRSs may be selected from 3 (corresponding to the first location), 4 (corresponding to the second location), 5 (corresponding to the third location), and 6 (corresponding to the fourth location).

For case (1), location indexes of the first PTRSs are 3 and 5, and location indexes of the second PTRSs are 4 and 6. In other words, the location indexes of the first PTRSs are in a first location and a third location, and the location indexes of the second PTRSs are in a second location and a fourth location. The waveform in this case may be at a PTRS location the same as that of a conventional DFT-S-OFDM waveform, and has good compatibility with an existing system; and is applicable to a case in which the absolute value of the interference of the data signal to the imaginary part PTRS (namely, the first PTRS) of the estimated phase noise is greater than the absolute value of the interference of the data signal to the real part PTRS (namely, the second PTRS) of the calculated interference, because in this case, the data signal has large impact on the first PTRS, signal power required by the second PTRS is small, and a PAPR of the communication signal can be further reduced.

For case (2), location indexes of the first PTRSs are 5 and 6, and location indexes of the second PTRSs are 3 and 4. In other words, the location indexes of the first PTRSs are in a third location and a fourth location, and the location indexes of the second PTRSs are in a first location and a second location. This case is applicable to a scenario in which right data signals of the PTRS (namely, data signals whose location indexes are 7 and 8) have large energy (for example, at an outermost constellation point), because in this case, the data signal has large impact on the first PTRS, signal power required by the second PTRS is small, and a PAPR of the communication signal can be further reduced.

For case (3), location indexes of the first PTRSs are 3 and 4, and location indexes of the second PTRSs are 5 and 6. In other words, the location indexes of the first PTRSs are in a first location and a second location, and the location indexes of the second PTRSs are in a third location and a fourth location. This case is applicable to a scenario in which left data signals of the PTRS (namely, data signals whose location indexes are 1 and 2) have large energy (for example, at an outermost constellation point), because in this case, the data signal has large impact on the first PTRS, signal power required by the second PTRS is small, and a PAPR of the communication signal can be further reduced.

For case (4), location indexes of the first PTRSs are 4 and 6, and location indexes of the second PTRSs are 3 and 5. In other words, the location indexes of the first PTRSs are in a second location and a fourth location, and the location indexes of the second PTRSs are in a first location and a third location. The waveform in this case may be at a PTRS location the same as that of a conventional DFT-S-OFDM waveform, and has good compatibility with an existing system; and is applicable to a case in which the absolute value of the interference of the data signal to the real part PTRS (namely, the first PTRS) of the estimated phase noise is greater than the absolute value of the interference of the data signal to the imaginary part PTRS (namely, the second PTRS) of the calculated interference, because in this case, the data signal has large impact on the first PTRS, signal power required by the second PTRS is small, and a PAPR of the communication signal can be further reduced.

For case (5), location indexes of the first PTRSs are 3 and 6, and location indexes of the second PTRSs are 4 and 5. In other words, the location indexes of the first PTRSs are in a first location and a fourth location, and the location indexes of the second PTRSs are in a second location and a third location. This case is applicable to a scenario in which data signals whose location indexes are 1 and 8 have large energy (for example, at an outermost constellation point), because in this case, the data signal has large impact on the first PTRS, signal power required by the second PTRS is small, and a PAPR of the communication signal can be further reduced.

For case (6), location indexes of the first PTRSs are 4 and 5, and location indexes of the second PTRSs are 3 and 6. In other words, the location indexes of the first PTRSs are in a second location and a third location, and the location indexes of the second PTRSs are in a first location and a fourth location. In this case, the second PTRS has large impact on the first PTRS, signal power required by the second PTRS is small, and a PAPR of the communication signal can be further reduced.

In some embodiments, to further reduce signal power of the PTRS, thereby reducing a PAPR of the communication signal, a manner of placing the location indexes of the first PTRSs and the second PTRSs may be selected based on a principle that the expected value of the signal power of the second PTRS is minimum. Refer to the description of the embodiment corresponding to FIG. 8. It can be learned that for one real part SC-OQAM signal, an imaginary part SC-OQAM signal closest to the one real part SC-OQAM signal has greatest impact on the one real part SC-OQAM signal. As an absolute value of a difference between a location index of a real part SC-OQAM signal and a location index of an imaginary part SC-OQAM signal increases, impact between the two signals becomes smaller. Therefore, the location indexes of the first PTRSs and the second PTRSs should be as close as possible. Based on this consideration, this embodiment provides a possible manner of determining the location indexes of the first PTRSs and the second PTRSs. The following describes the method.

The first device selects a first location index subset from to-be-selected location index sets, where the location index set includes a plurality of location index subsets, and each location index subset indicates a location index of each PTRS of the first PTRSs and the second PTRSs. The first device sends the first signal in a manner of the selected first location index subset. Optionally, the first device sends third indication information to the second device, where the third indication information indicates the first location index subset, so that the second device can obtain information about location indexes of the first PTRSs and the second PTRSs.

In a first possible case, a sum of a first value and a second value that correspond to the first location index subset is not greater than a sum of a first value and a second value that correspond to a second location index subset, where the first value is a sum of absolute values of differences between location indexes of real part PTRSs in the first PTRSs and location indexes of imaginary part PTRSs in the second PTRSs, and the second value is a sum of absolute values of differences between location indexes of imaginary part PTRSs in the first PTRSs and location indexes of real part PTRSs in the second PTRSs. The second location index subset is a location index subset other than the first location index subset in the to-be-selected location index sets. In a second possible case, a third value corresponding to the first location index subset is not greater than a third value corresponding to the second location index, where the third value is a sum of absolute values of differences between location indexes of the first PTRSs and an average value of the location indexes of the first PTRSs and the location indexes of the second PTRSs. In a third possible case, the first location index subset satisfies both of the foregoing two conditions. In these location index selection manners, the second PTRS has large impact on the first PTRS, so that a value of signal power required by the second PTRS is small, and a PAPR of the communication signal is further reduced.

It should be noted that when a quantity of the first PTRSs and the second PTRSs is determined, a possible manner of selecting location indexes of the first PTRSs and the second PTRSs that satisfies the condition that "location indexes of the first PTRSs and the second PTRSs are consecutive" may form a location index subset. In other words, each location index subset indicates a location index of each PTRS in the first PTRS and the second PTRS.

For example, it is assumed that both the quantity of the first PTRSs and the quantity of the second PTRSs are 2. Then, for a possible case of the to-be-selected location index set, refer to FIG. 27A. The to-be-selected location index set includes six location index subsets in total. FIG. 27A illustrates one Block-PTRS pattern in a communication signal. Remaining Block-PTRS patterns of the communication signal may be shown with reference to the one Block-PTRS pattern.

In this example, location indexes of the first PTRSs and the second PTRSs may be selected from 3, 4, 5, and 6, and the location indexes of the first PTRSs and the second PTRSs are consecutive. An average value of the location indexes of the first PTRSs and the second PTRSs is 4.5.

For case (1), a location index subset is: location indexes of the first PTRSs are 3 and 5, and location indexes of the second PTRSs are 4 and 6. For example, the location indexes may be represented as (3, 5, 4, 6). In case (1), the first value is 0, the second value is $|3-4|+|3-6|+|5-4|+|5-6|=6$, and a sum of the first value and the second value is 6. The third number is $|3-4.5|+|5-4.5|=2$.

For case (2), a location index subset is: location indexes of the first PTRSs are 5 and 6, and location indexes of the second PTRSs are 3 and 4. For example, the location indexes may be represented as (5, 6, 3, 4). In case (2), the first value is $|6-3|=3$, the second value is $|5-4|=1$, and a sum of the first value and the second value is 4. The third number is $|5-4.5|+|6-4.5|=2$.

For case (3), a location index subset is: location indexes of the first PTRSs are 3 and 4, and location indexes of the second PTRSs are 5 and 6. For example, the location indexes may be represented as (3, 4, 5, 6). In case (3), the first value is $|4-5|=1$, the second value is $|3-6|=3$, and a sum of the first value and the second value is 4. The third number is $|3-4.5|+|4-4.5|=2$.

For case (4), a location index subset is: location indexes of the first PTRSs are 4 and 6, and location indexes of the second PTRSs are 3 and 5. For example, the location indexes may be represented as (4, 6, 3, 5). In case (4), the first value is $|4-3|+|4-5|+|6-3|+|6-5|=6$, the second value is 0, and a sum of the first value and the second value is 6. The third number is $|4-4.5|+|6-4.5|=2$.

For case (5), a location index subset is: location indexes of the first PTRSs are 3 and 6, and location indexes of the second PTRSs are 4 and 5. For example, the location indexes may be represented as (3, 6, 4, 5). In case (5), the first value is $|6-5|=1$, the second value is $\beta-4|=1$, and a sum of the first value and the second value is 2. The third number is $\beta-4.5|+|6-4.5|=3$.

For case (6), a location index subset is: location indexes of the first PTRSs are 4 and 5, and location indexes of the second PTRSs are 3 and 6. For example, the location indexes may be represented as (4, 5, 3, 6). In case (6), the first value is $|4-3|=1$, the second value is $|5-6|=1$, and a sum of the first value and the second value is 2. The third number is $|4-4.5|+|5-4.5|=1$.

Based on the foregoing manner of determining the first location index subset, for a first possible manner, the selected first location index subset may be: location indexes of the first PTRSs are 3 and 6, and location indexes of the second PTRSs are 4 and 5; or location indexes of the first PTRSs are 4 and 5, and location indexes of the second PTRSs are 3 and 6. For a second possible manner, the selected first location index subset may be: location indexes of the first PTRSs are 4 and 5, and location indexes of the second PTRSs are 3 and 6. For a third possible manner, the selected first location index subset may be: location indexes of the first PTRSs are 4 and 5, and location indexes of the second PTRSs are 3 and 6.

In some other embodiments, the one block-PTRS pattern includes eight PTRSs, and the eight PTRSs include four first PTRSs and four second PTRSs, where location indexes of the eight PTRSs are eight consecutive locations; and the location indexes of the first PTRSs are in a second location, a fourth location, a fifth location, and a seventh location, and the location indexes of the second PTRSs are in a first location, a third location, a sixth location, and an eighth location; the location indexes of the first PTRSs are in a second location, a fourth location, a fifth location, and a sixth location, and the location indexes of the second PTRSs are in a first location, a third location, a seventh location, and an eighth location; the location indexes of the first PTRSs are in a second location, a third location, a fourth location, and a fifth location, and the location indexes of the second PTRSs are in a first location, a sixth location, a seventh location, and an eighth location; the location indexes of the first PTRSs are in a third location, a fourth location, a fifth location, and a sixth location, and the location indexes of the second PTRSs are in a first location, a second location, a seventh location, and an eighth location; the location indexes of the first PTRSs are in a third location, a fourth location, a fifth location, and a seventh location, and the location indexes of the second PTRSs are in a first location, a second location, a sixth location, and an eighth location; or the location indexes of the first PTRSs are in a fourth location, a fifth location, a sixth location, and a seventh location, and the location indexes of the second PTRSs are in a first location, a second location, a third location, and an eighth location.

Figure 27B:
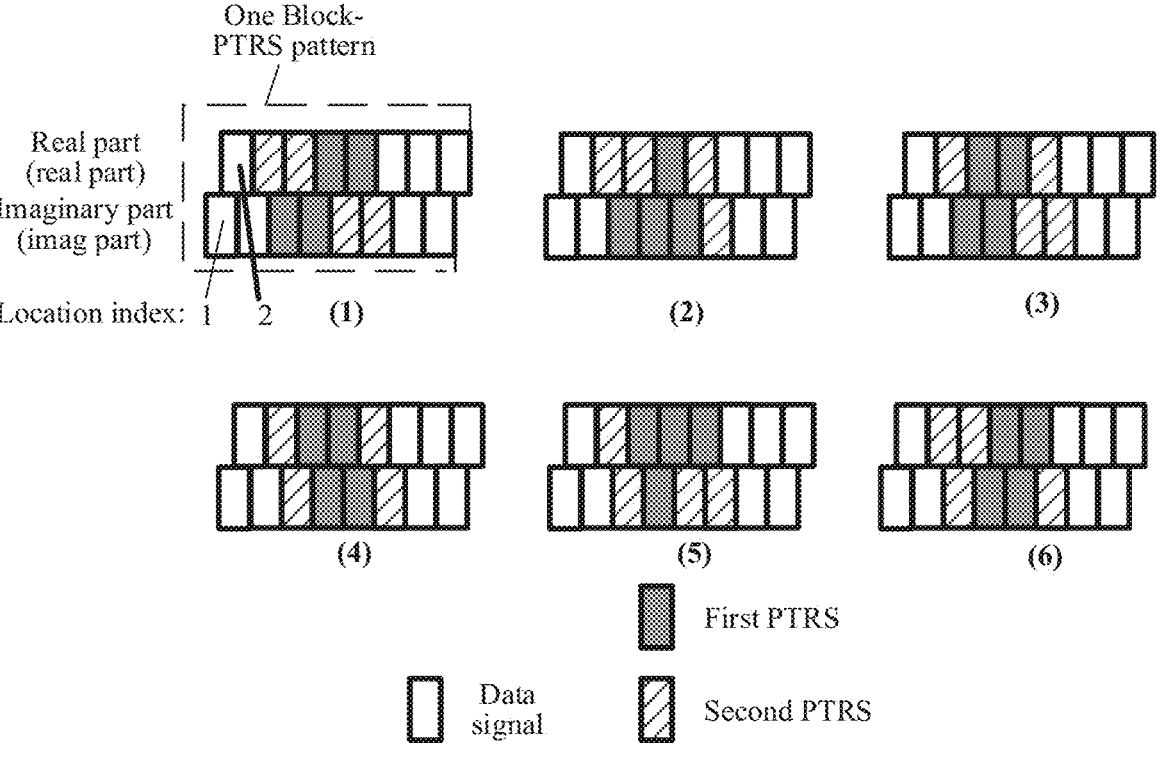

For example, for the foregoing described several possible manners of selecting the location indexes of the first PTRSs and the second PTRSs, refer to FIG. 27B. Each case in FIG. 27B illustrates one Block-PTRS pattern in a communication signal. Remaining Block-PTRS patterns of the communication signal may be shown with reference to the one Block-PTRS pattern. In this example, location indexes of the four PTRSs are four consecutive locations, and location indexes of the first PTRSs and the second PTRSs may be selected from 4 (corresponding to the first location), 5 (corresponding to the second location), 6 (corresponding to the third location), 7 (corresponding to the fourth location), 8 (corresponding to the fifth location), 9 (corresponding to the sixth location), 10 (corresponding to the seventh location), and 11 (corresponding to the eighth location).

For case (1), location indexes of the first PTRSs are 5, 7, 8, and 10, and location indexes of the second PTRSs are 4, 6, 9, and 11. In other words, the location indexes of the first PTRSs are in a second location, a fourth location, a fifth location, and a seventh location, and the location indexes of the second PTRSs are in a first location, a third location, a sixth location, and an eighth location. In this case, because energy of the first PTRS and energy of the second PTRS can be most fully used, the second PTRS has large impact on the first PTRS, signal power (or referred to as energy) required by the second PTRS is small, and a PAPR of the communication signal can be further reduced.

For case (2), location indexes of the first PTRSs are 5, 7, 8, and 9, and location indexes of the second PTRSs are 4, 6, 10, and 11. In other words, the location indexes of the first PTRSs are in a second location, a fourth location, a fifth location, and a sixth location, and the location indexes of the second PTRSs are in a first location, a third location, a seventh location, and an eighth location. In this case, because relative locations of the first PTRS and the second PTRS are closest, the second PTRS has large impact on the first PTRS, signal power (or referred to as energy) required by the second PTRS is small, and a PAPR of the communication signal can be further reduced.

For case (3), location indexes of the first PTRSs are 5, 6, 7, and 8, and location indexes of the second PTRSs are 4, 9, 10, and 11. In other words, the location indexes of the first PTRSs are in a second location, a third location, a fourth location, and a fifth location, and the location indexes of the second PTRSs are in a first location, a sixth location, a seventh location, and an eighth location. This case is applicable to a scenario in which a left real part signal of the PTRS (namely, a data signal whose location index is 2) has large energy, because in this scenario, signal power required by the second PTRS is small, and a PAPR of the communication signal can be further reduced.

For case (4), location indexes of the first PTRSs are 6, 7, 8, and 9, and location indexes of the second PTRSs are 4, 5, 10, and 11. In other words, the location indexes of the first PTRSs are in a third location, a fourth location, a fifth location, and a sixth location, and the location indexes of the second PTRSs are in a first location, a second location, a seventh location, and an eighth location. This case is applicable to a scenario in which signal energy of each of left signals of the PTRS (namely, data signals whose location indexes are 1, 2, and 3) and right signals of the PTRS (namely, data signals whose location indexes are 12, 13, 14, and 15) is large, because in this scenario, signal power required by the second PTRS is small, and a PAPR of the communication signal can be further reduced.

For case (5), location indexes of the first PTRSs are 6, 7, 8, and 10, and location indexes of the second PTRSs are 4, 5, 9, and 11. In other words, the location indexes of the first PTRSs are in a third location, a fourth location, a fifth location, and a seventh location, and the location indexes of the second PTRSs are in a first location, a second location, a sixth location, and an eighth location. This case is applicable to a scenario in which left imaginary part signals of the PTRS (namely, data signals whose location indexes are 1 and 3) have large energy, because in this scenario, signal power required by the second PTRS is small, and a PAPR of the communication signal can be further reduced.

For case (6), location indexes of the first PTRSs are 7, 8, 9, and 10, and location indexes of the second PTRSs are 4, 5, 6, and 11. In other words, the location indexes of the first PTRSs are in a fourth location, a fifth location, a sixth location, and a seventh location, and the location indexes of the second PTRSs are in a first location, a second location, a third location, and an eighth location. This case is applicable to a scenario in which right imaginary part signals of the PTRS (namely, data signals whose location indexes are 13 and 15) have large energy, because in this scenario, signal power required by the second PTRS is small, and a PAPR of the communication signal can be further reduced.

For example, the two possible first location index subsets obtained in the foregoing described manner of determining the first location index subset may be case (1) and case (2) illustrated above.

In the foregoing described manner of selecting the location indexes of the first PTRSs and the second PTRSs, the transmit end uses the manner of the selected first location index subset, so that the receive end can perform reception in a fixed and simple manner, that is, a good solution of selecting only one fixed pattern for transmission. The transmit end may further flexibly select a more suitable location index subset based on a specific signal sending situation, so that the transmit end can perform adaptive adjustment, for example, select, based on different data signal situations, a location index subset (which may alternatively correspond to a pilot pattern) that is most suitable for a currently to-be-sent data signal, so that performance of the signal is optimal. The receive end can identify, based on some additional information (received indication information) or a more complex receiver (for example, a receiver type, or energy of a detected data signal), a location index subset adaptively selected by the transmit end.

Figure 28:
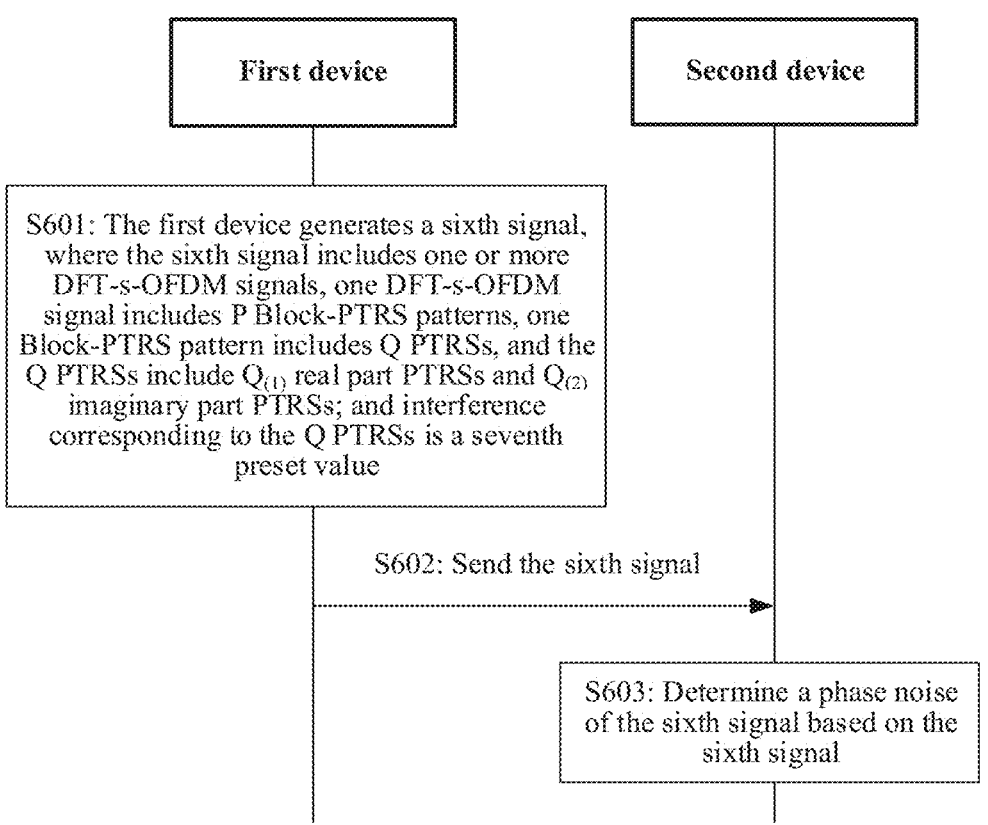
FIG. 28 is a flowchart of another phase noise suppression method according to an embodiment of this application.

FIG. 28 is a flowchart of another phase noise suppression method according to an embodiment of this application. The method may be implemented based on the network architecture shown in FIG. 1. In an implementation, the first device may be the network device in FIG. 1, and the second device may be the terminal device in FIG. 1. In another implementation, the first device may be the terminal device in FIG. 1, and the second device may be the network device in FIG. 1. The method includes the following steps.

S601: The first device generates a sixth signal, where the sixth signal includes one or more DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where interference corresponding to the Q PTRSs is a seventh preset value, interference corresponding to the $Q_{(1)}$ real part PTRSs is generated based on the $Q_{(2)}$ imaginary part PTRSs, and interference corresponding to the $Q_{(2)}$ imaginary part PTRSs is generated based on the $Q_{(1)}$ real part PTRSs. The real part PTRS is a PTRS that includes only a real part signal, and the imaginary part PTRS is a PTRS that includes only an imaginary part signal.

Optionally, when $Q_{(1)}$ is greater than 1, the $Q_{(1)}$ real part PTRSs are consecutive real part signals; and when $Q_{(2)}$ is greater than 1, the $Q_{(2)}$ imaginary part PTRSs are consecutive imaginary part signals. It should be noted that, that the DFT-s-OFDM signal whose real and imaginary parts are separated is composed in a manner in which one real part signal is adjacent to one imaginary part signal may be understood as that the DFT-s-OFDM signal is sent in a manner in which a real part signal is adjacent to an imaginary part signal in a time sequence. For example, in a time sequence, 1 is used as a unit, a real part signal is sent at a moment t, an imaginary part signal is sent at a moment t+1, a real part signal is sent at a moment t+2, and so on. That the $Q_{(1)}$ real part PTRSs are consecutive real part signals may be understood as that for real part signals, the $Q_{(1)}$ real part PTRSs are consecutively sent in a time sequence, and when the $Q_{(1)}$ real part PTRSs are being sent, no real part data signal is sent. That the $Q_{(2)}$ imaginary part PTRSs are consecutive imaginary part signals may be understood as that for imaginary part signals, the $Q_{(2)}$ imaginary part PTRSs are consecutively sent in a time sequence, and when the $Q_{(2)}$ imaginary part PTRSs are being sent, no imaginary part data signal is sent. The real part data signal is a data signal that includes only the real part signal, and the imaginary part data signal is a data signal that includes only the imaginary part signal.

In some embodiments, the DFT-s-OFDM signal is at least one of the following signals: an SC-OQAM signal, a DFT-S-OFDM signal carrying real and imaginary parts separated, a DFT-S-OFDM signal carrying a PAM constellation, a DFT-S-OFDM signal carrying real and imaginary parts separated of an addition filter, a DFT-S-OFDM signal carrying a PAM constellation of an addition filter, a UW-DFT-S-OFDM signal carrying real and imaginary parts separated, a UW-DFT-S-OFDM signal carrying a PAM constellation, a UW-DFT-S-OFDM signal carrying real and imaginary parts separated of an addition filter, a UW-DFT-S-OFDM signal carrying a PAM constellation of an addition filter, a ZT-DFT-S-OFDM signal carrying real and imaginary parts separated, a ZT-DFT-S-OFDM signal carrying a PAM constellation, a ZT-DFT-S-OFDM signal carrying real and imaginary parts separated of an addition filter, and a ZT-DFT-S-OFDM signal carrying a PAM constellation of an addition filter.

Figures 29, 30:
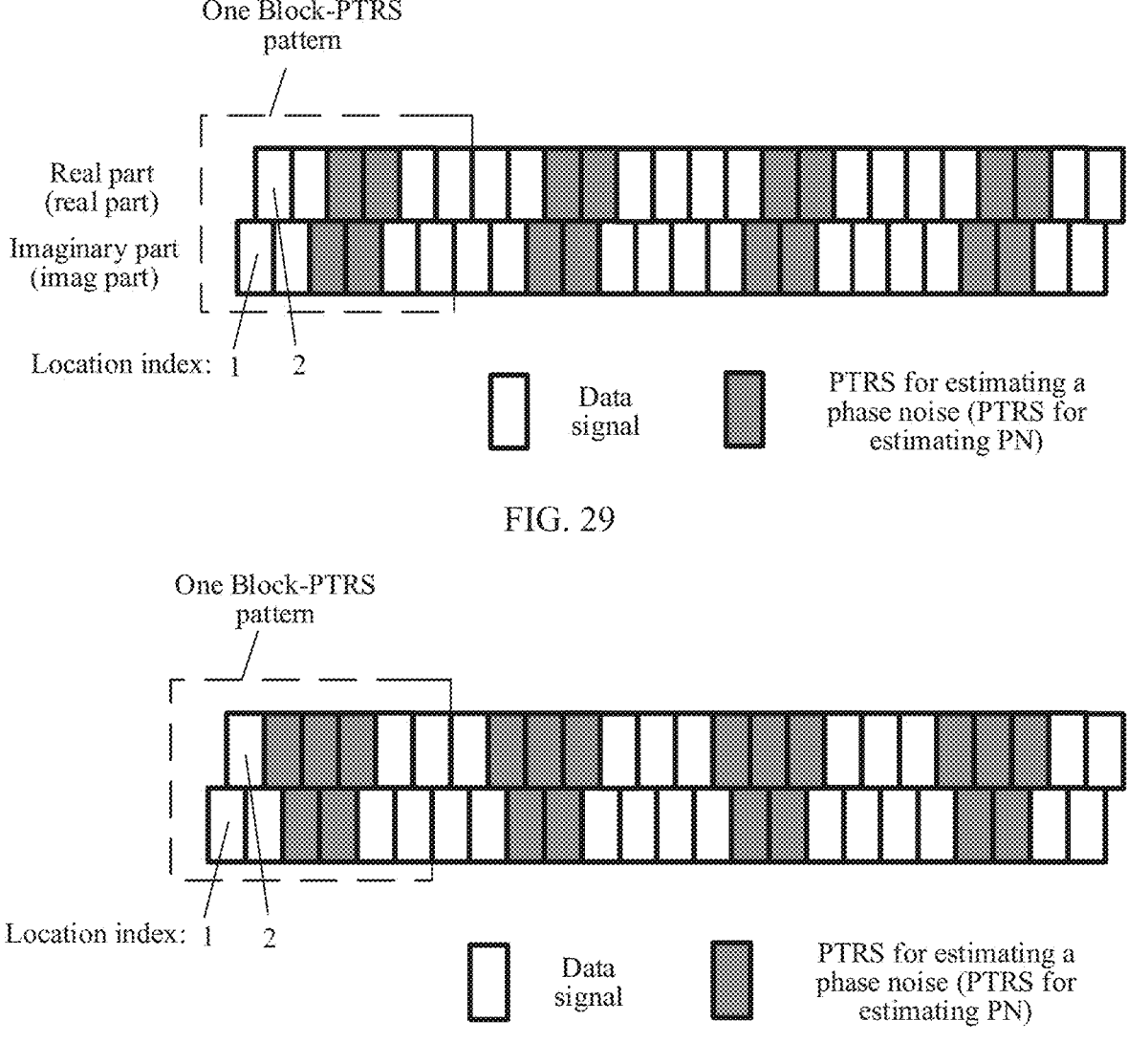
FIG. 29 and FIG. 30 are schematic diagrams of Block-PTRS patterns of some other DFT-s-OFDM signals according to an embodiment of this application.

For example, FIG. 29 is a schematic diagram of a Block-PTRS pattern of another DFT-s-OFDM signal according to an embodiment of this application. In FIG. 29, one DFT-s-OFDM signal includes four block-phase noise tracking pilot signal Block-PTRS patterns, one block-PTRS pattern includes Q (for example, four) PTRSs, and the four PTRSs include $Q_{(1)}$ (for example, two consecutive) real part PTRSs and $Q_{(2)}$ (for example, two consecutive) imaginary part PTRSs. It should be noted that the data signal in FIG. 29 is merely an example. In practical application, one Block-PTRS pattern may include more or fewer data signals. A quantity of data signals is not limited in this embodiment of this application.

In addition, FIG. 29 further illustrates a distribution manner of location indexes. For example, from left to right, location indexes of one real part signal and one imaginary part signal are adjacent, and one signal occupies one index location. It should be noted that location indexes represent a time sequence relationship of sending signals, and a relationship in ascending order of the location indexes of the signals represents a time sequence of sending the signals from front to back. In other words, the signals are sequentially sent in order of location index. In FIG. 29, specifically, in a first Block-PTRS pattern, location indexes of two real part PTRSs are 6 and 8, and a central location of the location indexes of the two first PTRSs is 7; and location indexes of two imaginary part PTRSs are 5 and 7, and a central location of the location indexes of the two second PTRSs is 6. A difference between a central location of the location indexes of the $Q_{(1)}$ first PTRSs and a central location of the location indexes of the $Q_{(2)}$ first PTRSs is one unit location. In other words, when $Q_{(1)}$ is equal to $Q_{(2)}$, a difference between a central location of the location indexes of the $Q_{(1)}$ first PTRSs and a central location of the location indexes of the $Q_{(2)}$ first PTRSs is one unit location.

In some other implementations, it may alternatively be considered that one signal occupies 0.5 index locations, and distribution of location indexes is 0.5, 1, 1.5, 2, and the like.

In the example in FIG. 29, interference corresponding to the Q PTRSs (that is, the $Q_{(1)}$ real part PTRSs and the $Q_{(2)}$ imaginary part PTRSs) is a seventh preset value. Interference corresponding to the $Q_{(1)}$ real part PTRSs is generated based on the $Q_{(2)}$ imaginary part PTRSs, and interference corresponding to the $Q_{(2)}$ imaginary part PTRSs is generated based on the $Q_{(1)}$ real part PTRSs.

In the foregoing embodiment, interference corresponding to the Q PTRSs is the seventh preset value. When the value of the interference is determined, a phase noise of the sixth signal may be solved.

S602: The first device sends the sixth signal to a second device.

S603: After the second device receives the sixth signal sent by the first device, the second device determines a phase noise of the sixth signal based on the sixth signal.

The following describes a reason why the phase noise can be determined in the foregoing embodiment.

It is assumed that no phase noise exists in the sixth signal received by the second device. A real part PTRS in the sixth signal is used as an example. A real part PTRS (for ease of description, briefly referred to as a received signal) in the received sixth signal may be shown by formula 6-1.

$$x = P + j\sum_{n=1}^{N} ISI \qquad \text{formula 6-1}$$

P is a real part PTRS, and $$j\sum_{n=1}^{N} ISI$$

is a sum of interference caused to the received signal.

Interference received by the received signal is represented on an imaginary part. Therefore, the real part signal P may be demodulated by discarding the imaginary part. Specifically, the interference is represented as a sum term, because interference of an imaginary part signal may have multi-order components. That is to say, an imaginary part signal not only has an interference component (for example, a first-order interference component) for a nearest real part signal, but also has an interference component (for example, a second-order interference component) for a next real part signal; and may have an interference component (for example, an X-order interference component) for each of the following X real part signals.

It should be noted that a quantity of orders of interference components is related to a roll-off design of a waveform of the sixth signal. For example, if a roll-off factor of the waveform of the sixth signal is 0.2, a quantity of orders of interference components may be a maximum of seven orders (on a single side). For example, that a quantity of orders of interference components may be a maximum of seven orders may be represented as that an imaginary part signal inter-feres with a maximum of seven (on a single side) consecu-tive real part signals adjacent to the imaginary part signal. The seven (on a single side) consecutive real part signals are sorted in ascending order of distance. There is a seventh-order interference component for the seventh real part signal. In this embodiment of this application, a roll-off design of the waveform of the sixth signal is not limited.

For ease of understanding, FIG. 11 is used as an example for description. FIG. 11 is a schematic diagram of a wave-form interference according to an embodiment of this appli-cation. FIG. 11 includes a plurality of real part signals (for example, a real part signal 2, a real part signal 4, a real part signal 6, and a real part signal 8) and a plurality of imaginary part signals (for example, an imaginary part signal 1, an imaginary part signal 3, an imaginary part signal 5, and an imaginary part signal 7).

Interference received by the real part signal 2 in FIG. 11 is now analyzed. As can be seen from FIG. 11, the real part signal 2 receives a first-order interference component of the imaginary part signal 3 and a second-order interference component of the imaginary part signal 5. It should be noted that the figure shows only an example of the first-order interference component of the imaginary part signal 3 and the second-order interference component of the imaginary part signal 5 that are received by the real part signal 2. However, other imaginary part signals also cause interfer-ence to the real part signal 2, for example, a first-order interference component of the imaginary part signal 1 and a third-order interference component of the imaginary part signal 7. However, the real part signal 4 (and other real part signals) is 0 at a sampling point of the signal carried by the waveform of the real part signal 2, that is, the real part signal 4 causes no interference to the real part signal 2.

When impact of a phase noise is considered, it may be learned based on formula 1-1 and formula 6-1 that the received signal may be shown by formula 6-2:

$$xe^{j\theta} = \left(P + j\sum_{n=1}^{N} ISI\right)e^{j\theta} \qquad \text{formula 6-2}$$

Formula 6-3 may be obtained by performing Euler expan-sion on formula 6-2:

$$xe^{j\theta} = \left(P + j\sum_{n=1}^{N} ISI\right)(\cos\theta + j\sin\theta) = \qquad \text{formula 6-3}$$

$$P\cos\theta - \sum_{n=1}^{N} ISI\sin\theta + j\left(P\sin\theta + \sum_{n=1}^{N} ISI\cos\theta\right)$$

It can be seen from formula 6-3 that a real part of the received signal becomes $$P\cos\theta - \sum_{n=1}^{N} ISI\sin\theta.$$

Since both the interference term and the phase noise are unknown in this formula, the interference cannot be sepa-rated from the signal. In other words, in this manner, a phase noise causes a problem that an imaginary part signal leaks to a real part signal, to greatly reduce signal communication quality.

However, in the embodiment corresponding to FIG. 28, interference corresponding to the Q PTRSs is the seventh preset value. In other words, $$\sum_{n=1}^{N} ISI$$

in the real part signal or the imaginary part signal is known. When the value of the interference is determined, a phase noise of the sixth signal may be solved.

The following uses FIG. 29 as an example to specifically describe the embodiment corresponding to FIG. 28.

In the embodiment corresponding to FIG. 29, interference corresponding to the Q PTRSs is a seventh preset value, interference corresponding to the $Q_{(1)}$ real part PTRSs is generated based on the $Q_{(2)}$ imaginary part PTRSs, and interference corresponding to the $Q_{(2)}$ imaginary part PTRSs is generated based on the $Q_{(1)}$ real part PTRSs. Optionally, interference corresponding to each of the Q PTRSs is the seventh preset value. Further, interference corresponding to each of the $Q_{(1)}$ real part PTRSs is generated based on the $Q_{(2)}$ imaginary part PTRSs, and interference corresponding to each of the $Q_{(2)}$ imaginary part PTRSs is generated based on the $Q_{(1)}$ real part PTRSs.

In some embodiments, the one Block-PTRS pattern further includes an imaginary part data signal and a real part data signal, that interference corresponding to the $Q_{(1)}$ real part PTRSs is generated based on the $Q_{(2)}$ imaginary part PTRSs includes: the interference corresponding to the $Q_{(1)}$ real part PTRSs is generated based on the $Q_{(2)}$ imaginary part PTRSs and the imaginary part data signal. That interference corresponding to the $Q_{(2)}$ imaginary part PTRSs is generated based on the $Q_{(1)}$ real part PTRSs includes: the interference corresponding to the $Q_{(2)}$ imaginary part PTRSs is generated based on the $Q_{(1)}$ real part PTRSs and the real part data signal.

Optionally, in some embodiments, that interference corresponding to each of the $Q_{(1)}$ real part PTRSs is generated based on the $Q_{(2)}$ imaginary part PTRSs includes: the interference corresponding to each of the $Q_{(1)}$ real part PTRSs is generated based on the $Q_{(2)}$ imaginary part PTRSs and the imaginary part data signal. That interference corresponding to each of the $Q_{(2)}$ imaginary part PTRSs is generated based on the $Q_{(1)}$ real part PTRSs includes: the interference corresponding to each of the $Q_{(2)}$ imaginary part PTRSs is generated based on the $Q_{(1)}$ real part PTRSs and the real part data signal.

The embodiment corresponding to FIG. 29 is used as an example for description. Location indexes of the real part PTRSs are respectively 6 and 8, location indexes of the imaginary part PTRSs are, for example, 5 and 7, and the seventh preset value is 1. Interference received by the first PTRS (whose location index is 5) is generated based on a real part signal (including a real part PTRS and a real part data signal). In FIG. 29, for interference caused to the first PTRS, refer to formula 6-4:

$$F_1P_2+F_2P_3+ISI_{data_i}=1 \qquad \text{formula 6-4}$$

$F_n$ is a manner of calculating an n-order interference component corresponding to the first device. For example, $F_1$ is a manner of calculating a first-order interference component corresponding to the first device. $P_n$ is a value of an $n^{th}$ PTRS. For example, $P_1$ is a value of a first PTRS (whose location index is 5). $F_mP_n$ is a value of an m-order interference component of an $n^{th}$ PTRS. $ISI_{data_i}$ is a value of interference that is received by a first PTRS (whose location index is 5) and that is caused by a data signal to the first PTRS. n and m are positive integers, where $1 \le n \le 4$, and $1 \le m \le 2$.

The following describes a manner of determining the Q PTRSs.

FIG. 29 is used as an example to analyze the first Block-PTRS pattern. For example, the first preset value is 1. For a total value of interference caused to four PTRSs, refer to formula 6-5:

$$\begin{cases} F_1P_2 + F_2P_3 + ISI_{data_1} = 1 \\ F_1P_1 + F_1P_3 + ISI_{data_2} = 1 \\ F_1P_2 + F_1P_4 + ISI_{data_3} = 1 \\ F_2P_1 + F_1P_3 + ISI_{data_4} = 1 \end{cases} \qquad \text{formula 6-5}$$

In formula 6-5, total values of interference of the four PTRSs are sequentially listed. For a manner of calculating interference caused to each PTRS, refer to descriptions corresponding to formula 6-4. $ISI_{data_n}$ is a value of interference that is received by an $n^{th}$ PTRS and that is caused by a data signal to the $n^{th}$ PTRS. For example, $ISI_{data_i}$ is a value of interference that is received by a first PTRS (whose location index is 4) and that is caused by a data signal to the first PTRS. Specifically, $F_n$ and $ISI_{data_n}$ are known. Therefore, the value of $P_n$ may be determined.

In some possible implementations, the seventh preset value is at least one of the following values: $\sqrt{2}/2$, 1, $\sqrt{2}$, $3/\sqrt{10}$, $5/\sqrt{42}$, $3/\sqrt{42}$, $7/\sqrt{170}$, $5/\sqrt{170}$, $3/\sqrt{170}$, $9/\sqrt{648}$, $7/\sqrt{648}$, $5/\sqrt{648}$, $3/\sqrt{648}$, $j\sqrt{2}/2$, j, $j\sqrt{2}$, $j3/\sqrt{10}$, $j5/\sqrt{42}$, $j3/\sqrt{42}$, $j7/\sqrt{170}$, $j5/\sqrt{170}$, $j3/\sqrt{170}$, $j9/\sqrt{648}$, $j7/\sqrt{648}$, $j5/\sqrt{648}$, and $j3/\sqrt{648}$. In another expression manner, a square root function $(\text{sqrt}(x)=\sqrt{x})$ is for expressing the seventh preset value, and then the seventh preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt(170), j3/sqrt(170), j9/sqrt(648), j7/sqrt(648), j5/sqrt(648), and j3/sqrt(648). It should be noted that, in practical application, the seventh preset value may be an approximate value of the values listed above, for example, $\sqrt{2}/2$, which may be 0.707. These values listed above are factors commonly used when constellation modulation is performed, for example, an outermost constellation point sqrt(2)/2 of a constellation symbol, and a constellation point normalization factor 3/sqrt (10). These values are all defined by a protocol, and therefore are easily accepted preset values. In addition, the outermost constellation point represents maximum signal energy that can be achieved by each symbol. Therefore, using the value of the outermost constellation point can maximize the signal-to-noise ratio of the PTRS without affecting the PAPR.

In a possible implementation, the seventh preset value is determined based on a receiver type.

In a possible implementation, before the first device generates the second signal, the method further includes: The first device obtains first indication information sent by the second device, where the first indication information indicates the receiver type.

In a possible implementation, the method further includes: The first device sends second indication information to the second device, where the second indication information indicates the receiver type.

In some other possible implementations, the seventh preset value may alternatively be a value in a small range near a fixed value. For example, a value range of the seventh preset value may be $[z-\delta, z+\delta]$, where z may be one of the foregoing listed possible values of the first preset value, and $\delta$ is a very small value, for example, 0.1 or 0.05. In this manner, interference caused to a PTRS may be relaxed into an inequality. For example, if the fixed value is 1, for interference caused to a first PTRS, refer to formula 6-6:

$$|F_1P_2+F_2P_3+ISI_{data_i}|\leq1+\delta \qquad \text{formula 6-6}$$

Similarly, for a total value of interference caused to four first PTRSs, refer to formula 6-7:

$$\begin{cases} |F_1P_2 + F_2P_3 + ISI_{data_1}| \leq 1 + \delta \\ |F_1P_1 + F_1P_3 + ISI_{data_2}| \leq 1 + \delta \\ |F_1P_2 + F_1P_4 + ISI_{data_3}| \leq 1 + \delta \\ |F_2P_1 + F_1P_3 + ISI_{data_4}| \leq 1 + \delta \end{cases} \qquad \text{formula 6-7}$$

It should be noted that a restriction on the values of the PTRSs is relaxed in formula 6-7. In this manner, a value range of energy (or referred to as an amplitude, a size, or a value) of the PTRSs may be further agreed on. A value of $P_n$ may be solved with reference to the value range of the energy of the PTRSs and formula 6-7.

In a possible implementation, energy of each of the PTRSs is less than an eighth preset value. Optionally, amplitudes, envelopes, sizes, or values of the PTRSs are less than the eighth preset value. Without loss of generality, energy is used as an example for description in this application.

Optionally, the eighth preset value may be preset, for example, 1.5 or 2. In this manner, a restriction on the values of the PTRSs may be relaxed, and further, an energy range of the PTRSs can be agreed on, to avoid a problem that the PAPR of the sixth signal is excessively large because energy of the PTRSs is excessively large.

In another embodiment, the seventh preset value may alternatively not be limited. A total value of interference caused to one PTRS is shown in formula 6-8:

$$F_1P_2+F_2P_3+ISI_{data_i} \qquad \text{formula 6-8}$$

Assuming that $ISI_{data_i}$ is a positive number, positive phases of $P_2$ and $P_3$ may be selected. In this manner, an amplitude of interference caused to one PTRS may be maximum. In this manner, the first device and the second device may agree on an amplitude value of the PTRS, and a phase of the PTRS is determined by the first device, so that an amplitude of interference caused to the PTRS is maximum. The second device may determine that an amplitude of the interference received by the PTRS is maximum, but does not know a phase of the interference caused to the PTRS. A phase change caused by a phase noise is less than a phase change caused by P taking different symbols (positive and negative). Therefore, the phase noise can be estimated.

In some embodiments, both $Q_{(1)}$ and $Q_{(2)}$ are even numbers. In this manner, the Block-PTRS pattern used in this solution is compatible with that in an existing solution. A difference lies in that this solution restricts an association between PTRS signals in a Block-PTRS. In this manner, changes of the Block-PTRS pattern can be reduced, to facilitate forward compatibility of the solution.

In a possible implementation, a quantity of real part PTRSs may alternatively be different from a quantity of imaginary part PTRSs. For example, FIG. 30 is a schematic diagram of a Block-PTRS pattern of another DFT-s-OFDM signal according to an embodiment of this application.

To implement functions in the methods provided in embodiments of this application, the first device and the second device may include a hardware structure and a software module, and implement the foregoing functions in a form of a hardware structure, a software module, or a hardware structure plus a software module. One of the foregoing functions may be performed through a hardware structure, a software module, or a hardware structure plus a software module.

FIG. 31 is a schematic diagram of a structure of a communication apparatus according to an embodiment of this application. The communication apparatus 310 includes a generation unit 3101 and a sending unit 3102. The following describes the two units in detail.

In an embodiment, the generation unit 3101 is configured to generate a first signal, where the first signal includes one or more discrete Fourier transform-spread orthogonal frequency division multiplexing (DFT-s-OFDM) signals, one DFT-s-OFDM signal includes P block-phase noise tracking pilot signal (Block-PTRS) patterns, one Block-PTRS pattern includes Q phase noise tracking pilot signals (PTRSs), and the Q PTRSs include $Q_{(1)}$ real part PTRSs and $Q_{(2)}$ imaginary part PTRSs, where $Q_{(1)}$ is an even number, $Q_{(2)}$ is an odd number, and $Q_{(2)}$ is less than $Q_{(1)}$; or $Q_{(1)}$ is an odd number, $Q_{(2)}$ is an even number, and $Q_{(2)}$ is greater than $Q_{(1)}$; and A central location of location indexes of the $Q_{(1)}$ real part PTRSs is the same as a central location of location indexes of the $Q_{(2)}$ imaginary part PTRSs. Specifically, for an operation performed by the generation unit 3101, refer to the description in step S101 in the method shown in FIG. 9. For example, for the Block-PTRS pattern of the first signal, refer to FIG. 10 and FIG. 13.

The sending unit 3102 is configured to send the first signal to a second device. Specifically, for an operation performed by the sending unit 3102, refer to the description in step S102 in the method shown in FIG. 9.

In a possible implementation, when $Q_{(1)}$ is an even number and $Q_{(2)}$ is an odd number, phases of the $Q_{(1)}$ real part PTRSs are the same; and when $Q_{(1)}$ is an odd number and $Q_{(2)}$ is an even number, phases of the $Q_{(2)}$ imaginary part PTRSs are the same.

In a possible implementation, when $Q_{(1)}$ is an even number and $Q_{(2)}$ is an odd number, amplitudes of the $Q_{(1)}$ real part PTRSs are the same; and when $Q_{(1)}$ is an odd number and $Q_{(2)}$ is an even number, amplitudes of the $Q_{(2)}$ imaginary part PTRSs are the same.

In a possible implementation, the phases of the $Q_{(1)}$ real part PTRSs are the same, and the phases of the $Q_{(2)}$ imaginary part PTRSs are the same.

In a possible implementation, that $Q_{(1)}$ is an even number and $Q_{(2)}$ is an odd number includes: $Q_{(1)}$ is 2 and $Q_{(2)}$ is 1; and that $Q_{(1)}$ is an odd number and $Q_{(2)}$ is an even number includes: $Q_{(1)}$ is 1 and $Q_{(2)}$ is 2.

It should be noted that in the foregoing embodiment, the communication apparatus 310 may be a network device, may be an apparatus in a network device, or may be an apparatus that can be used in matching with a network device. Alternatively, the communication apparatus 310 may be a terminal device, may be an apparatus in a terminal device, or may be an apparatus that can be used in matching with a terminal device. Specifically, for operations performed by the units of the communication apparatus shown in FIG. 31, refer to related content of the method embodiment corresponding to FIG. 9. Details are not described herein again. The foregoing units may be implemented through hardware, software, or a combination of software and hardware. In an embodiment, functions of the generation unit 3101 and the sending unit 3102 in the foregoing content may be implemented by one or more processors in the communication apparatus 310. Through this communication apparatus, based on the even number of imaginary part PTRSs or the even number of real part PTRSs in the first signal, a symbol of interference received by the first signal may be determined. When the symbol of the interference is determined, a phase noise of the first signal may be solved.

In another embodiment, the generation unit 3101 is configured to generate a second signal, where the second signal includes one or more discrete Fourier transform-spread orthogonal frequency division multiplexing (DFT-s-OFDM) signals, one DFT-s-OFDM signal includes P block-phase noise tracking pilot signal (Block-PTRS) patterns, one Block-PTRS pattern includes Q phase noise tracking pilot signals (PTRSs), and the Q PTRSs include $Q_{(1)}$ real part PTRSs and $Q_{(2)}$ imaginary part PTRSs, where interference corresponding to the $Q_{(1)}$ real part PTRSs is a first preset value, the interference corresponding to the $Q_{(1)}$ real part PTRSs is generated based on the $Q_{(2)}$ imaginary part PTRSs, and $Q_{(1)}$ is less than or equal to $Q_{(2)}$; or interference corresponding to the $Q_{(2)}$ imaginary part PTRSs is a second preset value, the interference corresponding to the $Q_{(2)}$ imaginary part PTRSs is generated based on the $Q_{(1)}$ real part PTRSs, and $Q_{(1)}$ is greater than or equal to $Q_{(2)}$. Specifically, for an operation performed by the generation unit 3101, refer to the description in step S201 in the method shown in FIG. 15. For example, for the Block-PTRS pattern of the second signal, refer to FIG. 16 and FIG. 17.

The sending unit 3102 is configured to send the second signal to a second device. Specifically, for an operation performed by the sending unit 3102, refer to the description in step S202 in the method shown in FIG. 15.

In a possible implementation, that the interference corresponding to the $Q_{(1)}$ real part PTRSs is the first preset value includes: the interference value corresponding to the $Q_{(1)}$ real part PTRSs is the first preset value, or an amplitude of the interference value corresponding to the $Q_{(1)}$ real part PTRSs is the first preset value; and that the interference corresponding to the $Q_{(2)}$ imaginary part PTRSs is the second preset value includes: the interference value corresponding to the $Q_{(2)}$ imaginary part PTRSs is the second preset value, or an amplitude of the interference value corresponding to the $Q_{(2)}$ imaginary part PTRSs is the second preset value.

In a possible implementation, the one Block-PTRS pattern further includes an imaginary part data signal and a real part data signal, that interference corresponding to the $Q_{(1)}$ real part PTRSs is generated based on the $Q_{(2)}$ imaginary part PTRSs includes: the interference corresponding to the $Q_{(1)}$ real part PTRSs is generated based on the $Q_{(2)}$ imaginary part PTRSs and the imaginary part data signal; or that interference corresponding to the $Q_{(2)}$ imaginary part PTRSs is generated based on the $Q_{(1)}$ real part PTRSs includes: the interference corresponding to the $Q_{(2)}$ imaginary part PTRSs is generated based on the $Q_{(1)}$ real part PTRSs and the real part data signal.

In a possible implementation, when $Q_{(1)}$ is equal to $Q_{(2)}$, a difference between a central location of the location indexes of the $Q_{(1)}$ real part PTRSs and a central location of the location indexes of the $Q_{(2)}$ imaginary part PTRSs is one unit location.

In a possible implementation, the first preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt (648), jsqrt(2)/2, j, jsqrt(2), j3/sqrt(10), j5/sqrt(42), j3/sqrt (42), j7/sqrt(170), j5/sqrt(170), j3/sqrt(170), j9/sqrt(648), j7/sqrt(648), j5/sqrt(648), and j3/sqrt(648); or the second preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt (648), 3/sqrt(648), jsqrt(2)/2, j, jsqrt(2), j3/sqrt(10), j5/sqrt (42), j3/sqrt(42), j7/sqrt(170), j5/sqrt(170), j3/sqrt(170), j9/sqrt(648), j7/sqrt(648), j5/sqrt(648), and j3/sqrt(648).

In a possible implementation, the first preset value and the second preset value are determined based on a receiver type.

In a possible implementation, before the first device generates the second signal, the method further includes: The first device obtains first indication information sent by the second device, where the first indication information indicates the receiver type.

In a possible implementation, the method further includes: The first device sends second indication information to the second device, where the second indication information indicates the receiver type.

In a possible implementation, when the interference corresponding to the $Q_{(1)}$ real part PTRSs is the first preset value, energy of each of the $Q_{(2)}$ imaginary part PTRSs is less than a third preset value; and when the interference corresponding to the $Q_{(2)}$ imaginary part PTRSs is the second preset value, energy of each of the $Q_{(1)}$ real part PTRSs is less than a fourth preset value. In a possible implementation, that energy of each of the $Q_{(2)}$ imaginary part PTRSs is less than a third preset value includes: an amplitude of each of the $Q_{(2)}$ imaginary part PTRSs is less than the third preset value; and that energy of each of the $Q_{(1)}$ real part PTRSs is less than a fourth preset value includes: an amplitude of each of the $Q_{(1)}$ real part PTRSs is less than the fourth preset value.

In a possible implementation, when the interference corresponding to the $Q_{(1)}$ real part PTRSs is the first preset value, $Q_{(2)}$ is an even number; and when the interference corresponding to the $Q_{(2)}$ imaginary part PTRSs is the second preset value, $Q_{(1)}$ is an even number. It should be noted that in the foregoing embodiment, the communication apparatus 310 may be a network device, may be an apparatus in a network device, or may be an apparatus that can be used in matching with a network device. Alternatively, the communication apparatus 310 may be a terminal device, may be an apparatus in a terminal device, or may be an apparatus that can be used in matching with a terminal device. Specifically, for operations performed by the units of the communication apparatus shown in FIG. 31, refer to related content of the method embodiment corresponding to FIG. 15. Details are not described herein again. The foregoing units may be implemented through hardware, software, or a combination of software and hardware. In an embodiment, functions of the generation unit 3101 and the sending unit 3102 in the foregoing content may be implemented by one or more processors in the communication apparatus 310. Through this communication apparatus, the interference corresponding to the $Q_{(1)}$ real part PTRSs is the first preset value, or the interference corresponding to the $Q_{(2)}$ imaginary part PTRSs is the second preset value. When the value of the interference is determined, a phase noise of the second signal may be solved.

In another embodiment, the sending unit 3102 is configured to send indication information to a second device, where the indication information indicates a quantity of consecutive phase noise tracking pilot signals PTRSs whose amplitudes are 0 and that are included in one block-phase noise tracking pilot signal Block-PTRS pattern in a third signal. Specifically, for an operation performed by the sending unit 3102, refer to the description in step S301 in the method shown in FIG. 18.

the generation unit 3101 is configured to generate the third signal. The third signal includes one or more discrete Fourier transform-spread orthogonal frequency division multiplexing DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is an even number, $Q_{(2)}$ is an odd number, $Q_{(2)}$ is less than $Q_{(1)}$, amplitudes of the $Q_{(1)}$ real part PTRSs are 0, and the quantity of the phase noise tracking pilot signals PTRSs whose amplitudes are 0 is $Q_{(1)}$; or $Q_{(1)}$ is an odd number, $Q_{(2)}$ is an even number, $Q_{(2)}$ is greater than $Q_{(1)}$, amplitudes of the $Q_{(2)}$ imaginary part PTRSs are 0, and the quantity of the phase noise tracking pilot signals PTRSs whose amplitudes are 0 is $Q_{(2)}$; and A central location of location indexes of the $Q_{(1)}$ real part PTRSs is the same as a central location of location indexes of the $Q_{(2)}$ imaginary part PTRSs. Specifically, for an operation performed by the generation unit 3101, refer to the description in step S302 in the method shown in FIG. 18. For example, for the Block-PTRS pattern of the third signal, refer to FIG. 19.

The sending unit 3102 is further configured to send the third signal to the second device. Specifically, for an operation performed by the sending unit 3102, refer to the description in step S303 in the method shown in FIG. 18.

In a possible implementation, the quantity of the PTRSs whose amplitudes are 0 and that are included in the one Block-PTRS pattern is determined based on a quantity of orders of signal components of a filter of the first device.

It should be noted that in the foregoing embodiment, the communication apparatus 310 may be a network device, may be an apparatus in a network device, or may be an apparatus that can be used in matching with a network device. Specifically, for operations performed by the units of the communication apparatus shown in FIG. 31, refer to related content of the method embodiment corresponding to FIG. 18. Details are not described herein again. The foregoing units may be implemented through hardware, software, or a combination of software and hardware. In an embodiment, functions of the generation unit 3101 and the sending unit 3102 in the foregoing content may be implemented by one or more processors in the communication apparatus 310. Through this communication apparatus, interference caused by the even number of imaginary part PTRSs to the odd number of real part PTRSs is 0, or interference caused by the even number of real part PTRSs to the odd number of imaginary part PTRSs is 0. When the value of the interference is 0, a phase noise of the third signal may be solved.

In another embodiment, the sending unit 3102 is configured to send indication information to a second device. The indication information indicates a quantity of consecutive imaginary part data signals and imaginary part PTRSs included in one block-phase noise tracking pilot signal Block-PTRS pattern in a fourth signal, and the imaginary part data signals and the imaginary part PTRSs have opposite phases and a same amplitude; or the indication information indicates a quantity of consecutive real part data signals and real part PTRSs included in one Block-PTRS pattern in a fourth signal, and the real part data signals and the real part PTRSs have opposite phases and a same amplitude. Specifically, for an operation performed by the sending unit 3102, refer to the description in step S401 in the method shown in FIG. 20.

the generation unit 3101 is configured to generate the fourth signal. The fourth signal includes one or more discrete Fourier transform-spread orthogonal frequency division multiplexing DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is 1, and a central location of location indexes of the $Q_{(2)}$ imaginary part PTRSs and the imaginary part data signals is the same as a central location of location indexes of the $Q_{(1)}$ real part PTRSs; or $Q_{(2)}$ is 1, and a central location of location indexes of the $Q_{(1)}$ real part PTRSs and the real part data signals is the same as a central location of location indexes of the $Q_{(2)}$ imaginary part PTRSs. Specifically, for an operation performed by the generation unit 3101, refer to the description in step S402 in the method shown in FIG. 20. For example, for the Block-PTRS pattern of the fourth signal, refer to FIG. 21.

The sending unit 3102 is further configured to send the fourth signal to the second device. Specifically, for an operation performed by the sending unit 3102, refer to the description in step S403 in the method shown in FIG. 20.

In a possible implementation, the quantity of the consecutive data signals and first PTRSs is determined based on a quantity of orders of signal components of a filter of the first device.

It should be noted that in the foregoing embodiment, the communication apparatus 310 may be a network device, may be an apparatus in a network device, or may be an apparatus that can be used in matching with a network device. Specifically, for operations performed by the units of the communication apparatus shown in FIG. 31, refer to related content of the method embodiment corresponding to FIG. 20. Details are not described herein again. The foregoing units may be implemented through hardware, software, or a combination of software and hardware. In an embodiment, functions of the generation unit 3101 and the sending unit 3102 in the foregoing content may be implemented by one or more processors in the communication apparatus 310. Through this communication apparatus, a total value of interference caused to the $Q_{(1)}$ real part PTRSs is 0, or a total value of interference caused to the $Q_{(2)}$ imaginary part PTRSs is 0. When the value of the interference is 0, a phase noise of the fourth signal may be solved.

In another embodiment, the generation unit 3101 is configured to generate a fifth signal. The fifth signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ first PTRSs and $Q_{(2)}$ second PTRSs; the first PTRS includes a real part PTRS, and the second PTRS includes an imaginary part PTRS; the first PTRS includes an imaginary part PTRS, and the second PTRS includes a real part PTRS; or each of the first PTRS and the second PTRS includes a real part PTRS and an imaginary part PTRS; and interference or an amplitude of interference corresponding to the first PTRS is a fifth preset value, where if the first PTRS includes a real part PTRS and the second PTRS includes an imaginary part PTRS, or the first PTRS includes an imaginary part PTRS and the second PTRS includes a real part PTRS, the interference corresponding to the first PTRS is generated based on the second PTRS; or if each of the first PTRS and the second PTRS includes a real part PTRS and an imaginary part PTRS, interference corresponding to the real part PTRS in the first PTRS is generated based on the imaginary part PTRS in the first PTRS and the imaginary part PTRS in the second PTRS, and interference corresponding to the imaginary part PTRS in the first PTRS is generated based on the real part PTRS in the first PTRS and the real part PTRS in the second PTRS. Specifically, for an operation performed by the generation unit 3101, refer to the description in step S501 in the method shown in FIG. 22. For example, for the Block-PTRS pattern of the fourth signal, refer to FIG. 23 to FIG. 25, FIG. 26A, FIG. 26B, FIG. 27A, and FIG. 27B.

The sending unit 3102 is configured to send the fifth signal to a second device. Specifically, for an operation performed by the sending unit 3102, refer to the description in step S502 in the method shown in FIG. 22.

In a possible implementation, the one block-PTRS pattern includes four PTRSs, and the four PTRSs include two first PTRSs and two second PTRSs, where location indexes of the four PTRSs are four consecutive locations; and the location indexes of the first PTRSs are in a second location and a fourth location, and the location indexes of the second PTRSs are in a first location and a third location; the location indexes of the first PTRSs are in a third location and a fourth location, and the location indexes of the second PTRSs are in a first location and a second location; the location indexes of the first PTRSs are in a second location and a third location, and the location indexes of the second PTRSs are in a first location and a fourth location; the location indexes of the first PTRSs are in a first location and a fourth location, and the location indexes of the second PTRSs are in a second location and a third location; the location indexes of the first PTRSs are in a first location and a third location, and the location indexes of the second PTRSs are in a second location and a fourth location; or the location indexes of the first PTRSs are in a first location and a second location, and the location indexes of the second PTRSs are in a third location and a fourth location.

In a possible implementation, the one block-PTRS pattern includes eight PTRSs, and the eight PTRSs include four first PTRSs and four second PTRSs, where location indexes of the eight PTRSs are eight consecutive locations; and the location indexes of the first PTRSs are in a second location, a fourth location, a fifth location, and a seventh location, and the location indexes of the second PTRSs are in a first location, a third location, a sixth location, and an eighth location; the location indexes of the first PTRSs are in a second location, a fourth location, a fifth location, and a sixth location, and the location indexes of the second PTRSs are in a first location, a third location, a seventh location, and an eighth location; the location indexes of the first PTRSs are in a second location, a third location, a fourth location, and a fifth location, and the location indexes of the second PTRSs are in a first location, a sixth location, a seventh location, and an eighth location; the location indexes of the first PTRSs are in a third location, a fourth location, a fifth location, and a sixth location, and the location indexes of the second PTRSs are in a first location, a second location, a seventh location, and an eighth location; the location indexes of the first PTRSs are in a third location, a fourth location, a fifth location, and a seventh location, and the location indexes of the second PTRSs are in a first location, a second location, a sixth location, and an eighth location; or the location indexes of the first PTRSs are in a fourth location, a fifth location, a sixth location, and a seventh location, and the location indexes of the second PTRSs are in a first location, a second location, a third location, and an eighth location.

In a possible implementation, the one Block-PTRS pattern further includes an imaginary part data signal and a real part data signal; and if the first PTRS includes a real part PTRS and the second PTRS includes an imaginary part PTRS, that the interference corresponding to the first PTRS is generated based on the second PTRS includes: the interference corresponding to the first PTRS is generated based on the second PTRS and the imaginary part data signal; if the first PTRS includes an imaginary part PTRS and the second PTRS includes a real part PTRS, that the interference corresponding to the first PTRS is generated based on the second PTRS includes: the interference corresponding to the first PTRS is generated based on the second PTRS and the real part data signal; or if each of the first PTRS and the second PTRS includes a real part PTRS and an imaginary part PTRS, that interference corresponding to the real part PTRS in the first PTRS is generated based on the imaginary part PTRS in the first PTRS and the imaginary part PTRS in the second PTRS, and interference corresponding to the imaginary part PTRS in the first PTRS is generated based on the real part PTRS in the first PTRS and the real part PTRS in the second PTRS includes: the interference corresponding to the real part PTRS in the first PTRS is generated based on the imaginary part PTRS in the first PTRS, the imaginary part PTRS in the second PTRS, and the imaginary part data signal, and the interference corresponding to the imaginary part PTRS in the first PTRS is generated based on the real part PTRS in the first PTRS, the real part PTRS in the second PTRS, and the real part data signal.

In a possible implementation, the fifth preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt (648), jsqrt(2)/2, j, jsqrt(2), j3/sqrt(10), j5/sqrt(42), j3/sqrt (42), j7/sqrt(170), j5/sqrt(170), j3/sqrt(170), j9/sqrt(648), j7/sqrt(648), j5/sqrt(648), and j3/sqrt(648).

In a possible implementation, the fifth preset value is determined based on a receiver type.

In a possible implementation, when the interference or the amplitude of the interference corresponding to the first PTRS is the fifth preset value, energy of each of the second PTRSs is less than a sixth preset value.

In a possible implementation, that energy of each of the second PTRSs is less than a sixth preset value includes: an amplitude of each of the second PTRSs is less than the sixth preset value.

In a possible implementation, location indexes of a first part of PTRSs in the second PTRSs are first M locations in location indexes of the Q PTRSs, location indexes of a second part of PTRSs in the second PTRSs are last N locations in the location indexes of the Q PTRSs, and $N+M=Q_{(2)}$.

In a possible implementation, a quantity of real part PTRSs in the first PTRSs is equal to a quantity of imaginary part PTRSs in the first PTRSs, and a quantity of real part PTRSs in the second PTRSs is equal to a quantity of imaginary part PTRSs in the second PTRSs; and a central location of the location indexes of the first PTRSs is the same as a central location of the location indexes of the second PTRSs.

In a possible implementation, each of a quantity of real part PTRSs in the second PTRSs and a quantity of imaginary part PTRSs in the second PTRSs is 1; and a location index of the real part PTRS in the second PTRSs is a maximum value of location indexes of the Q PTRSs, and a location index of the imaginary part PTRS in the second PTRSs is a minimum value of the location indexes of the Q PTRSs; or a location index of the real part PTRS in the second PTRSs is a minimum value of location indexes of the Q PTRSs, and a location index of the imaginary part PTRS in the second PTRSs is a maximum value of the location indexes of the Q PTRSs.

In a possible implementation, $Q_{(1)}$ is equal to $Q_{(2)}$, and a difference between a central location of the location indexes of the $Q_{(1)}$ first PTRSs and a central location of the location indexes of the $Q_{(2)}$ second PTRSs is one unit location.

In a possible implementation, when the interference or the amplitude of the interference corresponding to the first PTRS is the fifth preset value, $Q_{(2)}$ is an even number.

It should be noted that in the foregoing embodiment, the communication apparatus 310 may be a network device, may be an apparatus in a network device, or may be an apparatus that can be used in matching with a network device. Alternatively, the communication apparatus 310 may be a terminal device, may be an apparatus in a terminal device, or may be an apparatus that can be used in matching with a terminal device. Specifically, for operations performed by the units of the communication apparatus shown in FIG. 31, refer to related content of the method embodiment corresponding to FIG. 22. Details are not described herein again. The foregoing units may be implemented through hardware, software, or a combination of software and hardware. In an embodiment, functions of the generation unit 3101 and the sending unit 3102 in the foregoing content may be implemented by one or more processors in the communication apparatus 310. Through this communication apparatus, interference corresponding to the first PTRS is a fifth preset value. When the value of the interference is determined, a phase noise of the fifth signal may be solved.

In another embodiment, the generation unit 3101 is configured to generate a sixth signal. The sixth signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ real part PTRSs and $Q_{(2)}$ imaginary part PTRSs; and interference corresponding to the Q PTRSs is a seventh preset value, interference corresponding to the $Q_{(1)}$ real part PTRSs is generated based on the $Q_{(2)}$ imaginary part PTRSs, and interference corresponding to the $Q_{(2)}$ imaginary part PTRSs is generated based on the $Q_{(1)}$ real part PTRSs. Specifically, for an operation performed by the generation unit 3101, refer to the description in step S601 in the method shown in FIG. 28. For example, for the Block-PTRS pattern of the fourth signal, refer to FIG. 29 to FIG. 31.

The sending unit 3102 is configured to send the sixth signal to a second device. Specifically, for an operation performed by the sending unit 3102, refer to the description in step S602 in the method shown in FIG. 28.

In a possible implementation, the one Block-PTRS pattern further includes an imaginary part data signal and a real part data signal, that interference corresponding to the $Q_{(1)}$ real part PTRSs is generated based on the $Q_{(2)}$ imaginary part PTRSs includes: the interference corresponding to the $Q_{(1)}$ real part PTRSs is generated based on the $Q_{(2)}$ imaginary part PTRSs and the imaginary part data signal; and that interference corresponding to the $Q_{(2)}$ imaginary part PTRSs is generated based on the $Q_{(1)}$ real part PTRSs includes: the interference corresponding to the $Q_{(2)}$ imaginary part PTRSs is generated based on the $Q_{(1)}$ real part PTRSs and the real part data signal.

In a possible implementation, the seventh preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt (648), jsqrt(2)/2, j, jsqrt(2), j3/sqrt(10), j5/sqrt(42), j3/sqrt (42), j7/sqrt(170), j5/sqrt(170), j3/sqrt(170), j9/sqrt(648), j7/sqrt(648), j5/sqrt(648), and j3/sqrt(648).

In a possible implementation, energy of each of the PTRSs is less than an eighth preset value.

It should be noted that in the foregoing embodiment, the communication apparatus 310 may be a network device, may be an apparatus in a network device, or may be an apparatus that can be used in matching with a network device. Alternatively, the communication apparatus 310 may be a terminal device, may be an apparatus in a terminal device, or may be an apparatus that can be used in matching with a terminal device. Specifically, for operations performed by the units of the communication apparatus shown in FIG. 31, refer to related content of the method embodiment corresponding to FIG. 28. Details are not described herein again. The foregoing units may be implemented through hardware, software, or a combination of software and hardware. In an embodiment, functions of the generation unit 3101 and the sending unit 3102 in the foregoing content may be implemented by one or more processors in the communication apparatus 310. Through this communication apparatus, interference corresponding to the Q PTRSs is the seventh preset value. When the value of the interference is determined, a phase noise of the sixth signal may be solved.

FIG. 32 is a schematic diagram of a structure of another communication apparatus according to an embodiment of this application. The apparatus may be configured to implement the method described in the foregoing method embodiment. For details, refer to the description in the foregoing method embodiment.

The communication apparatus 320 may include one or more processors 3201. The processor 3201 may be a general-purpose processor, a dedicated processor, or the like. The processor 3201 may be configured to control the communication apparatus (for example, an access point, an access point chip, a site, or a site chip), execute a software program, and process data of the software program.

Optionally, the communication apparatus 320 may include one or more memories 3202, and may store instructions 3204, and the instructions may be run on the processor 3201, so that the communication apparatus 320 performs the method described in the foregoing method embodiment. Optionally, the memory 3202 may further store data. The processor 3201 and the memory 3202 may be separately disposed, or may be integrated together.

Optionally, the communication apparatus 320 may further include a transceiver 3205 and an antenna 3206. The transceiver 3205 may be referred to as a transceiver unit, a transceiver circuit, or the like, and is configured to implement receiving and sending functions. The transceiver 3205 may include a receiver and a transmitter. The receiver may be referred to as a receiver circuit, or the like, and is configured to implement a receiving function. The transmitter may be referred to as a transmitter circuit, or the like, and is configured to implement a sending function.

In an embodiment, the processor 3201 is configured to generate a first signal, where the first signal includes one or more discrete Fourier transform-spread orthogonal frequency division multiplexing (DFT-s-OFDM) signals, one DFT-s-OFDM signal includes P block-phase noise tracking pilot signal (Block-PTRS) patterns, one Block-PTRS pattern includes Q phase noise tracking pilot signals (PTRSs), and the Q PTRSs include $Q_{(1)}$ real part PTRSs and $Q_{(2)}$ imaginary part PTRSs, where $Q_{(1)}$ is an even number, $Q_{(2)}$ is an odd number, and $Q_{(2)}$ is less than $Q_{(1)}$; or $Q_{(1)}$ is an odd number, $Q_{(2)}$ is an even number, and $Q_{(2)}$ is greater than $Q_{(1)}$; and A central location of location indexes of the $Q_{(1)}$ real part PTRSs is the same as a central location of location indexes of the $Q_{(2)}$ imaginary part PTRSs. Specifically, for an operation performed by the processor 3201, refer to the description in step S101 in the method shown in FIG. 9. For example, for the Block-PTRS pattern of the first signal, refer to FIG. 10 and FIG. 13.

The processor 3201 is configured to send the first signal to a second device through the transceiver 3205. Specifically, for an operation performed by the processor 3201, refer to the description in step S102 in the method shown in FIG. 9.

In a possible implementation, when $Q_{(1)}$ is an even number and $Q_{(2)}$ is an odd number, phases of the $Q_{(1)}$ real part PTRSs are the same; and when $Q_{(1)}$ is an odd number and $Q_{(2)}$ is an even number, phases of the $Q_{(2)}$ imaginary part PTRSs are the same.

In a possible implementation, when $Q_{(1)}$ is an even number and $Q_{(2)}$ is an odd number, amplitudes of the $Q_{(1)}$ real part PTRSs are the same; and when $Q_{(1)}$ is an odd number and $Q_{(2)}$ is an even number, amplitudes of the $Q_{(2)}$ imaginary part PTRSs are the same.

In a possible implementation, the phases of the $Q_{(1)}$ real part PTRSs are the same, and the phases of the $Q_{(2)}$ imaginary part PTRSs are the same.

In a possible implementation, that $Q_{(1)}$ is an even number and $Q_{(2)}$ is an odd number includes: $Q_{(1)}$ is 2 and $Q_{(2)}$ is 1; and that $Q_{(1)}$ is an odd number and $Q_{(2)}$ is an even number includes: $Q_{(1)}$ is 1 and $Q_{(2)}$ is 2.

It should be noted that in the foregoing embodiment, the communication apparatus 320 may be a network device, may be a terminal device, may be a chip, a chip system, a processor, or the like that supports a network device in implementing the foregoing method, or may be a chip, a chip system, a processor, or the like that supports a terminal device in implementing the foregoing method. Specifically, for operations performed by the processor 3201, refer to related content of the method embodiment corresponding to FIG. 9. Details are not described herein again. Through this communication apparatus, based on the even number of imaginary part PTRSs or the even number of real part PTRSs in the first signal, a symbol of interference received by the first signal may be determined. When the symbol of the interference is determined, a phase noise of the first signal may be solved.

In another embodiment, the processor 3201 is configured to generate a second signal, where the second signal includes one or more discrete Fourier transform-spread orthogonal frequency division multiplexing (DFT-s-OFDM) signals, one DFT-s-OFDM signal includes P block-phase noise tracking pilot signal (Block-PTRS) patterns, one Block-PTRS pattern includes Q phase noise tracking pilot signals (PTRSs), and the Q PTRSs include $Q_{(1)}$ real part PTRSs and $Q_{(2)}$ imaginary part PTRSs, where interference corresponding to the $Q_{(1)}$ real part PTRSs is a first preset value, the interference corresponding to the $Q_{(1)}$ real part PTRSs is generated based on the $Q_{(2)}$ imaginary part PTRSs, and $Q_{(1)}$ is less than or equal to $Q_{(2)}$; or interference corresponding to the $Q_{(2)}$ imaginary part PTRSs is a second preset value, the interference corresponding to the $Q_{(2)}$ imaginary part PTRSs is generated based on the $Q_{(1)}$ real part PTRSs, and $Q_{(1)}$ is greater than or equal to $Q_{(2)}$. Specifically, for an operation performed by the processor 3201, refer to the description in step S201 in the method shown in FIG. 15. For example, for the Block-PTRS pattern of the second signal, refer to FIG. 16 and FIG. 17.

The processor 3201 is configured to send the second signal to a second device through the transceiver 3205. Specifically, for an operation performed by the processor 3201, refer to the description in step S202 in the method shown in FIG. 15.

In a possible implementation, that the interference corresponding to the $Q_{(1)}$ real part PTRSs is the first preset value includes: the interference value corresponding to the $Q_{(1)}$ real part PTRSs is the first preset value, or an amplitude of the interference value corresponding to the $Q_{(1)}$ real part PTRSs is the first preset value; and that the interference corresponding to the $Q_{(2)}$ imaginary part PTRSs is the second preset value includes: the interference value corresponding to the $Q_{(2)}$ imaginary part PTRSs is the second preset value, or an amplitude of the interference value corresponding to the $Q_{(2)}$ imaginary part PTRSs is the second preset value.

In a possible implementation, the one Block-PTRS pattern further includes an imaginary part data signal and a real part data signal, that interference corresponding to the $Q_{(1)}$ real part PTRSs is generated based on the $Q_{(2)}$ imaginary part PTRSs includes: the interference corresponding to the $Q_{(1)}$ real part PTRSs is generated based on the $Q_{(2)}$ imaginary part PTRSs and the imaginary part data signal; or that interference corresponding to the $Q_{(2)}$ imaginary part PTRSs is generated based on the $Q_{(1)}$ real part PTRSs includes: the interference corresponding to the $Q_{(2)}$ imaginary part PTRSs is generated based on the $Q_{(1)}$ real part PTRSs and the real part data signal.

In a possible implementation, when $Q_{(1)}$ is equal to $Q_{(2)}$, a difference between a central location of the location indexes of the $Q_{(1)}$ first PTRSs and a central location of the location indexes of the $Q_{(2)}$ second PTRSs is one unit location.

In a possible implementation, the first preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt(170), j3/sqrt(170), j9/sqrt(648), j7/sqrt(648), j5/sqrt(648), and j3/sqrt(648); or the second preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt(648), jsqrt(2)/2, j, jsqrt(2), j3/sqrt(10), j5/sqrt(42), j3/sqrt(42), j7/sqrt(170), j5/sqrt(170), j3/sqrt(170), j9/sqrt(648), j7/sqrt(648), j5/sqrt(648), and j3/sqrt(648).

In a possible implementation, the first preset value and the second preset value are determined based on a receiver type.

In a possible implementation, before the first device generates the second signal, the method further includes: The first device obtains first indication information sent by the second device, where the first indication information indicates the receiver type.

In a possible implementation, the method further includes: The first device sends second indication information to the second device, where the second indication information indicates the receiver type.

In a possible implementation, when the interference corresponding to the $Q_{(1)}$ real part PTRSs is the first preset value, energy of each of the $Q_{(2)}$ imaginary part PTRSs is less than a third preset value; and when the interference corresponding to the $Q_{(2)}$ imaginary part PTRSs is the second preset value, energy of each of the $Q_{(1)}$ real part PTRSs is less than a fourth preset value.

In a possible implementation, that energy of each of the $Q_{(2)}$ imaginary part PTRSs is less than a third preset value includes: an amplitude of each of the $Q_{(2)}$ imaginary part PTRSs is less than the third preset value; and that energy of each of the $Q_{(1)}$ real part PTRSs is less than a fourth preset value includes: an amplitude of each of the $Q_{(1)}$ real part PTRSs is less than the fourth preset value.

In a possible implementation, when the interference corresponding to the $Q_{(1)}$ real part PTRSs is the first preset value, $Q_{(2)}$ is an even number; and when the interference corresponding to the $Q_{(2)}$ imaginary part PTRSs is the second preset value, $Q_{(1)}$ is an even number.

It should be noted that in the foregoing embodiment, the communication apparatus 320 may be a network device, may be a terminal device, may be a chip, a chip system, a processor, or the like that supports a network device in implementing the foregoing method, or may be a chip, a chip system, a processor, or the like that supports a terminal device in implementing the foregoing method. Specifically, for operations performed by the processor 3201, refer to related content of the method embodiment corresponding to FIG. 15. Details are not described herein again. Through this communication apparatus, the interference corresponding to the $Q_{(1)}$ real part PTRSs is the first preset value, or the interference corresponding to the $Q_{(2)}$ imaginary part PTRSs is the second preset value. When the value of the interference is determined, a phase noise of the second signal may be solved.

In another embodiment, the processor 3201 is configured to send indication information to a second device through the transceiver 3205, where the indication information indicates a quantity of consecutive phase noise tracking pilot signals PTRSs whose amplitudes are 0 and that are included in one block-phase noise tracking pilot signal Block-PTRS pattern in a third signal. Specifically, for an operation performed by the processor 3201, refer to the description in step S301 in the method shown in FIG. 18.

The processor 3201 is configured to generate the third signal. The third signal includes one or more discrete Fourier transform-spread orthogonal frequency division multiplexing DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is an even number, $Q_{(2)}$ is an odd number, $Q_{(2)}$ is less than $Q_{(1)}$, amplitudes of the $Q_{(1)}$ real part PTRSs are 0, and the quantity of the phase noise tracking pilot signals PTRSs whose amplitudes are 0 is $Q_{(1)}$; or $Q_{(1)}$ is an odd number, $Q_{(2)}$ is an even number, $Q_{(2)}$ is greater than $Q_{(1)}$, amplitudes of the $Q_{(2)}$ imaginary part PTRSs are 0, and the quantity of the phase noise tracking pilot signals PTRSs whose amplitudes are 0 is $Q_{(2)}$; and A central location of location indexes of the $Q_{(1)}$ real part PTRSs is the same as a central location of location indexes of the $Q_{(2)}$ imaginary part PTRSs. Specifically, for an operation performed by the processor 3201, refer to the description in step S302 in the method shown in FIG. 18. For example, for the Block-PTRS pattern of the third signal, refer to FIG. 19.

The processor 3201 is further configured to send the third signal to the second device through the transceiver 3205.

Specifically, for an operation performed by the processor 3201, refer to the description in step S303 in the method shown in FIG. 18.

In a possible implementation, the quantity of the PTRSs whose amplitudes are 0 and that are included in the one Block-PTRS pattern is determined based on a quantity of orders of signal components of a filter of the first device.

It should be noted that in the foregoing embodiment, the communication apparatus 320 may be a network device, or may be a chip, a chip system, a processor, or the like that supports a network device in implementing the foregoing method. Specifically, for operations performed by the processor 3201, refer to related content of the method embodiment corresponding to FIG. 18. Details are not described herein again. Through this communication apparatus, interference caused by the even number of imaginary part PTRSs to the odd number of real part PTRSs is 0, or interference caused by the even number of real part PTRSs to the odd number of imaginary part PTRSs is 0. When the value of the interference is 0, a phase noise of the third signal may be solved.

In another embodiment, the processor 3201 is configured to send indication information to a second device through the transceiver 3205. The indication information indicates a quantity of consecutive imaginary part data signals and imaginary part PTRSs included in one block-phase noise tracking pilot signal Block-PTRS pattern in a fourth signal, and the imaginary part data signals and the imaginary part PTRSs have opposite phases and a same amplitude; or the indication information indicates a quantity of consecutive real part data signals and real part PTRSs included in one Block-PTRS pattern in a fourth signal, and the real part data signals and the real part PTRSs have opposite phases and a same amplitude. Specifically, for an operation performed by the processor 3201, refer to the description in step S401 in the method shown in FIG. 20.

The processor 3201 is configured to generate the fourth signal. The fourth signal includes one or more discrete Fourier transform-spread orthogonal frequency division multiplexing DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is 1, and a central location of location indexes of the $Q_{(2)}$ imaginary part PTRSs and the imaginary part data signals is the same as a central location of location indexes of the $Q_{(1)}$ real part PTRSs; or $Q_{(2)}$ is 1, and a central location of location indexes of the $Q_{(1)}$ real part PTRSs and the real part data signals is the same as a central location of location indexes of the $Q_{(2)}$ imaginary part PTRSs. Specifically, for an operation performed by the processor 3201, refer to the description in step S402 in the method shown in FIG. 20. For example, for the Block-PTRS pattern of the fourth signal, refer to FIG. 21.

The processor 3201 is further configured to send the fourth signal to the second device through the transceiver 3205. Specifically, for an operation performed by the processor 3201, refer to the description in step S403 in the method shown in FIG. 20.

In a possible implementation, the quantity of the consecutive data signals and first PTRSs is determined based on a quantity of orders of signal components of a filter of the first device.

It should be noted that in the foregoing embodiment, the communication apparatus 320 may be a network device, or may be a chip, a chip system, a processor, or the like that supports a network device in implementing the foregoing method. Specifically, for operations performed by the processor 3201, refer to related content of the method embodiment corresponding to FIG. 20. Details are not described herein again. Through this communication apparatus, a total value of interference caused to the $Q_{(1)}$ real part PTRSs is 0, or a total value of interference caused to the $Q_{(2)}$ imaginary part PTRSs is 0. When the value of the interference is 0, a phase noise of the fourth signal may be solved.

In another embodiment, the processor 3201 is configured to generate a fifth signal. The fifth signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ first PTRSs and $Q_{(2)}$ second PTRSs; the first PTRS includes a real part PTRS, and the second PTRS includes an imaginary part PTRS; the first PTRS includes an imaginary part PTRS, and the second PTRS includes a real part PTRS; or each of the first PTRS and the second PTRS includes a real part PTRS and an imaginary part PTRS; and interference or an amplitude of interference corresponding to the first PTRS is a fifth preset value, where if the first PTRS includes a real part PTRS and the second PTRS includes an imaginary part PTRS, or the first PTRS includes an imaginary part PTRS and the second PTRS includes a real part PTRS, the interference corresponding to the first PTRS is generated based on the second PTRS; or if each of the first PTRS and the second PTRS includes a real part PTRS and an imaginary part PTRS, interference corresponding to the real part PTRS in the first PTRS is generated based on the imaginary part PTRS in the first PTRS and the imaginary part PTRS in the second PTRS, and interference corresponding to the imaginary part PTRS in the first PTRS is generated based on the real part PTRS in the first PTRS and the real part PTRS in the second PTRS. Specifically, for an operation performed by the processor 3201, refer to the description in step S501 in the method shown in FIG. 22. For example, for the Block-PTRS pattern of the fourth signal, refer to FIG. 23 to FIG. 25, FIG. 26A, FIG. 26B, FIG. 27A, and FIG. 27B.

The processor 3201 is configured to send the fifth signal to the second device through the transceiver 3205. Specifically, for an operation performed by the processor 3201, refer to the description in step S502 in the method shown in FIG. 22.

In a possible implementation, that one Block-PTRS pattern includes Q phase noise tracking pilot signals PTRSs and the Q PTRSs include $Q_{(1)}$ first PTRSs and $Q_{(2)}$ second PTRSs includes: the one block-PTRS pattern includes four PTRSs, and the four PTRSs include two first PTRSs and two second PTRSs, where location indexes of the four PTRSs are four consecutive locations; and the location indexes of the first PTRSs are in a second location and a fourth location, and the location indexes of the second PTRSs are in a first location and a third location; the location indexes of the first PTRSs are in a third location and a fourth location, and the location indexes of the second PTRSs are in a first location and a second location; the location indexes of the first PTRSs are in a second location and a third location, and the location indexes of the second PTRSs are in a first location and a fourth location; the location indexes of the first PTRSs are in a first location and a fourth location, and the location indexes of the second PTRSs are in a second location and a third location; the location indexes of the first PTRSs are in a first location and a third location, and the location indexes of the second PTRSs are in a second location and a fourth location; or the location indexes of the first PTRSs are in a first location and a second location, and the location indexes of the second PTRSs are in a third location and a fourth location.

In a possible implementation, that one Block-PTRS pattern includes Q phase noise tracking pilot signals PTRSs and the Q PTRSs include $Q_{(1)}$ first PTRSs and $Q_{(2)}$ second PTRSs includes: the one block-PTRS pattern includes eight PTRSs, and the eight PTRSs include four first PTRSs and four second PTRSs, where location indexes of the eight PTRSs are eight consecutive locations; and the location indexes of the first PTRSs are in a second location, a fourth location, a fifth location, and a seventh location, and the location indexes of the second PTRSs are in a first location, a third location, a sixth location, and an eighth location; the location indexes of the first PTRSs are in a second location, a fourth location, a fifth location, and a sixth location, and the location indexes of the second PTRSs are in a first location, a third location, a seventh location, and an eighth location; the location indexes of the first PTRSs are in a second location, a third location, a fourth location, and a fifth location, and the location indexes of the second PTRSs are in a first location, a sixth location, a seventh location, and an eighth location; the location indexes of the first PTRSs are in a third location, a fourth location, a fifth location, and a sixth location, and the location indexes of the second PTRSs are in a first location, a second location, a seventh location, and an eighth location; the location indexes of the first PTRSs are in a third location, a fourth location, a fifth location, and a seventh location, and the location indexes of the second PTRSs are in a first location, a second location, a sixth location, and an eighth location; or the location indexes of the first PTRSs are in a fourth location, a fifth location, a sixth location, and a seventh location, and the location indexes of the second PTRSs are in a first location, a second location, a third location, and an eighth location.

In a possible implementation, the one Block-PTRS pattern further includes an imaginary part data signal and a real part data signal; and if the first PTRS includes a real part PTRS and the second PTRS includes an imaginary part PTRS, that the interference corresponding to the first PTRS is generated based on the second PTRS includes: the interference corresponding to the first PTRS is generated based on the second PTRS and the imaginary part data signal; if the first PTRS includes an imaginary part PTRS and the second PTRS includes a real part PTRS, that the interference corresponding to the first PTRS is generated based on the second PTRS includes: the interference corresponding to the first PTRS is generated based on the second PTRS and the real part data signal; or if each of the first PTRS and the second PTRS includes a real part PTRS and an imaginary part PTRS, that interference corresponding to the real part PTRS in the first PTRS is generated based on the imaginary part PTRS in the first PTRS and the imaginary part PTRS in the second PTRS, and interference corresponding to the imaginary part PTRS in the first PTRS is generated based on the real part PTRS in the first PTRS and the real part PTRS in the second PTRS includes: the interference corresponding to the real part PTRS in the first PTRS is generated based on the imaginary part PTRS in the first PTRS, the imaginary part PTRS in the second PTRS, and the imaginary part data signal, and the interference corresponding to the imaginary part PTRS in the first PTRS is generated based on the real part PTRS in the first PTRS, the real part PTRS in the second PTRS, and the real part data signal.

In a possible implementation, the fifth preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt (648), jsqrt(2)/2, j, jsqrt(2), j3/sqrt(10), j5/sqrt(42), j3/sqrt (42), j7/sqrt(170), j5/sqrt(170), j3/sqrt(170), j9/sqrt(648), j7/sqrt(648), j5/sqrt(648), and j3/sqrt(648).

In a possible implementation, the fifth preset value is determined based on a receiver type.

In a possible implementation, when the interference or the amplitude of the interference corresponding to the first PTRS is the fifth preset value, energy of each of the second PTRSs is less than a sixth preset value.

In a possible implementation, that energy of each of the second PTRSs is less than a sixth preset value includes: an amplitude of each of the second PTRSs is less than the sixth preset value.

In a possible implementation, location indexes of a first part of PTRSs in the second PTRSs are first M locations in location indexes of the Q PTRSs, location indexes of a second part of PTRSs in the second PTRSs are last N locations in the location indexes of the Q PTRSs, and $N+M=Q_{(2)}$.

In a possible implementation, a quantity of real part PTRSs in the first PTRSs is equal to a quantity of imaginary part PTRSs in the first PTRSs, and a quantity of real part PTRSs in the second PTRSs is equal to a quantity of imaginary part PTRSs in the second PTRSs; and a central location of the location indexes of the first PTRSs is the same as a central location of the location indexes of the second PTRSs.

In a possible implementation, each of a quantity of real part PTRSs in the second PTRSs and a quantity of imaginary part PTRSs in the second PTRSs is 1; and a location index of the real part PTRS in the second PTRSs is a maximum value of location indexes of the Q PTRSs, and a location index of the imaginary part PTRS in the second PTRSs is a minimum value of the location indexes of the Q PTRSs; or a location index of the real part PTRS in the second PTRSs is a minimum value of location indexes of the Q PTRSs, and a location index of the imaginary part PTRS in the second PTRSs is a maximum value of the location indexes of the Q PTRSs.

In a possible implementation, $Q_{(1)}$ is equal to $Q_{(2)}$, and a difference between a central location of the location indexes of the $Q_{(1)}$ first PTRSs and a central location of the location indexes of the $Q_{(2)}$ second PTRSs is one unit location.

In a possible implementation, when the interference or the amplitude of the interference corresponding to the first PTRS is the fifth preset value, $Q_{(2)}$ is an even number.

It should be noted that in the foregoing embodiment, the communication apparatus 320 may be a network device, may be a terminal device, may be a chip, a chip system, a processor, or the like that supports a network device in implementing the foregoing method, or may be a chip, a chip system, a processor, or the like that supports a terminal device in implementing the foregoing method. Specifically, for operations performed by the processor 3201, refer to related content of the method embodiment corresponding to FIG. 22. Details are not described herein again. Through this communication apparatus, interference corresponding to the first PTRS is a fifth preset value. When the value of the interference is determined, a phase noise of the fifth signal may be solved.

In another embodiment, the processor 3201 is configured to generate a sixth signal. The sixth signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ real part PTRSs and $Q_{(2)}$ imaginary part PTRSs; and interference corresponding to the Q PTRSs is a seventh preset value, interference corresponding to the $Q_{(1)}$ real part PTRSs is generated based on the $Q_{(2)}$ imaginary part PTRSs, and interference corresponding to the $Q_{(2)}$ imaginary part PTRSs is generated based on the $Q_{(1)}$ real part PTRSs. Specifically, for an operation performed by the processor 3201, refer to the description in step S601 in the method shown in FIG. 28. For example, for the Block-PTRS pattern of the fourth signal, refer to FIG. 29 and FIG. 30.

The processor 3201 is configured to send the sixth signal to the second device through the transceiver 3205. Specifically, for an operation performed by the processor 3201, refer to the description in step S602 in the method shown in FIG. 28.

In a possible implementation, the one Block-PTRS pattern further includes an imaginary part data signal and a real part data signal, that interference corresponding to the $Q_{(1)}$ real part PTRSs is generated based on the $Q_{(2)}$ imaginary part PTRSs includes: the interference corresponding to the $Q_{(1)}$ real part PTRSs is generated based on the $Q_{(2)}$ imaginary part PTRSs and the imaginary part data signal; and that interference corresponding to the $Q_{(2)}$ imaginary part PTRSs is generated based on the $Q_{(1)}$ real part PTRSs includes: the interference corresponding to the $Q_{(2)}$ imaginary part PTRSs is generated based on the $Q_{(1)}$ real part PTRSs and the real part data signal.

In a possible implementation, the seventh preset value is at least one of the following values: sqrt(2)/2, 1, sqrt(2), 3/sqrt(10), 5/sqrt(42), 3/sqrt(42), 7/sqrt(170), 5/sqrt(170), 3/sqrt(170), 9/sqrt(648), 7/sqrt(648), 5/sqrt(648), 3/sqrt (648), jsqrt(2)/2, j, jsqrt(2), j3/sqrt(10), j5/sqrt(42), j3/sqrt (42), j7/sqrt(170), j5/sqrt(170), j3/sqrt(170), j9/sqrt(648), j7/sqrt(648), j5/sqrt(648), and j3/sqrt(648).

In a possible implementation, energy of each of the PTRSs is less than an eighth preset value.

It should be noted that in the foregoing embodiment, the communication apparatus 320 may be a network device, may be a terminal device, may be a chip, a chip system, a processor, or the like that supports a network device in implementing the foregoing method, or may be a chip, a chip system, a processor, or the like that supports a terminal device in implementing the foregoing method. Specifically, for operations performed by the processor 3201, refer to related content of the method embodiment corresponding to FIG. 28. Details are not described herein again. Through this communication apparatus, interference corresponding to the Q PTRSs is the seventh preset value. When the value of the interference is determined, a phase noise of the sixth signal may be solved.

In another possible design, the transceiver may be a transceiver circuit, an interface, or an interface circuit. Transceiver circuits, interfaces, or interface circuits that are configured to implement receiving and sending functions may be separated, or may be integrated together. The transceiver circuit, the interface, or the interface circuit may be configured to read or write code/data, or the transceiver circuit, the interface, or the interface circuit may be configured to transmit or transfer a signal.

In still another possible design, optionally, the processor 3201 may store instructions 3203, and the instructions 3203 are run on the processor 3201, so that the communication apparatus 320 can perform the method described in the foregoing method embodiment. The instructions 3203 may be built into the processor 3201. In this case, the processor 3201 may be implemented by hardware.

In still another possible design, the communication apparatus 320 may include a circuit, and the circuit may implement a sending, receiving, or communication function in the foregoing method embodiment.

The processor and the transceiver described in this application may be implemented in an integrated circuit (integrated circuit, IC), an analog IC, a radio frequency integrated circuit RFIC, a mixed signal IC, an application-specific integrated circuit (application specific integrated circuit, ASIC), or a printed circuit board (printed circuit board, PCB), an electronic device, or the like.

The communication apparatus described in the foregoing embodiments may be a network device or a terminal device. However, a scope of the communication apparatus described in this application is not limited thereto, and a structure of the communication apparatus may not be limited by FIG. 32. The communication device may be a stand-alone device or may be part of a larger device. For example, the communication apparatus may be:

(1) an independent integrated circuit IC, chip, or chip system or subsystem;

(2) a set that has one or more ICs, where optionally, the IC set may alternatively include a storage component configured to store data and an instruction;

(3) an ASIC, such as a modem (Modem);

(4) a module that can be embedded in another device;

(5) a receiver, an intelligent terminal, a wireless device, a handset, a mobile unit, an in-vehicle device, a cloud device, an artificial intelligence device, or the like; or (6) others.

For a case in which the communication apparatus may be a chip or a chip system, refer to a schematic diagram of a structure of a chip shown in FIG. 33. The chip 330 shown in FIG. 33 includes a processor 3301 and an interface 3302. There may be one or more processors 3301, and there may be a plurality of interfaces 3302.

For a case in which the chip is configured to implement a function of the first device in embodiments of this application:

In an embodiment, the processor 3301 is configured to generate a first signal, where the first signal includes one or more discrete Fourier transform-spread orthogonal frequency division multiplexing (DFT-s-OFDM) signals, one DFT-s-OFDM signal includes P block-phase noise tracking pilot signal (Block-PTRS) patterns, one Block-PTRS pattern includes Q phase noise tracking pilot signals (PTRSs), and the Q PTRSs include $Q_{(1)}$ real part PTRSs and $Q_{(2)}$ imaginary part PTRSs, where $Q_{(1)}$ is an even number, $Q_{(2)}$ is an odd number, and $Q_{(2)}$ is less than $Q_{(1)}$; or $Q_{(1)}$ is an odd number, $Q_{(2)}$ is an even number, and $Q_{(2)}$ is greater than $Q_{(1)}$; and A central location of location indexes of the $Q_{(1)}$ real part PTRSs is the same as a central location of location indexes of the $Q_{(2)}$ imaginary part PTRSs. Specifically, for an operation performed by the processor 3301, refer to the description in step S101 in the method shown in FIG. 9. For example, for the Block-PTRS pattern of the first signal, refer to FIG. 10 and FIG. 13.

The processor 3301 is configured to send the first signal to a second device through the interface 3302. Specifically, for an operation performed by the processor 3301, refer to the description in step S102 in the method shown in FIG. 9.

In another embodiment, the processor 3301 is configured to generate a second signal, where the second signal includes one or more discrete Fourier transform-spread orthogonal frequency division multiplexing (DFT-s-OFDM) signals, one DFT-s-OFDM signal includes P block-phase noise tracking pilot signal (Block-PTRS) patterns, one Block-PTRS pattern includes Q phase noise tracking pilot signals (PTRSs), and the Q PTRSs include $Q_{(1)}$ real part PTRSs and $Q_{(2)}$ imaginary part PTRSs, where interference corresponding to the $Q_{(1)}$ real part PTRSs is a first preset value, the interference corresponding to the $Q_{(1)}$ real part PTRSs is generated based on the $Q_{(2)}$ imaginary part PTRSs, and $Q_{(1)}$ is less than or equal to $Q_{(2)}$; or interference corresponding to the $Q_{(2)}$ imaginary part PTRSs is a second preset value, the interference corresponding to the $Q_{(2)}$ imaginary part PTRSs is generated based on the $Q_{(1)}$ real part PTRSs, and $Q_{(1)}$ is greater than or equal to $Q_{(2)}$. Specifically, for an operation performed by the processor 3301, refer to the description in step S201 in the method shown in FIG. 15. For example, for the Block-PTRS pattern of the second signal, refer to FIG. 16 and FIG. 17.

The processor 3301 is configured to send the second signal to a second device through the interface 3302. Specifically, for an operation performed by the processor 3301, refer to the description in step S202 in the method shown in FIG. 15.

In another embodiment, the processor 3301 is configured to send indication information to a second device through the interface 3302, where the indication information indicates a quantity of consecutive phase noise tracking pilot signals PTRSs whose amplitudes are 0 and that are included in one block-phase noise tracking pilot signal Block-PTRS pattern in a third signal. Specifically, for an operation performed by the processor 3301, refer to the description in step S301 in the method shown in FIG. 18.

The processor 3301 is configured to generate the third signal. The third signal includes one or more discrete Fourier transform-spread orthogonal frequency division multiplexing DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is an even number, $Q_{(2)}$ is an odd number, $Q_{(2)}$ is less than $Q_{(1)}$, amplitudes of the $Q_{(1)}$ real part PTRSs are 0, and the quantity of the phase noise tracking pilot signals PTRSs whose amplitudes are 0 is $Q_{(1)}$; or $Q_{(1)}$ is an odd number, $Q_{(2)}$ is an even number, $Q_{(2)}$ is greater than $Q_{(1)}$, amplitudes of the $Q_{(2)}$ imaginary part PTRSs are 0, and the quantity of the phase noise tracking pilot signals PTRSs whose amplitudes are 0 is $Q_{(2)}$; and A central location of location indexes of the $Q_{(1)}$ real part PTRSs is the same as a central location of location indexes of the $Q_{(2)}$ imaginary part PTRSs. Specifically, for an operation performed by the processor 3301, refer to the description in step S302 in the method shown in FIG. 18. For example, for the Block-PTRS pattern of the third signal, refer to FIG. 19.

The processor 3301 is further configured to send the third signal to the second device through the interface 3302. Specifically, for an operation performed by the processor 3301, refer to the description in step S303 in the method shown in FIG. 18.

In another embodiment, the processor 3301 is configured to send indication information to a second device through the interface 3302. The indication information indicates a quantity of consecutive imaginary part data signals and imaginary part PTRSs included in one block-phase noise tracking pilot signal Block-PTRS pattern in a fourth signal, and the imaginary part data signals and the imaginary part PTRSs have opposite phases and a same amplitude; or the indication information indicates a quantity of consecutive real part data signals and real part PTRSs included in one Block-PTRS pattern in a fourth signal, and the real part data signals and the real part PTRSs have opposite phases and a same amplitude. Specifically, for an operation performed by the processor 3301, refer to the description in step S401 in the method shown in FIG. 20.

The processor 3301 is configured to generate the fourth signal. The fourth signal includes one or more discrete Fourier transform-spread orthogonal frequency division multiplexing DFT-s-OFDM signals, one DFT-s-OFDM signal includes P Block-PTRS patterns, one Block-PTRS pattern includes Q PTRSs, and the Q PTRSs include $Q_{(1)}$ real part PTRSs and $Q_{(2)}$ imaginary part PTRSs, where $Q_{(1)}$ is 1, and a central location of location indexes of the $Q_{(2)}$ imaginary part PTRSs and the imaginary part data signals is the same as a central location of location indexes of the $Q_{(1)}$ real part PTRSs; or $Q_{(2)}$ is 1, and a central location of location indexes of the $Q_{(1)}$ real part PTRSs and the real part data signals is the same as a central location of location indexes of the $Q_{(2)}$ imaginary part PTRSs. Specifically, for an operation performed by the processor 3301, refer to the description in step S402 in the method shown in FIG. 20. For example, for the Block-PTRS pattern of the fourth signal, refer to FIG. 21.

The processor 3301 is further configured to send the fourth signal to the second device through the interface 3302. Specifically, for an operation performed by the processor 3301, refer to the description in step S403 in the method shown in FIG. 20.

In another embodiment, the processor 3301 is configured to generate a fifth signal. The fifth signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ first PTRSs and $Q_{(2)}$ second PTRSs; the first PTRS includes a real part PTRS, and the second PTRS includes an imaginary part PTRS; the first PTRS includes an imaginary part PTRS, and the second PTRS includes a real part PTRS; or each of the first PTRS and the second PTRS includes a real part PTRS and an imaginary part PTRS; and interference or an amplitude of interference corresponding to the first PTRS is a fifth preset value, where if the first PTRS includes a real part PTRS and the second PTRS includes an imaginary part PTRS, or the first PTRS includes an imaginary part PTRS and the second PTRS includes a real part PTRS, the interference corresponding to the first PTRS is generated based on the second PTRS; or if each of the first PTRS and the second PTRS includes a real part PTRS and an imaginary part PTRS, interference corresponding to the real part PTRS in the first PTRS is generated based on the imaginary part PTRS in the first PTRS and the imaginary part PTRS in the second PTRS, and interference corresponding to the imaginary part PTRS in the first PTRS is generated based on the real part PTRS in the first PTRS and the real part PTRS in the second PTRS, and the imaginary part PTRS and the imaginary part PTRS. Specifically, for an operation performed by the processor 3301, refer to the description in step S501 in the method shown in FIG. 22. For example, for the Block-PTRS pattern of the fourth signal, refer to FIG. 23 to FIG. 25, FIG. 26A, FIG. 26B, FIG. 27A, and FIG. 27B.

The processor 3301 is configured to send the fifth signal to the second device through the interface 3302. Specifically, for an operation performed by the processor 3301, refer to the description in step S502 in the method shown in FIG. 22.

In another embodiment, the processor 3301 is configured to generate a sixth signal. The sixth signal includes one or more discrete Fourier transform-spread orthogonal frequency division multiplexing DFT-s-OFDM signals, one DFT-s-OFDM signal includes P block-phase noise tracking pilot signal Block-PTRS patterns, one Block-PTRS pattern includes Q phase noise tracking pilot signals PTRSs, and the Q PTRSs include $Q_{(1)}$ real part PTRSs and $Q_{(2)}$ imaginary part PTRSs; and interference corresponding to the Q PTRSs is a seventh preset value, interference corresponding to the $Q_{(1)}$ real part PTRSs is generated based on the $Q_{(2)}$ imaginary part PTRSs, and interference corresponding to the $Q_{(2)}$ imaginary part PTRSs is generated based on the $Q_{(1)}$ real part PTRSs. Specifically, for an operation performed by the processor 3301, refer to the description in step S601 in the method shown in FIG. 28. For example, for the Block-PTRS pattern of the fourth signal, refer to FIG. 29 and FIG. 30.

The processor 3301 is configured to send the sixth signal to the second device through the interface 3302. Specifically, for an operation performed by the processor 3301, refer to the description in step S602 in the method shown in FIG. 28.

Optionally, the chip further includes a memory 3303, and the memory 3303 is configured to store program instructions and data that are necessary for a terminal device.

A person skilled in the art may further understand that various illustrative logical blocks (illustrative logical blocks) and steps (steps) listed in embodiments of this application may be implemented through electronic hardware, computer software, or a combination thereof. Whether such functionality is implemented through hardware or software depends on the specific application and the design requirements of the overall system. A person skilled in the art may use various methods to implement the functions for each specific application. However, it should not be understood that the implementation goes beyond the protection scope of embodiments of this application.

This application further provides a computer-readable storage medium. The computer-readable storage medium stores a computer program. When the computer-readable storage medium is executed by a computer, a function of any one of the foregoing method embodiments is implemented.

This application further provides a computer program product. When the computer program product is executed by a computer, a function of any one of the foregoing method embodiments is implemented.

All or some of the foregoing embodiments may be implemented through software, hardware, firmware, or any combination thereof. When software is used for implementation, all or some of the embodiments may be implemented in a form of a computer program product. The computer program product includes one or more computer instructions. When the computer instructions are loaded and executed on a computer, all or some of the processes or functions based on embodiments of this application are generated. The computer may be a general-purpose computer, a dedicated computer, a computer network, or another programmable apparatus. The computer instructions may be stored in a computer-readable storage medium, or transmitted from one computer-readable storage medium to another computer-readable storage medium. For example, the computer instructions may be transmitted from a website site, computer, server, or data center to another website site, computer, server, or data center in a wired (for example, coaxial cable, optical fiber, digital subscriber line (DSL)) or wireless (for example, infrared, radio, or microwave) manner. The computer-readable storage medium may be any usable medium that can be accessed by a computer, or a data storage device such as a server or a data center that integrates one or more usable media. The usable medium may be a magnetic medium (for example, a floppy disk, a hard disk, or a magnetic tape), an optical medium (for example, high-density digital video disc (DVD)), a semiconductor medium (for example, a solid state disk (solid state disk, SSD)), or the like.

A person of ordinary skill in the art may understand that various numerical numbers such as the first and the second in this specification are merely distinguished for ease of description, and are not intended to limit the scope and sequence of embodiments of this application.

Correspondences shown in tables in this application may be configured, or may be predefined. Values of the information in each table are merely examples, and may be configured as other values. This is not limited in this application. When configuring the correspondence between the information and the parameters, it is not necessary to configure all the correspondences shown in the tables. For example, in a table in this application, correspondences shown in some rows may alternatively not be configured. For another example, proper deformation adjustment, for example, splitting or merging may be performed based on the foregoing table. Names of the parameters indicated by the headings in the foregoing tables may alternatively be other names that can be understood by the communication apparatus, and values or representation manners of the parameters may alternatively be other values or representation manners that can be understood by the communication apparatus. When the foregoing tables are implemented, another data structure may alternatively be used, for example, an array, a queue, a container, a stack, a linear table, a pointer, a linked list, a tree, a graph, a structure, a class, a heap, or a hash table. Predefinition in this application may be understood as definition, pre-definition, storage, pre-storage, pre-negotiation, pre-configuration, built-in, or pre-burning.

A person of ordinary skill in the art may be aware that units and algorithm steps in the examples described with reference to the embodiments disclosed in this specification can be implemented by electronic hardware or a combination of computer software and electronic hardware. Whether these functions are executed in a hardware or software manner depends on a specific application and a design constraint condition of the technical solution. A person skilled in the art may use different methods to implement the described functions for each specific application. However, it should not be considered that such implementation goes beyond the scope of this application. It may be clearly understood by a person skilled in the art that, for the purpose of convenient and brief description, for a specific working process of the foregoing system, apparatus, and unit, refer to a corresponding process in the foregoing method embodiments. Details are not described herein again.

What is claimed is:

1. A method, comprising:
generating, by a first device, a first signal, wherein the first signal comprises one or more discrete Fourier transform-spread orthogonal frequency division multiplexing (DFT-s-OFDM) signals, each of the one or more DFT-s-OFDM signals comprises P block-phase noise tracking pilot signal (Block-PTRS) patterns, each of the P Block-PTRS patterns comprises Q phase noise tracking pilot signals (PTRSs), and the Q PTRSs comprise $Q_{(1)}$ real part PTRSs and $Q_{(2)}$ imaginary part PTRSs, wherein $Q_{(1)}$ is an even number and $Q_{(2)}$ is an odd number less than $Q_{(1)}$, or $Q_{(1)}$ is an odd number and $Q_{(2)}$ is an even number greater than $Q_{(1)}$, and wherein a central location of location indexes of the $Q_{(1)}$ real part PTRSs is same as a central location of location indexes of the $Q_{(2)}$ imaginary part PTRSs; and
sending, by the first device, the first signal to a second device.

2. The method according to claim 1, wherein when $Q_{(1)}$ is an even number and $Q_{(2)}$ is an odd number, phases of the $Q_{(1)}$ real part PTRSs are the same, and wherein when $Q_{(1)}$ is an odd number and $Q_{(2)}$ is an even number, phases of the $Q_{(2)}$ imaginary part PTRSs are the same.

3. The method according to claim 1, wherein when $Q_{(1)}$ is an even number and $Q_{(2)}$ is an odd number, amplitudes of the $Q_{(1)}$ real part PTRSs are the same, and wherein when $Q_{(1)}$ is an odd number and $Q_{(2)}$ is an even number, amplitudes of the $Q_{(2)}$ imaginary part PTRSs are the same.

4. The method according to claim 1, wherein phases of the $Q_{(1)}$ real part PTRSs are the same, and phases of the $Q_{(2)}$ imaginary part PTRSs are the same.

5. The method according to claim 1, wherein when $Q_{(1)}$ is greater than 1, the $Q_{(1)}$ real part PTRSs are consecutive real part signals.

6. The method according to claim 1, wherein when $Q_{(2)}$ is greater than 1, the $Q_{(2)}$ imaginary part PTRSs are consecutive imaginary part signals.

7. The method according to claim 1, wherein each of the $Q_{(1)}$ real part PTRSs is adjacent to one of the $Q_{(2)}$ imaginary part PTRSs.

8. A method, comprising:
receiving, by a device, a first signal, wherein the first signal comprises one or more discrete Fourier transform-spread orthogonal frequency division multiplexing (DFT-s-OFDM) signals, each of the one or more DFT-s-OFDM signals comprises P block-phase noise tracking pilot signal (Block-PTRS) patterns, each of the P Block-PTRS patterns comprises Q phase noise tracking pilot signals (PTRSs), and the Q PTRSs comprise $Q_{(1)}$ real part PTRSs and $Q_{(2)}$ imaginary part PTRSs, wherein $Q_{(1)}$ is an even number and $Q_{(2)}$ is an odd numberless than $Q_{(1)}$, or $Q_{(1)}$ is an odd number and $Q_{(2)}$ is an even number greater than $Q_{(1)}$, and wherein a central location of location indexes of the $Q_{(1)}$ real part PTRSs is same as a central location of location indexes of the $Q_{(2)}$ imaginary part PTRSs; and
determining, by the device, a phase noise of the first signal based on the first signal.

9. The method according to claim 8, wherein when $Q_{(1)}$ is an even number and $Q_{(2)}$ is an odd number, phases of the $Q_{(1)}$ real part PTRSs are the same, and wherein when $Q_{(1)}$ is an odd number and $Q_{(2)}$ is an even number, phases of the $Q_{(2)}$ imaginary part PTRSs are the same.

10. The method according to claim 8, wherein when $Q_{(1)}$ is an even number and $Q_{(2)}$ is an odd number, amplitudes of the $Q_{(1)}$ real part PTRSs are the same, and wherein when $Q_{(1)}$ is an odd number and $Q_{(2)}$ is an even number, amplitudes of the $Q_{(2)}$ imaginary part PTRSs are the same.

11. The method according to claim 8, wherein phases of the $Q_{(1)}$ real part PTRSs are the same, and phases of the $Q_{(2)}$ imaginary part PTRSs are the same.

12. The method according to claim 8, wherein that $Q_{(1)}$ is an even number and $Q_{(2)}$ is an odd number comprises: $Q_{(1)}$ is 2 and $Q_{(2)}$ is 1; and that $Q_{(1)}$ is an odd number and $Q_{(2)}$ is an even number comprises: $Q_{(1)}$ is 1 and $Q_{(2)}$ is 2.

13. A communication apparatus, comprising a processor and a communication interface, wherein the processor is configured to:

generate a first signal, wherein the first signal comprises one or more discrete Fourier transform-spread orthogonal frequency division multiplexing (DFT-s-OFDM) signals, each of the one or more DFT-s-OFDM signals comprises P block-phase noise tracking pilot signal (Block-PTRS) patterns, each of the P Block-PTRS patterns comprises Q phase noise tracking pilot signals (PTRSs), and the Q PTRSs comprise $Q_{(1)}$ real part PTRSs and $Q_{(2)}$ imaginary part PTRSs, wherein $Q_{(1)}$ is an even number and $Q_{(2)}$ is an odd number less than $Q_{(1)}$, or $Q_{(1)}$ is an odd number and $Q_{(2)}$ is an even number greater than $Q_{(1)}$, and wherein a central location of location indexes of the $Q_{(1)}$ real part PTRSs is same as a central location of location indexes of the $Q_{(2)}$ imaginary part PTRSs; and wherein the communication interface is configured to:

send the first signal to a second device.

14. The communication apparatus according to claim 13, wherein when $Q_{(1)}$ is an even number and $Q_{(2)}$ is an odd number, phases of the $Q_{(1)}$ real part PTRSs are the same, and wherein when $Q_{(1)}$ is an odd number and $Q_{(2)}$ is an even number, phases of the $Q_{(2)}$ imaginary part PTRSs are the same.

15. The communication apparatus according to claim 13, wherein when $Q_{(1)}$ is an even number and $Q_{(2)}$ is an odd number, amplitudes of the $Q_{(1)}$ real part PTRSs are the same, and wherein when $Q_{(1)}$ is an odd number and $Q_{(2)}$ is an even number, amplitudes of the $Q_{(2)}$ imaginary part PTRSs are the same.

16. The communication apparatus according to claim 13, wherein phases of the $Q_{(1)}$ real part PTRSs are the same, and phases of the $Q_{(2)}$ imaginary part PTRSs are the same.

17. The communication apparatus according to claim 13, wherein that $Q_{(1)}$ is an even number and $Q_{(2)}$ is an odd number comprises: $Q_{(1)}$ is 2 and $Q_{(2)}$ is 1; and that $Q_{(1)}$ is an odd number and $Q_{(2)}$ is an even number comprises: $Q_{(1)}$ is 1 and $Q_{(2)}$ is 2.

18. The communication apparatus according to claim 13, wherein when $Q_{(1)}$ is greater than 1, the $Q_{(1)}$ real part PTRSs are consecutive real part signals.

19. The communication apparatus according to claim 13, wherein when $Q_{(2)}$ is greater than 1, the $Q_{(2)}$ imaginary part PTRSs are consecutive imaginary part signals.

20. The communication apparatus according to claim 13, wherein each of the $Q_{(1)}$ real part PTRSs is adjacent to one of the $Q_{(2)}$ imaginary part PTRSs.

* * * * *